US010536759B2

(12) United States Patent
Elford et al.

(10) Patent No.: US 10,536,759 B2
(45) Date of Patent: *Jan. 14, 2020

(54) POINT-TO-POINT FIBER INSERTION

(71) Applicant: CenturyLink Intellectual Property LLC, Broomfield, CO (US)

(72) Inventors: Michael L. Elford, Calhoun, LA (US); Michael P. Winterrowd, Calhoun, LA (US); Thomas C. Barnett, Jr., Monroe, LA (US); Thomas Schwengler, Lakewood, CO (US)

(73) Assignee: CenturyLink Intellectual Property LLC, Broomfield, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/215,422

(22) Filed: Dec. 10, 2018

(65) Prior Publication Data

US 2019/0124425 A1    Apr. 25, 2019

Related U.S. Application Data

(63) Continuation of application No. 14/578,851, filed on Dec. 22, 2014, now Pat. No. 10,154,325.
(Continued)

(51) Int. Cl.
*H04Q 11/00* (2006.01)
*G02B 6/50* (2006.01)
*G02B 6/44* (2006.01)

(52) U.S. Cl.
CPC ......... *H04Q 11/0067* (2013.01); *G02B 6/504* (2013.01); *G02B 6/4442* (2013.01); *G02B 6/4451* (2013.01); *Y10T 29/4998* (2015.01)

(58) Field of Classification Search
CPC ............ H04Q 11/0067; H04Q 11/0003; H04L 41/5051
See application file for complete search history.

(56) References Cited

U.S. PATENT DOCUMENTS 2,754,101 A    7/1956  Haworth et al.
4,034,567 A    7/1977  Roggen
(Continued)

FOREIGN PATENT DOCUMENTS

CA      2337284       8/2002
CN    101799987 B    11/2011
(Continued)

OTHER PUBLICATIONS

International Search Report and Written Opinion prepared by the U.S. Patent and Trademark Office as International Searching Authority for PCT International Patent Application No. PCT/US2013/0280 dated May 3, 2013; 20 pages.
(Continued)

*Primary Examiner* — Dzung D Tran

(57) ABSTRACT

Novel tools and techniques are provided for implementing point-to-point fiber insertion within a passive optical network ("PON") communications system. The PON communications system, associated with a first service provider or a first service, might include an F1 line(s) routed from a central office or DSLAM to a fiber distribution hub ("FDH") located within a block or neighborhood of customer premises, via at least an apical conduit source slot, an F2 line(s) routed via various apical conduit components to a network access point ("NAP") servicing customer premises, and an F3 line(s) distributed, at the NAP and from the F2 Line(s), to a network interface device or optical network terminal at each customer premises via various apical conduit components (e.g., in roadway surfaces). Point-to-point fiber insertion of another F1 line(s), associated with a second service provider or a second service, at either the NAP or the FDH (or outside these devices).

20 Claims, 35 Drawing Sheets

Related U.S. Application Data

(60) Provisional application No. 61/939,109, filed on Feb. 12, 2014.

(56) References Cited

U.S. PATENT DOCUMENTS

| | | | |
|---|---|---|---|
| 4,329,083 A | 5/1982 | Parkinson | |
| 4,815,814 A | 3/1989 | Ulijasz | |
| 4,940,359 A | 7/1990 | Van Duyn et al. | |
| 5,239,129 A | 8/1993 | Ehrenfels | |
| 5,313,546 A | 5/1994 | Toffetti | |
| 5,528,684 A | 6/1996 | Schneider et al. | |
| 5,566,622 A | 10/1996 | Ziaylek, Jr. et al. | |
| 5,583,492 A | 12/1996 | Nakanishi | |
| 5,606,606 A | 2/1997 | Schneider et al. | |
| 5,717,955 A | 2/1998 | Swinehart | |
| 5,760,706 A | 6/1998 | Kiss | |
| 5,879,109 A | 3/1999 | Diermeier et al. | |
| 6,099,080 A | 8/2000 | Hirashita et al. | |
| 6,272,346 B1 | 8/2001 | Fujinami | |
| 6,371,691 B1 | 4/2002 | Finzel et al. | |
| 6,414,605 B1 | 7/2002 | Walden | |
| 6,499,410 B1 | 12/2002 | Berardi | |
| 6,503,025 B1 | 1/2003 | Miller | |
| 6,807,355 B2 | 10/2004 | Dofher | |
| 6,829,424 B1 | 12/2004 | Finzel et al. | |
| 6,866,448 B2 | 3/2005 | Finzel et al. | |
| 6,990,192 B1 | 1/2006 | Denovich et al. | |
| 7,030,781 B2 | 4/2006 | Jones | |
| 7,050,683 B2 | 5/2006 | Dofher | |
| 7,095,930 B2 | 8/2006 | Storaasli et al. | |
| 7,514,628 B2 | 4/2009 | Kadrnoska et al. | |
| 7,522,805 B2 | 4/2009 | Smith et al. | |
| 7,674,980 B2 | 3/2010 | Lubanski | |
| 7,740,417 B2 | 6/2010 | Jang | |
| 7,849,886 B2 | 12/2010 | Carew et al. | |
| D640,290 S | 6/2011 | Stellman et al. | |
| 8,061,344 B2 | 11/2011 | Dofher | |
| 8,296,383 B2 | 10/2012 | Lindahl | |
| 8,480,332 B2 | 7/2013 | Miller et al. | |
| 8,654,936 B1 | 2/2014 | Eslambolchi et al. | |
| 9,062,423 B2 | 6/2015 | Allouche et al. | |
| 9,226,418 B2 | 12/2015 | Magno et al. | |
| 9,270,098 B2 | 2/2016 | Isaaks et al. | |
| 9,432,340 B1 | 8/2016 | Tutt et al. | |
| 9,456,276 B1 | 9/2016 | Chhetri | |
| 9,466,966 B2 | 10/2016 | Allouche et al. | |
| 9,531,174 B2 | 12/2016 | Elford et al. | |
| 9,588,315 B1 | 3/2017 | Turner | |
| 9,742,172 B2 | 8/2017 | Elford et al. | |
| 9,780,433 B2 | 10/2017 | Schwengler et al. | |
| 9,786,997 B2 | 10/2017 | Schwengler et al. | |
| 9,860,677 B1 | 1/2018 | Agerstam | |
| 9,917,903 B2 | 3/2018 | Clernon | |
| 10,069,751 B2 | 9/2018 | Amulothu | |
| 10,154,325 B2 * | 12/2018 | Elford | H04Q 11/0067 |
| 2001/0029311 A1 | 10/2001 | Khare | |
| 2002/0057945 A1 | 5/2002 | Dahowski | |
| 2002/0061231 A1 | 5/2002 | Finzel et al. | |
| 2003/0061029 A1 | 3/2003 | Shaket | |
| 2003/0123935 A1 | 7/2003 | Dofher | |
| 2003/0210958 A1 | 11/2003 | Nothofer | |
| 2004/0083054 A1 | 4/2004 | Jones | |
| 2004/0115004 A1 | 6/2004 | Serrano | |
| 2004/0129445 A1 | 7/2004 | Winkelbach | |
| 2004/0142658 A1 | 7/2004 | McKenna | |
| 2004/0221324 A1 | 11/2004 | Ansari et al. | |
| 2004/0234215 A1 | 11/2004 | Serrano et al. | |
| 2005/0013566 A1 | 1/2005 | Storaasli | |
| 2005/0191113 A1 | 9/2005 | Frazier | |
| 2005/0191133 A1 | 9/2005 | Purcell | |
| 2005/0207711 A1 | 9/2005 | Vo | |
| 2005/0259930 A1 | 11/2005 | Elkins et al. | |
| 2005/0285807 A1 | 12/2005 | Zehngut | |
| 2006/0008231 A1 * | 1/2006 | Reagan | G02B 6/3849 |
| | | | 385/135 |
| 2006/0093303 A1 | 5/2006 | Reagan et al. | |
| 2006/0118338 A1 | 6/2006 | Maybury, Jr. | |
| 2006/0204187 A1 | 9/2006 | Dofher | |
| 2007/0018849 A1 | 1/2007 | Salser, Jr. | |
| 2007/0079113 A1 | 4/2007 | Kulkarni et al. | |
| 2007/0154152 A1 | 7/2007 | Morris | |
| 2008/0256008 A1 | 10/2008 | Kwok | |
| 2008/0298755 A1 | 12/2008 | Caplan | |
| 2008/0303654 A1 | 12/2008 | Kates | |
| 2009/0177172 A1 | 7/2009 | Wilkes | |
| 2009/0214163 A1 | 8/2009 | Lu | |
| 2009/0317047 A1 * | 12/2009 | Smith | G02B 6/3897 |
| | | | 385/135 |
| 2009/0327910 A1 | 12/2009 | Black | |
| 2010/0010117 A1 | 1/2010 | Bricout | |
| 2010/0047021 A1 | 2/2010 | Scola | |
| 2010/0071596 A1 | 3/2010 | Konczak | |
| 2010/0086254 A1 | 4/2010 | Dofher | |
| 2010/0124332 A1 | 5/2010 | Arena | |
| 2010/0217604 A1 | 8/2010 | Baldwin et al. | |
| 2010/0243096 A1 | 9/2010 | Berglund | |
| 2010/0325421 A1 | 12/2010 | Park et al. | |
| 2011/0016754 A1 | 1/2011 | Ruhl et al. | |
| 2011/0052131 A1 | 3/2011 | Park et al. | |
| 2011/0106321 A1 | 5/2011 | Cherian | |
| 2011/0315259 A1 | 12/2011 | Kelly | |
| 2012/0048148 A1 | 3/2012 | Konczak | |
| 2012/0086563 A1 | 4/2012 | Arling | |
| 2012/0195694 A1 | 8/2012 | Konczak | |
| 2012/0268886 A1 | 10/2012 | Leontiev | |
| 2013/0011198 A1 | 1/2013 | Pichler | |
| 2013/0044918 A1 | 2/2013 | Nielsen et al. | |
| 2013/0074067 A1 | 3/2013 | Chowdhry | |
| 2013/0121761 A1 | 5/2013 | Dixon | |
| 2013/0216187 A1 * | 8/2013 | Dowling | H04Q 11/0003 |
| | | | 385/71 |
| 2013/0216313 A1 | 8/2013 | Gustavsson et al. | |
| 2013/0223807 A1 | 8/2013 | Elford et al. | |
| 2013/0238326 A1 | 9/2013 | Kim et al. | |
| 2013/0287500 A1 | 10/2013 | Miller | |
| 2013/0294839 A1 | 11/2013 | Gustavsson et al. | |
| 2014/0018969 A1 | 1/2014 | Forbes | |
| 2014/0146905 A1 | 5/2014 | Zavadsky | |
| 2014/0167931 A1 | 6/2014 | Lee et al. | |
| 2014/0188463 A1 | 7/2014 | Noh et al. | |
| 2014/0202571 A1 | 7/2014 | Spijker | |
| 2014/0270971 A1 | 9/2014 | Allouche et al. | |
| 2014/0327583 A1 | 11/2014 | Sparks | |
| 2014/0343950 A1 | 11/2014 | Simpson et al. | |
| 2015/0035704 A1 | 2/2015 | Schwengler et al. | |
| 2015/0070221 A1 | 3/2015 | Schwengler et al. | |
| 2015/0110453 A1 | 4/2015 | Elford et al. | |
| 2015/0139598 A1 | 5/2015 | Barnes et al. | |
| 2015/0230008 A1 | 8/2015 | Elford et al. | |
| 2015/0249672 A1 | 9/2015 | Burns et al. | |
| 2015/0288161 A1 | 10/2015 | Allouche et al. | |
| 2015/0300527 A1 | 10/2015 | Konczak | |
| 2015/0350247 A1 | 12/2015 | Adler et al. | |
| 2015/0365278 A1 | 12/2015 | Chakrabarti et al. | |
| 2016/0021127 A1 | 1/2016 | Yan | |
| 2016/0029346 A1 | 1/2016 | Suresh et al. | |
| 2016/0064829 A1 | 3/2016 | Schaepperle | |
| 2016/0080322 A1 | 3/2016 | Prisser | |
| 2016/0085594 A1 | 3/2016 | Wang | |
| 2016/0109036 A1 | 4/2016 | Elford et al. | |
| 2016/0109678 A1 | 4/2016 | Schwengler et al. | |
| 2016/0112779 A1 | 4/2016 | Barnett et al. | |
| 2016/0187995 A1 | 6/2016 | Rosewall | |
| 2016/0195876 A1 | 7/2016 | Mattsson | |
| 2016/0212012 A1 | 7/2016 | Young | |
| 2016/0212613 A1 | 7/2016 | Huang | |
| 2016/0226231 A1 | 8/2016 | Elford et al. | |
| 2016/0226674 A1 | 8/2016 | Kangshang et al. | |
| 2016/0248746 A1 | 8/2016 | James | |
| 2016/0277310 A1 | 9/2016 | Challa | |
| 2016/0278599 A1 | 9/2016 | Seo | |
| 2016/0294828 A1 | 10/2016 | Zakaria | |
| 2016/0295364 A1 | 10/2016 | Zakaria | |
| 2016/0323271 A1 | 11/2016 | Hinman | |

(56) References Cited

U.S. PATENT DOCUMENTS

| | | |
|---|---|---|
| 2016/0330042 A1 | 11/2016 | Andersen |
| 2016/0352526 A1 | 12/2016 | Adler et al. |
| 2016/0359965 A1 | 12/2016 | Murphy et al. |
| 2017/0006141 A1 | 1/2017 | Bhadra |
| 2017/0006643 A1 | 1/2017 | Zakaria et al. |
| 2017/0026157 A1 | 1/2017 | Bugenhagen et al. |
| 2017/0026472 A1 | 1/2017 | Bugenhagen et al. |
| 2017/0059802 A1 | 3/2017 | Elford et al. |
| 2017/0060369 A1 | 3/2017 | Goyal |
| 2017/0093866 A1 | 3/2017 | Ben-Noon |
| 2017/0110784 A1 | 4/2017 | Vermes et al. |
| 2017/0134937 A1 | 5/2017 | Miller |
| 2017/0141575 A1 | 5/2017 | Fulton |
| 2017/0171747 A1 | 6/2017 | Britt et al. |
| 2017/0187807 A1 | 6/2017 | Clernon |
| 2017/0192437 A1 | 7/2017 | Bier |
| 2017/0195318 A1 | 7/2017 | Liu |
| 2017/0201504 A1 | 7/2017 | Funk |
| 2017/0206900 A1 | 7/2017 | Lee et al. |
| 2017/0237815 A1 | 8/2017 | Arsenault |
| 2017/0253258 A1 | 9/2017 | Bramucci |
| 2017/0279620 A1 | 9/2017 | Kravitz et al. |
| 2017/0300953 A1 | 10/2017 | Kim |
| 2017/0317482 A1 | 11/2017 | Elford et al. |
| 2017/0345420 A1 | 11/2017 | Barnett, Jr. |
| 2017/0358025 A1 | 12/2017 | Varma |
| 2017/0358837 A1 | 12/2017 | Schwengler et al. |
| 2017/0358869 A1 | 12/2017 | Schwengler et al. |
| 2018/0040172 A1 | 2/2018 | Funk |
| 2018/0062691 A1 | 3/2018 | Barnett, Jr. |
| 2018/0084596 A1 | 3/2018 | Schwengler et al. |
| 2018/0103579 A1 | 4/2018 | Grufman |
| 2018/0122506 A1 | 5/2018 | Grantcharov |
| 2018/0136424 A1 | 5/2018 | Elford |
| 2018/0168464 A1 | 6/2018 | Barnett, Jr. et al. |
| 2018/0181091 A1 | 6/2018 | Funk et al. |
| 2018/0181095 A1 | 6/2018 | Funk et al. |
| 2018/0183685 A1 | 6/2018 | Cook |
| 2018/0183874 A1 | 6/2018 | Cook |
| 2018/0188704 A1 | 7/2018 | Cella |
| 2018/0196216 A1 | 7/2018 | Elford et al. |

FOREIGN PATENT DOCUMENTS

| | | |
|---|---|---|
| FR | 2750717 | 1/1998 |
| GB | 2327680 | 2/1999 |
| JP | H03139705 | 6/1991 |
| KR | 10-2015-0128346 | 11/2015 |
| WO | WO-2010-140507 | 5/1998 |
| WO | WO-1999-61710 | 12/1999 |
| WO | WO-2002-29947 | 4/2002 |
| WO | WO-2009-098676 | 8/2009 |
| WO | WO-2013-058648 | 4/2013 |
| WO | WO-2013-130644 | 9/2013 |
| WO | WO-2014-151726 | 9/2014 |
| WO | WO-2017-123392 | 7/2017 |

OTHER PUBLICATIONS

International Search Report and Written Opinion prepared by the U.S. Patent and Trademark Office as International Search Authority in PCT International Patent Application No. PCT/US2014/026325, dated Aug. 8, 2014; 12 pages.
Preliminary Report on Patentability, PCT International Patent Application No. PCT/US2013/0280 dated Sep. 12, 2014; 13 pages.
International Preliminary Report on Patentability, PCT International Patent Application No. PCT/US2014/026325, dated Sep. 24, 2015; 8 pages.
Abram, et al., Center for Nondestructive Evaluation, Iowa State University, Ames, IA, USA; "Effect of relative humidity on the curing and dielectric properties of polyurethane-based composites"; 2005 Annual Report Conference; 4 pages.
Lejun Qi, Linnea Petersson & Tieliang Liu (2014) "Review of Recent Activities on Dielectric Films for Capacitor Applications", Journal of International Council on Electrical Engineering, 6 pages.
Extended European Search Report, European Patent Application No. 14768062.3; dated Oct. 18, 2016; 5 pages.
International Search Report and Written Opinion prepared by the Korean Intellectual Property Office as International Searching Authority for PCT Intl Patent App. No. PCT/US2016/067938 dated Mar. 31, 2017; 11 pages.
International Search Report and Written Opinion prepared by the Korean Intellectual Property Office as International Searching Authority for PCT International Patent Application No. PCT/US2017/034531 dated Aug. 29, 2017; 18 pages.
Alexander, Chris, et al., "Improved User Authentication in Off-The-Record Messaging", Pub. 2009, 7 pages.
Borisov, Nikita, et al., "Off-the-Record Communication, or, Why Not to Use PGP", Pub. 2004, 8 pages.
De Raimondo, Mario, et al., "Secure Off the Record Messaging", Pub. 2005; 9 pages.
Goldberg, Ian, et al., "Multi-Party Off the Record Messaging", Pub. 2007, 11 pages.
Stedman, Ryan, et al., "A User Study of Off-the-Record Messaging", Pub. Date 2008, 10 pages.
International Preliminary Report on Patentability, PCT International Application No. PCT/US2016/067938, dated Jul. 26, 2018, 8 pages.

* cited by examiner

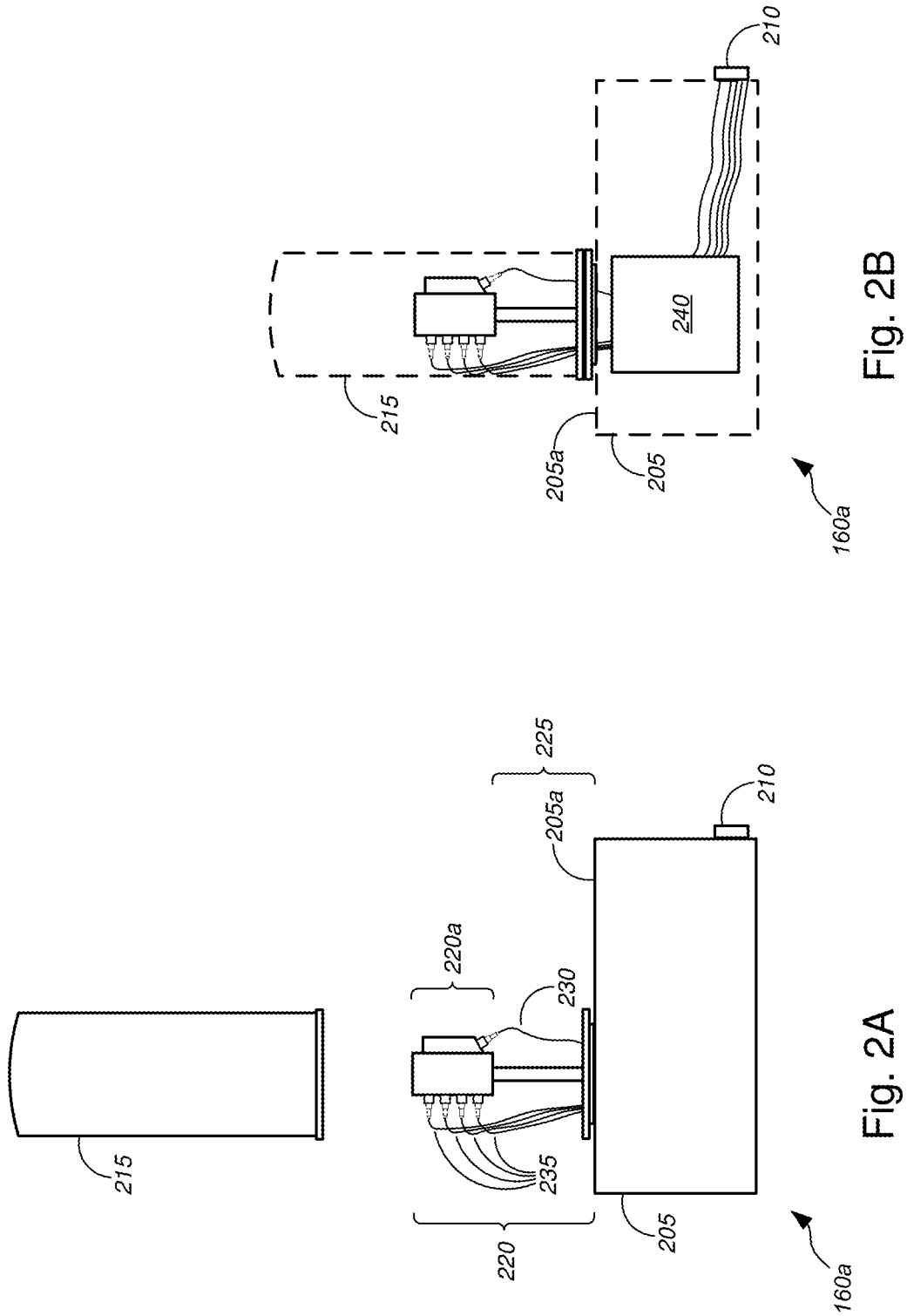

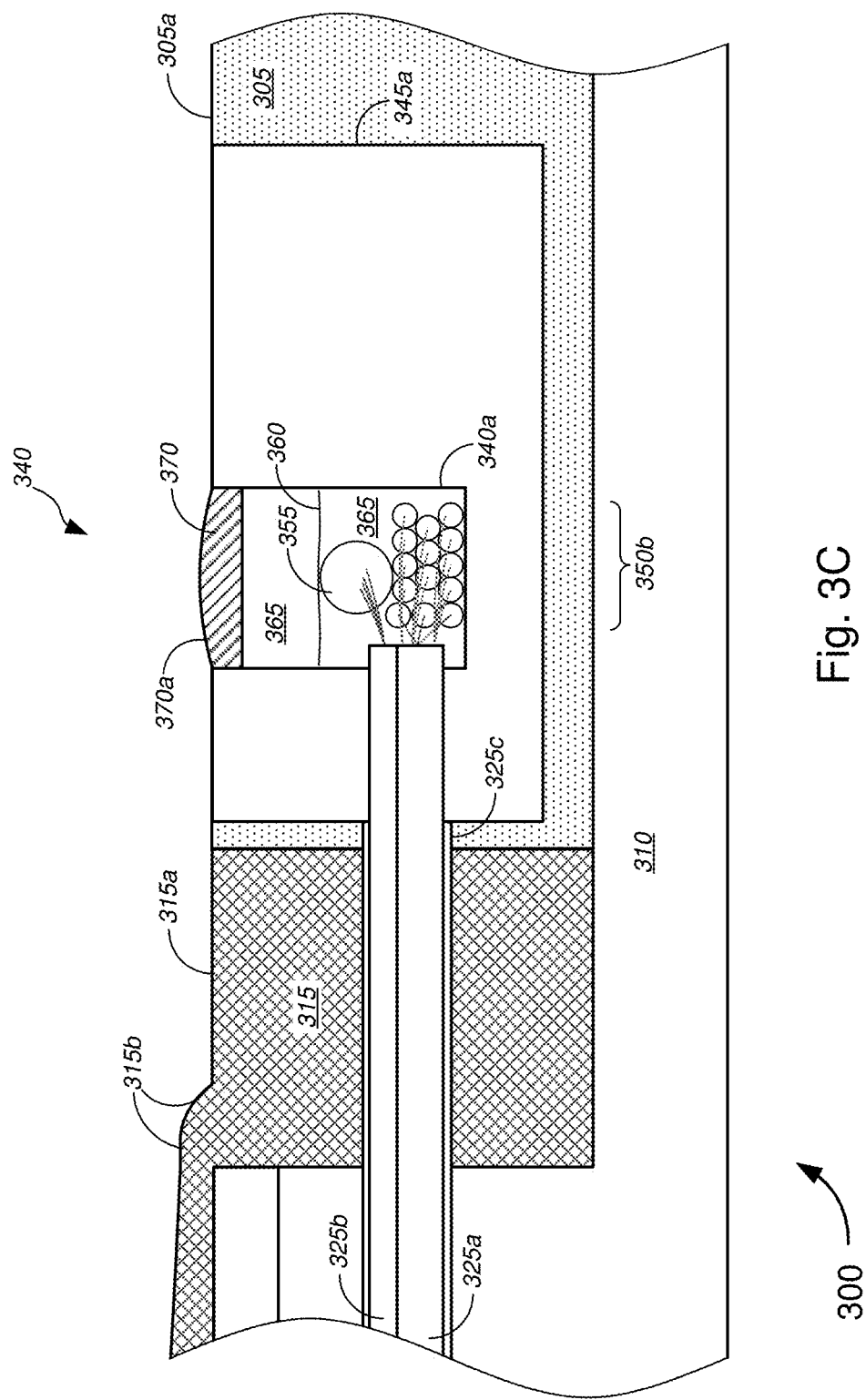

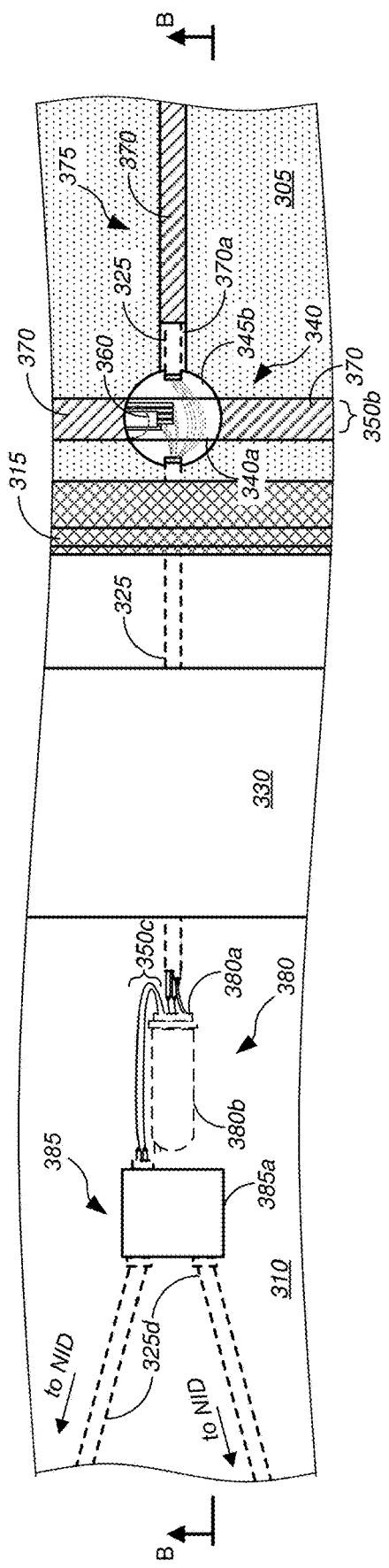
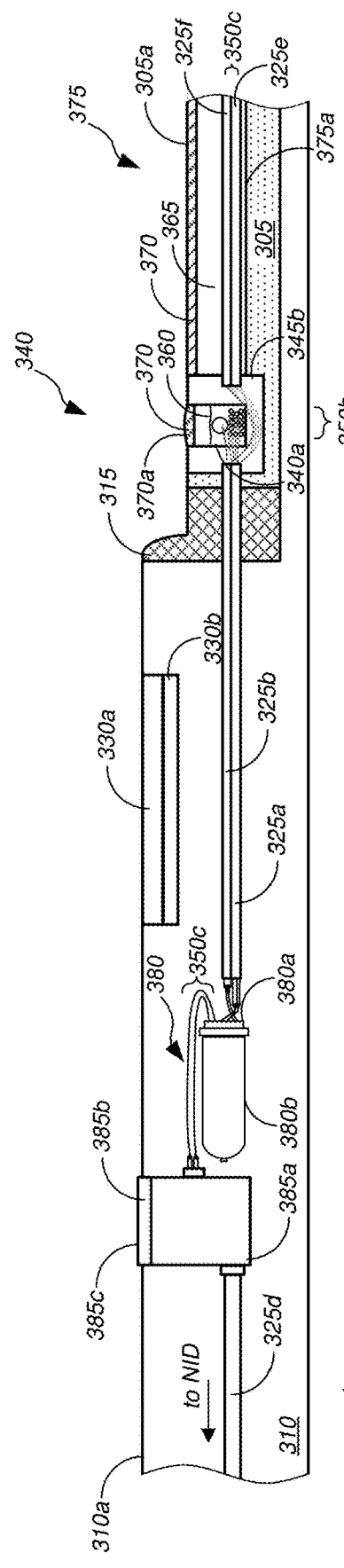
Fig. 4A
Fig. 4B

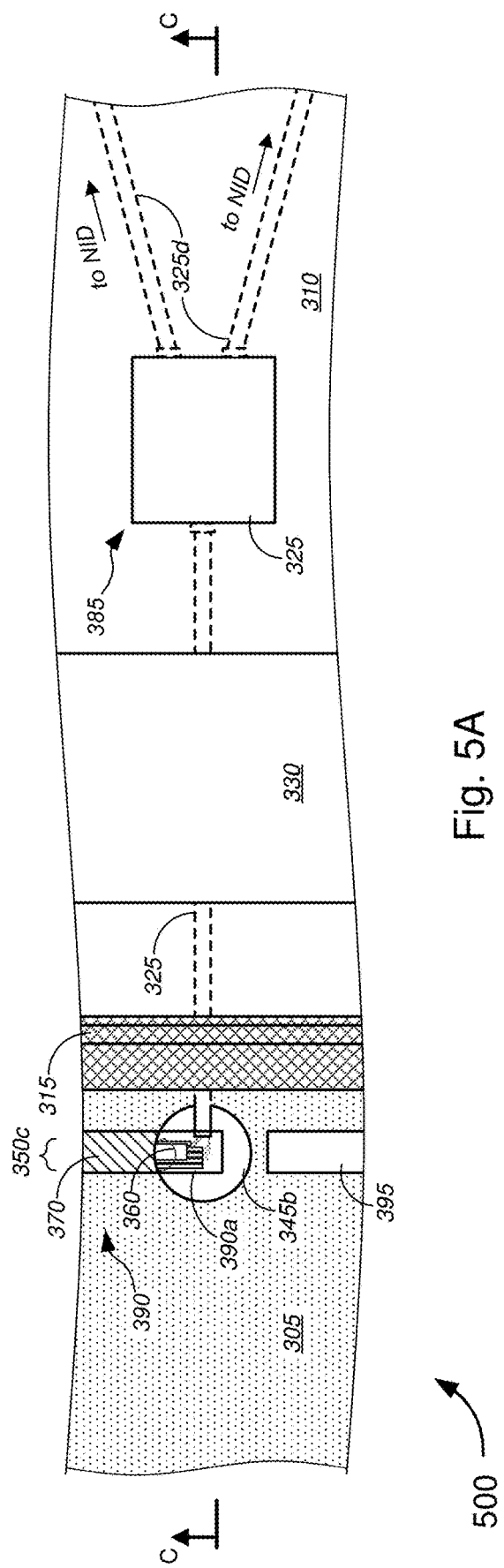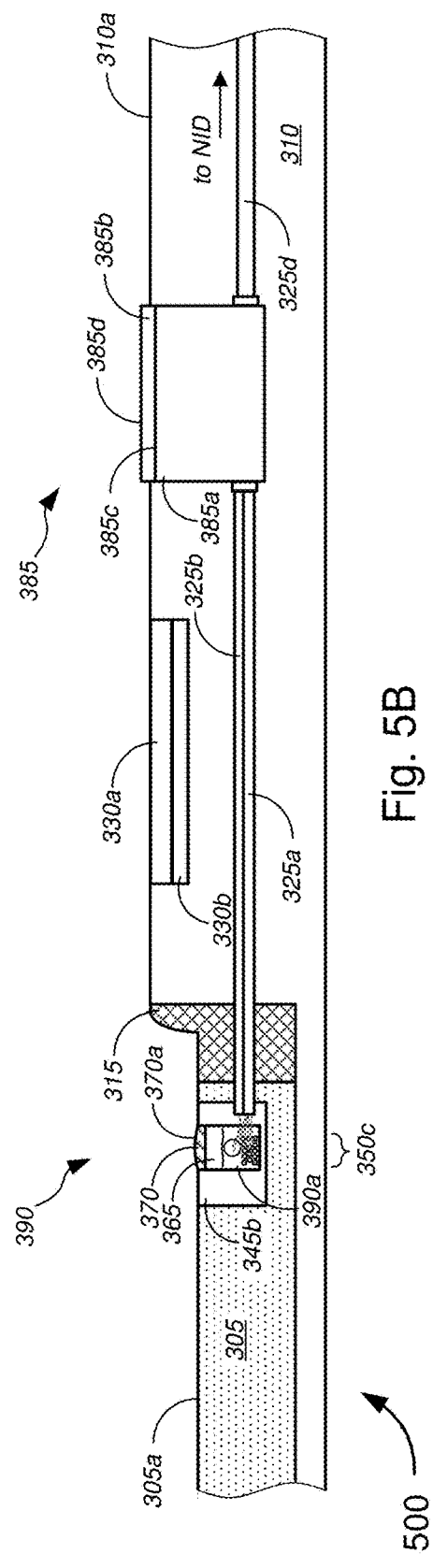

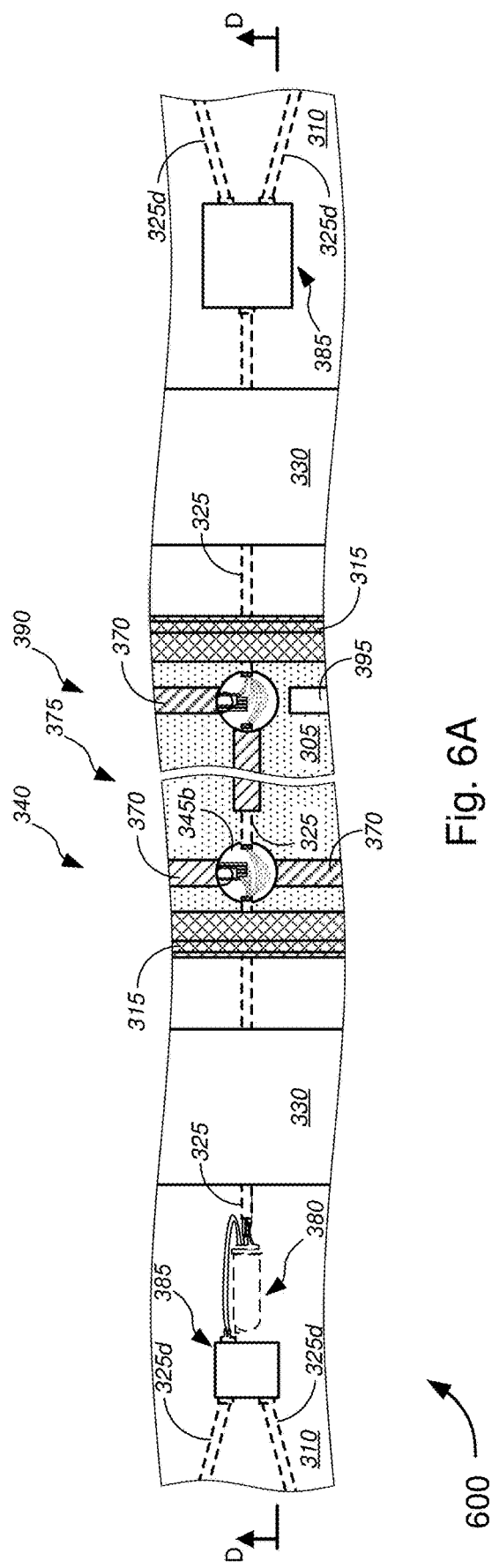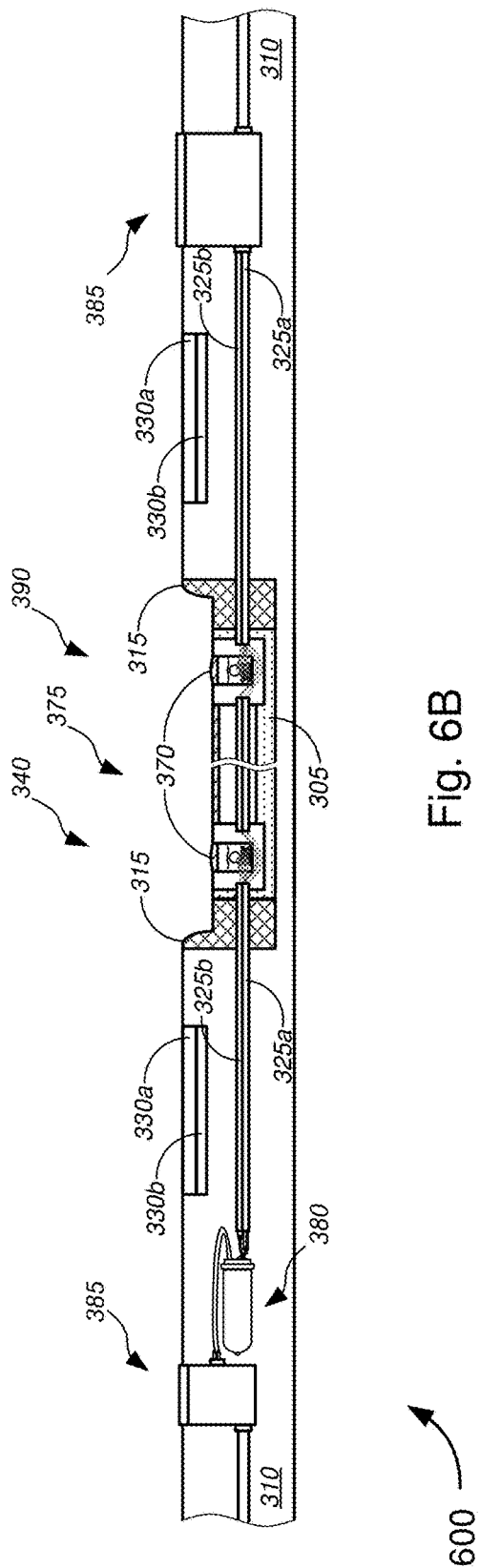

POINT-TO-POINT FIBER INSERTION

CROSS-REFERENCES TO RELATED APPLICATIONS

This application is a continuation application of U.S. patent application Ser. No. 14/578,851 (the "'851 application"), filed Dec. 22, 2014 by Michael L. Elford et al., entitled, "Point-to-Point Fiber Insertion," which claims priority to U.S. Patent Application Ser. No. 61/939,109 (the "'109 application"), filed Feb. 12, 2014 by Michael L. Elford et al., entitled, "Point-to-Point Fiber Insertion," the entire teachings of which are incorporated herein by reference in their entirety for all purposes.

This application may also be related to U.S. Patent Application Ser. No. 61/893,034 (the "'034 application"), filed Oct. 18, 2013 by Michael L. Elford et al., entitled, "Fiber-to-the-Home (FTTH) Methods and Systems"; U.S. patent application Ser. No. 14/517,574 (the "'574 application"), filed on Oct. 17, 2014 by Michael L. Elford et al., entitled, "Fiber-to-the-Premises (FTTP) Methods and Systems," which claims priority to the "'034 application"; U.S. Patent Application Ser. No. 61/874,691 (the "'691 application"), filed Sep. 6, 2013 by Thomas Schwengler et al., entitled, "Wireless Distribution Using Cabinets, Pedestals, and Hand Holes"; U.S. patent application Ser. No. 14/316,676 (the "'676 application"), filed on Jun. 26, 2014 by Thomas Schwengler et al., entitled, "Wireless Distribution Using Cabinets, Pedestals, and Hand Holes," "which claims priority to the '691 application"; U.S. Patent Application Ser. No. 61/861,216 (the "'216 application"), filed Aug. 1, 2013 by Thomas Schwengler et al., entitled, "Wireless Access Point in Pedestal or Hand Hole"; and U.S. patent application Ser. No. 14/316,665 (the "'665 application"), filed on Jun. 26, 2014 by Thomas Schwengler et al., entitled, "Wireless Access Point in Pedestal or Hand Hole," which claims priority to the '216 application. This application may also be related to U.S. Patent Application Ser. No. 61/604,020 (the "'020 application"), filed Feb. 28, 2012 by Michael L. Elford et al., entitled, "Apical Conduit and Methods of Using Same," U.S. Patent Application Ser. No. 61/636,227 (the "'227 application"), filed Apr. 20, 2012 by Michael L. Elford et al., entitled, "Apical Conduit and Methods of Using Same"; U.S. patent application Ser. No. 13/779,488 (the "'488 application"), filed Feb. 27, 2013 by Michael L. Elford et al., entitled, "Apical Conduit and Methods of Using Same," which claims priority to the '020 and '227 applications; U.S. Patent Application Ser. No. 61/793,514 (the "'514 application"), filed Mar. 15, 2013 by Erez N. Allouche et al., entitled, "Cast-in-Place Fiber Technology"; and U.S. patent application Ser. No. 14/209,754 (the "'754 application"), filed Mar. 13, 2014 by Erez N. Allouche et al., entitled, "Cast-in-Place Fiber Technology," which claims priority to the '514 application.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing telecommunications signal relays, and, more particularly, to methods, systems, and apparatuses for implementing point-to-point fiber insertion within a passive optical network ("PON") communications system.

BACKGROUND

Currently, when a customer chooses to change services, particularly to a fiber service rather than an existing fiber service and/or a cable or other service, technicians must be sent out to excavate and lay the appropriate fiber line to the customer premises associated with the requesting customer. This is a costly, time consuming, and inefficient process.

In a PON communications system (whether apical conduit-based or conventional (i.e., non-apical conduit-based)), fiber lines are already laid out and are coupled to a plurality of customer premises within a block or a neighborhood. To switch to a different service provider and/or a different fiber service would likewise require excavation and laying of the appropriate fiber line associated with the different service provider and/or the different fiber service. Accordingly, such a process is also costly, time consuming, and inefficient.

Hence, there is a need for more robust and scalable solutions for implementing point-to-point fiber insertion within a passive optical network ("PON") communications system, such as within FTTx systems (including FTTH, FTTB, FTTP, FTTN, FTTC, and/or the like), in particular, within apical conduit-based FTTx systems.

BRIEF SUMMARY

Various embodiments provide tools and techniques for implementing Fiber-to-the-Premises ("FTTP") and/or point-to-point fiber insertion within a passive optical network ("PON") communications system.

In some embodiments, the PON communications system, which might be associated with a first service provider or a first service, might include an F1 line(s) routed from a central office or DSLAM to a fiber distribution hub ("FDH") located within a block or neighborhood of customer premises, via at least an apical conduit source slot, an F2 line(s) routed, via any combination of apical conduit main slot(s), cross slot(s), far-side slot(s), missile bore(s), bore hole(s), and/or conduit(s) (collectively, "Apical Conduit Components"), to a network access point ("NAP") servicing one or more customer premises, and an F3 line(s) distributed, at the NAP and from the F2 Line(s), to a network interface device ("NID") or optical network terminal ("ONT") at each customer premises, via any combination of the Apical Conduit Components, which include channels in at least portions of roadways. Point-to-point fiber insertion of another F1 line(s), associated with a second service provider (i.e., other than the first service provider that established and/or maintains/operates the PON communications system) or a second service (including, but not limited to, an Ethernet fiber line service, a Gigabit PON ("GPON") service, an Ethernet PON ("EPON") service, a next generation PON ("NGPON") service, and/or a second generation NGPON or 40 Gbps-capable PON ("NGPON2") service, or the like), at either the NAP or the FDH (or outside these devices, yet within the apical conduit system or the PON communications system). In some cases, a multi-fiber F2 line (which comprises a "bundle" of optical fiber lines) might be "de-bundled" (or separated into the individual optical fiber lines) within a cable distribution device (e.g., a "red box device" or the like) in the NAP or FDH to isolate and insert the other F1 line service on a fiber-by-fiber basis for the multi-fiber F2 line. In some instances, since spare fiber lines are included in F2 lines, at least one of these spare fiber lines may be used for offering/providing the other F1 line service.

Some advantages of the systems described herein include, without limitation, relatively low costs, efficiency, flexibility, system strength and reliability, minimal ecological impact, visual unobstructiveness, and/or the like, especially in conjunction with the use of surface trenching techniques as applied to apical conduit systems and the use of ground-based signal distribution systems. Herein, surface trenching refers to a technique that is not unlike conventional micro-trenching techniques, except that trenching is within the top layer (e.g., asphalt layer or concrete layer, etc.) and not below the top layer. Because surface trenching for apical conduit systems require smaller profile channels or trenches compared to other buried solutions, labor costs and/or equipment costs may be kept low. Surface trenching also allows for flexibility in terms of routing and laying channels and surface trenches, relatively high system strength due to the use of polyurea and/or other thermosetting materials that have been proven in lab tests to have similar (and sometimes better) strength characteristics compared to asphalt (in which the channels or surface trenches are laid) thus leading to reliability, minimal ecological impact due to similar impact compared to asphalt and the like, efficiency in terms of implementing FTTP using apical conduit system techniques and in terms of line repair (as described above). Surface trenching also has an important advantage of better preserving the structural integrity of the road compared with micro-trenching, as it leaves intact the lower layers that are important for long term integrity of the road. Further, visual unobstructiveness may be achieved by the use of the apical conduit system laid in roadway and other ground surfaces, in conjunction with ground-based signal distribution devices, including a FDH (which includes a pedestal-based FDH with only its pedestal extending above ground surface or a non-pedestal FDH whose lid is substantially level with a ground surface), a NAP(s) (which may be a direct buried NAP that is completely underground), hand holes (whose lids may be substantially level with a ground surface), and/or the like.

With respect to the point-to-point fiber insertion aspect, advantages might include ease of inserting fiber service without disturbing the existing (apical conduit-based) ON communications system, in a manner that is quick, inexpensive, and efficient. In others, with implementation of the point-to-point fiber insertion techniques and systems described herein, conventional approaches requiring excavation (which requires surveying, actual excavation, laying of new optical lines and connections, inspections, and/or the like) may be obviated, thus achieving a "touchless" apical conduit-based PON communications system.

In an aspect, a method might comprise placing one or more first lines in one or more first channels in a first ground surface, placing one or more second lines in one or more second channels in a second ground surface, and placing a filler material in one or more of at least a portion of the one or more first channels or at least a portion of the one or more second channels. The one or more first lines might comprise a plurality of first optical fiber lines, and the plurality of first optical fiber lines might be associated with at least one of a first service provider or a first service. The one or more second lines might comprise a plurality of second optical fiber lines, and each of one or more second optical fiber lines of the plurality of second optical fiber lines might serve each of one or more customer premises of a plurality of customer premises. The method might also comprise communicatively coupling each of at least one first optical fiber line of the plurality of first optical fiber lines with each of the one or more second optical fiber lines of the plurality of second optical fiber lines via a first cable distribution device disposed within a signal distribution device disposed in a third ground surface. The method might further comprise communicatively coupling each of at least one third optical fiber line of a plurality of third optical fiber lines with each of at least one second optical fiber line of the plurality of second optical fiber lines via a second cable distribution device disposed within the signal distribution device. The plurality of third optical fiber lines might be associated with at least one of a second service provider or a second service.

According to some embodiments, the at least one second optical fiber line might be separate from the one or more second optical fiber lines, with each of the at least one second optical fiber line serving each of at least one customer premises of the plurality of customer premises. Alternatively, in some embodiments, the at least one second optical fiber line and at least one of the one or more second optical fiber lines might be the same optical fiber lines. In such embodiments, the at least one of the one or more second optical fiber lines might be communicatively coupled with corresponding one or more of the at least one first optical fiber line, and communicatively coupling each of the at least one third optical fiber line with each of the at least one second optical fiber line might comprise decoupling the at least one of the one or more second optical fiber lines from the corresponding one or more of the at least one first optical fiber line, coupling the corresponding one or more of the at least one first optical fiber line with unconnected terminal ports disposed within the signal distribution device, and communicatively coupling each of the at least one of the one or more second optical fiber lines with each of the at least one third optical fiber line.

In some cases, the signal distribution device might comprise a container that is disposed in the third ground surface, with a top portion of the container being one of substantially level with a top portion of the third ground surface or below the top portion of the third ground surface. Each of the first and second cable distribution devices might be disposed within the container. In alternative cases, the signal distribution device might comprise a container that is disposed in the third ground surface and a pedestal that is disposed above a top portion of the container. The top portion of the container might be one of substantially level with a top portion of the third ground surface or below the top portion of the third ground surface, and at least one of the first cable distribution device or the second cable distribution device might be disposed within one of the container or the pedestal.

In some instances, the first and second cable distribution devices might be the same cable distribution device. According to some embodiments, each of the one or more first lines or the one or more second lines might further comprise one or more of at least one conduit, at least one conductive signal line, or at least one power line via the container. The at least one conductive signal line might comprise at least one of one or more data cables, one or more video cables, or one or more voice cables.

In some embodiments, the method might further comprise placing one or more fourth lines in one or more third channels in the third ground surface. The one or more fourth lines might comprise a plurality of fourth optical fiber lines. The method might also comprise communicatively coupling, with a network access point ("NAP"), each of one or more fourth optical fiber lines of the plurality of fourth optical fiber lines with each of the one or more second optical fiber lines. The method might further comprise communicatively coupling each of the one or more fourth optical fiber lines with each of one or more optical network terminals ("ONTs") each disposed on an exterior surface of each of the one or more customer premises.

According to some embodiments, the signal distribution device might comprise a fiber distribution hub ("FDH"), and the one or more first lines might communicatively couple at least one of a central office or a digital subscriber line access multiplexer ("DSLAM") of a telecommunications service provider with the FDH. The one or more second lines might communicatively couple the FDH with a NAP. In alternative embodiments, the signal distribution device might comprise a NAP, and the one or more first lines might communicatively couple the NAP with a FDH. The one or more second lines might communicatively couple the NAP with one or more network interface devices ("NIDs") each disposed on an exterior surface of a customer premises of the plurality of customer premises. In some cases, the one or more NIDs comprise one or more ONTs. In some instances, each of the one or more second lines might comprise eight main optical fiber lines and four spare optical fiber lines, and communicatively coupling each of the at least one third optical fiber line with each of the at least one second optical fiber line might comprise communicatively coupling each of the at least one third optical fiber line with each of one or more of the four spare optical fiber lines.

Merely by way of example, in some aspects, each of the plurality of first optical fiber lines might be associated with one of a passive optical network ("PON") service or a gigabit PON ("GPON") service, while each of the at least one third optical fiber line might be associated with one of an Ethernet fiber line service, a second PON service (different from the PON service), a second GPON service (different from the GPON service), an Ethernet PON ("EPON") service, a next generation PON ("NGPON") service, or a second generation NGPON or 40 Gigabit-capable PON ("NGPON2") service.

In some embodiments, the filler material might comprise a thermosetting material. In some cases, the thermosetting material might include polyurea, or the like. In some instances, at least a portion of the first ground surface might be a roadway surface, at least a portion of the second ground surface might be one of a roadway surface or a non-roadway surface, and at least a portion of the third ground surface might be a non-roadway surface. According to some embodiments, the method might further comprise placing a capping material in the at least one of at least a portion of the one or more first channels or at least a portion of the one or more second channels, above the filler material. The capping material, in some instances, might serve as road lines on the roadway surface. In some cases, at least one channel of the one or more first channels and at least one channel of the one or more second channels might be the same channel.

In another aspect, a communications system might comprise an apical conduit system and a signal distribution device. The apical conduit system might comprise one or more first lines disposed in one or more first channels in a first ground surface, one or more second lines disposed in one or more second channels in a second ground surface, and a filler material disposed around at least one of the one or more first lines in at least a portion of the one or more first channels or around at least one of the one or more second lines in at least a portion of the one or more second channels. The one or more first lines might comprise a plurality of first optical fiber lines, and the plurality of first optical fiber lines might be associated with at least one of a first service provider or a first service. The one or more second lines might comprise a plurality of second optical fiber lines, and each of one or more second optical fiber lines of the plurality of second optical fiber lines might serve each of one or more customer premises of a plurality of customer premises. The signal distribution device might comprise a container disposed in a third ground surface, a first cable distribution device disposed within the signal distribution device, and a second cable distribution device disposed within the signal distribution device. A top portion of the container might be one of substantially level with a top portion of the third ground surface or below the top portion of the third ground surface. The first cable distribution device might be configured to communicatively couple each of at least one first optical fiber line of the plurality of first optical fiber lines with each of the one or more second optical fiber lines of the plurality of second optical fiber lines. The second cable distribution device might be configured to communicatively couple each of at least one third optical fiber line of a plurality of third optical fiber lines with each of at least one second optical fiber lines of the plurality of second optical fiber lines. The plurality of third optical fiber lines might be associated with at least one of a second service provider or a second service.

According to some embodiments, the at least one second optical fiber line might be separate from the one or more second optical fiber lines, and each of the at least one second optical fiber line might serve each of at least one customer premises of the plurality of customer premises.

In some embodiments, the signal distribution device might comprise a fiber distribution hub ("FDH"), and the one or more first lines might communicatively couple at least one of a central office or a digital subscriber line access multiplexer ("DSLAM") of a telecommunications service provider with the FDH. The one or more second lines might communicatively couple the FDH with a network access point ("NAP"). The fiber distribution hub might comprise a pedestal disposed above the top portion of the container, and at least one of the first cable distribution device or the second cable distribution device might be disposed within one of the container or the pedestal.

In alternative embodiments, the signal distribution device might comprise a NAP, and the one or more first lines might communicatively couple the NAP with a FDH. The one or more second lines might communicatively couple the NAP with one or more network interface devices ("NIDs") each disposed on an exterior surface of a customer premises of the plurality of customer premises. In some cases, the NAP might comprise a direct bury NAP disposed below the top portion of the third ground surface. In some instances, the NAP might comprise a NAP disposed within one of a hand hole or a flowerpot hand hole that is at least partially disposed below the third ground surface. In some embodiments, the one or more NIDs might comprise at least one optical network terminal ("ONT"). According to some embodiments, each of the plurality of first optical fiber lines might be associated with one of a passive optical network ("PON") service or a gigabit PON ("GPON") service, while each of the at least one third optical fiber line might be associated with one of an Ethernet fiber line service, a second PON service, a second GPON service, an Ethernet PON ("EPON") service, a next generation PON ("NG-PON") service, or a second generation NGPON or 40 Gigabit-capable PON ("NGPON2") service.

In yet another aspect, a method might be provided for implementing point-to-point fiber insertion within a passive optical network ("PON") communications system. The PON communications system might comprise an apical conduit system which might comprise one or more first lines disposed in one or more first channels in a first ground surface, one or more second lines disposed in one or more second channels in a second ground surface, and a filler material disposed around at least one of the one or more first lines in at least a portion of the one or more first channels or around at least one of the one or more second lines in at least a portion of the one or more second channels. The one or more first lines might comprise a plurality of first optical fiber lines, and the plurality of first optical fiber lines being associated with at least one of a first service provider or a first service. The one or more second lines might comprise a plurality of second optical fiber lines, and each of one or more second optical fiber lines of the plurality of second optical fiber lines might serve each of one or more customer premises of a plurality of customer premises. The method might comprise receiving, from a subscriber associated with a customer premises among the plurality of customer premises that are connected via the apical conduit system to the PON communication system, a request to receive through the PON communication system a second service separate from the first service. The second service might be associated with one of the first service provider or a second service provider. The method might further comprise communicatively coupling a second optical fiber line of the one or more second optical fiber lines with a third optical fiber line of a plurality of third optical fiber lines associated with the second service. The second optical fiber line might serve the customer premises associated with the subscriber.

According to some embodiments, the second optical fiber line might be communicatively coupled to a corresponding first optical fiber line of the plurality of first optical fiber lines, and communicatively coupling the second optical fiber line with the third optical fiber line might comprise decoupling the second optical fiber line from the corresponding first optical fiber line, coupling the corresponding first optical fiber line with an unconnected terminal port disposed within a signal distribution device, and communicatively coupling the second optical fiber line with the third optical fiber line.

In some embodiments, the signal distribution device might comprise a fiber distribution hub ("FDH"), and the one or more first lines might communicatively couple at least one of a central office or a digital subscriber line access multiplexer ("DSLAM") of a telecommunications service provider with the FDH. The one or more second lines might communicatively couple the FDH with a network access point ("NAP"). In alternatively embodiments, the signal distribution device might comprise a NAP, and the one or more first lines might communicatively couple the NAP with a FDH. The one or more second lines might communicatively couple the NAP with one or more optical network terminals ("ONTs") each disposed on an exterior surface of a customer premises of the plurality of customer premises.

Merely by way of example, in some cases, each of the plurality of first optical fiber lines might be associated with one of a passive optical network ("PON") service or a gigabit PON ("GPON") service, while each of the at least one third optical fiber line might be associated with one of an Ethernet fiber line service, a second PON service, a second GPON service, an Ethernet PON ("EPON") service, a next generation PON ("NGPON") service, or a second generation NGPON or 40 Gigabit-capable PON ("NGPON2") service.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 2A-2J are general schematic diagrams illustrating various ground-based signal distribution devices that may be used in implementing FTTP and/or point-to-point fiber insertion within a PON communications system, in accordance with various embodiments.

FIGS. 3A-3D are general schematic diagrams illustrating various views of a system for communicatively coupling lines within an apical conduit system and lines within a fiber distribution hub ("FDH") for implementing FTTP and/or point-to-point fiber insertion within a PON communications system, in accordance with various embodiments.

FIGS. 4A and 4B are general schematic diagrams illustrating various views of a system for communicatively coupling lines within an apical conduit system and lines within a direct bury network access point ("NAP") for implementing FTTP and/or point-to-point fiber insertion within a PON communications system, in accordance with various embodiments.

FIGS. 5A and 5B are general schematic diagrams illustrating various views of a system for communicatively coupling lines within an apical conduit system and lines within a hand hole for implementing FTTP and/or point-to-point fiber insertion within a PON communications system, in accordance with various embodiments.

FIGS. 6A and 6B are general schematic diagrams illustrating various views of a system for communicatively coupling lines within an apical conduit system and lines within a hand hole routed from a NAP through a cross-slot in a road surface for implementing FTTP and/or point-to-point fiber insertion within a PON communications system, in accordance with various embodiments.

DETAILED DESCRIPTION OF CERTAIN EMBODIMENTS

Figure 1A:
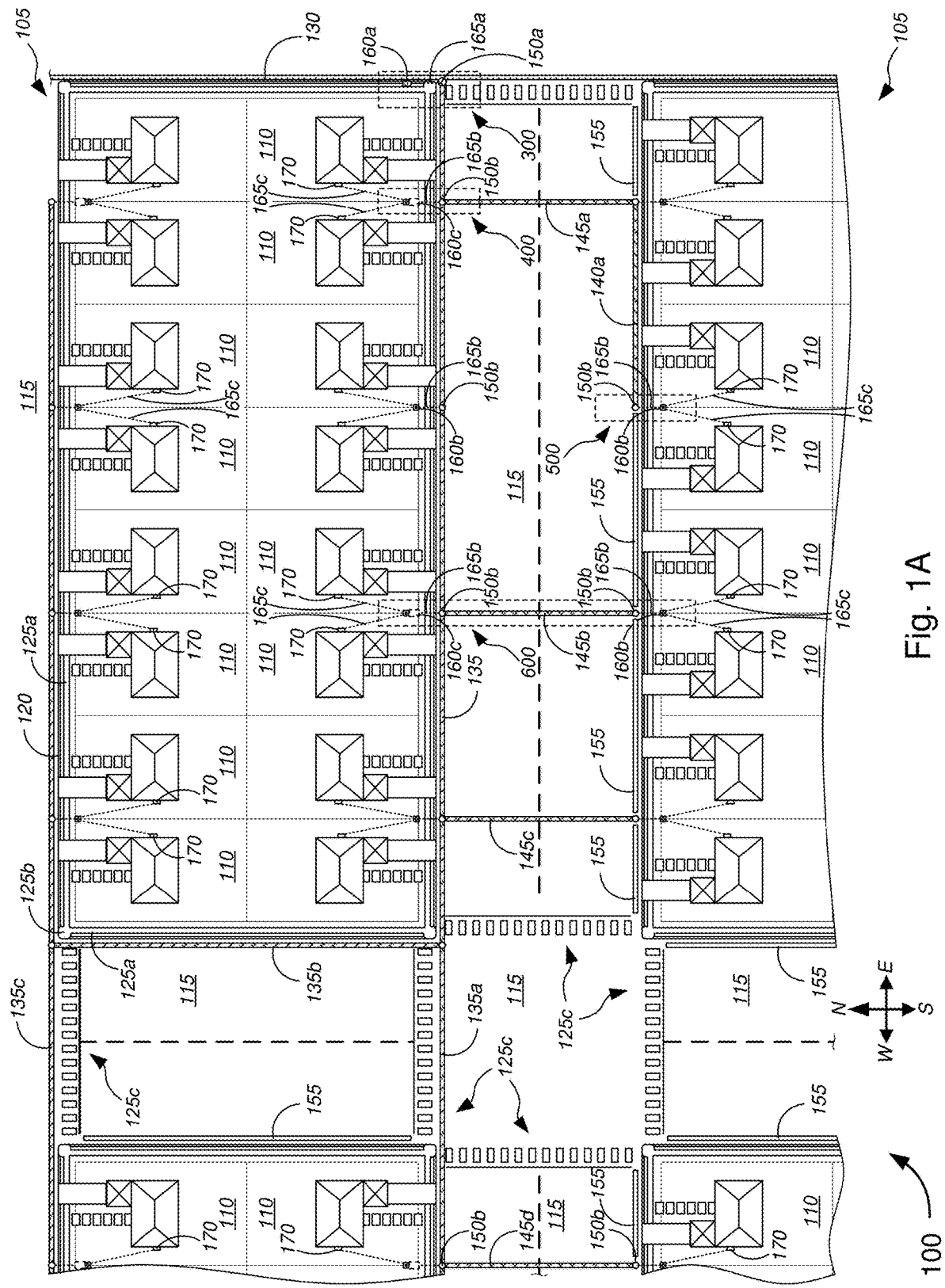
FIGS. 1A and 1B are general schematic diagrams illustrating systems for implementing Fiber-to-the-Premises ("FTTP") and/or point-to-point fiber insertion within a passive optical network ("PON") communications system, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments provide tools and techniques for implementing telecommunications signal relays, and, in some embodiments, for implementing point-to-point fiber insertion within a PON communications system.

In various embodiments, the PON communications system might include implementation of FTTx, which might include Fiber-to-the-Home ("FTTH"), Fiber-to-the-Building ("FTTB"), Fiber-to-the-Premises ("FTTP"), Fiber-to-the-Node ("FTTN"), Fiber-to-the-Curb ("FTTC"), and/or the like.

In some embodiments, a method might include routing an F1 line(s) from one of a central office ("CO"), a digital subscriber line access multiplexer ("DSLAM"), and/or near/within a block or neighborhood of customer premises (collectively, "source"), to a fiber distribution hub ("FDH") located within the block or neighborhood of customer premises, via at least an apical conduit source slot. From the FDH, an F2 line(s) might be routed, via any combination of apical conduit main slot(s), cross slot(s), far-side slot(s), missile bore(s), bore hole(s), and/or conduit(s) (collectively, "Apical Conduit Components"), to a network access point ("NAP") servicing one or more customer premises. An F3 line(s) might be distributed, at the NAP and from the F2 line(s), to a network interface device ("NID") or optical network terminal ("ONT") at each customer premises, via any combination of the Apical Conduit Components, which might include channels in at least portions of roadways. Each of the F1, F2, and F3 lines might provide single direction communication or bi-directional communication.

In some embodiments, the F1, F2, and F3 lines might each include at least one optical fiber line. In some cases, the F1, F2, and F3 lines might each further include, without limitation, one or more of at least one conductive signal line, at least one power line, and/or the like. The at least one conductive signal line might include, but are not limited to, copper data lines, copper video lines, copper voice lines, or any suitable (non-optical fiber) data cables, (non-optical fiber) video cables, or (non-optical fiber) voice cables, and/or the like.

With respect to the optical fiber lines in each of the F1, F2, and F3 lines in various embodiments, F3 lines (being distributed from a NAP to a NID or ONT), might include two single fiber lines (for duplex communication) that may be bundled as a single cable, which for simplicity below might be referred to as a "single bundled fiber line," "single bundled (duplex) fiber line," or "single bundled duplex fiber line." In some instances, such single bundled fiber line might be used for Ethernet fiber communications, or the like. In some embodiments, a single fiber line might be configured for duplex communication by sending communications in one direction (e.g., downstream (i.e., for "downloading") from CO (and a network such as, but not limited to, the Internet or the like) to customer premises) using one wavelength (or range of wavelengths), while sending communications in the opposite direction (e.g., upstream (i.e., for "uploading") from the customer premises to the CO (and to the Internet or some other network)) using a different wavelength (or range of wavelengths). For simplicity below, such single fiber line might be referred to as a "single fiber line," "single (duplex) fiber line," or "single duplex fiber line."

In some embodiments, an F2 line for PON communications (being distributed from a FDH to a NAP) might include 12 single (duplex) fiber lines. In some instances, the NAP might be an 8 port NAP. Here, "8 port" in 8 port NAP might refer to 8 output ports (each of which is communicatively coupled to a NID/ONT of a customer premises via a F3 line). Unless otherwise indicated (such as with respect to FIG. 1B), single duplex fiber lines and corresponding ports are referred to herein, with appropriate equipment for sending communications in one direction using one wavelength (or one range of wavelengths) and sending communications in the opposite direction using a different wavelength (or different range of wavelengths). For an 8 port NAP to which the F2 line might be communicatively coupled, 8 single (duplex) fiber lines might be connected to 8 output ports, while 4 single (duplex) fiber lines might be unconnected or connected to dummy ports (i.e., ports that do not connect to any other component). The four unconnected lines might be referred to as "spare lines" or "spare fiber lines."

According to some aspects, an F1 line (being distributed from a CO to a FDH) might include a cable bundle having fiber lines. In some cases, the cable bundle might include 16 to 24 cables, each having a fiber line (in some cases, a single (duplex) fiber line; while, in other cases, a single bundled (duplex) fiber line (e.g., for Ethernet fiber service or the like)). In other cases, any suitable number of cables may be used, with any suitable number of fiber lines (i.e., not limited to 16 to 24 cables), as appropriate or as desired.

Herein, "red box device" might refer to a cable distribution device that takes an F2 line and isolates, separates, or "de-bundles" the 12 fiber lines therein (i.e., input lines) for individual connection with 12 ports/fiber lines (i.e., output lines/ports), and subsequently combined into another F2 line. In the red box device, any one or more of the 12 input lines may be connected to dummy ports (also referred to as ports within a "parking lot") within the red box device, and additional fiber lines (e.g., for other services and/or from other service providers) might be received by the red box device and connected with the output line to which the one or more of the 12 input lines would have been connected. In other words, the red box device allows for individual fiber line connection with an additional fiber line for point-to-point fiber insertion implementation for fiber cable bundles (such as F2 lines). In some embodiments, the red box device may be located within a FDH, while, in other embodiments, the red box device might be located anywhere in the apical conduit system or in the PON communications system along which the F2 line(s) are placed. By implementing red box devices for point-to-point insertion of a different fiber service (including, but not limited to, an Ethernet fiber line service, a next generation PON ("NGPON") service, and/or a second NGPON ("NGPON2") service, or the like; in some cases, by a different service provider than the one that established or is maintaining/operating the PON communications system) and/or other techniques described herein, "touchless" apical or FTTx may be achieved. That is, excavation to replace or add the addition fiber lines for the additional services (which may be from the same service provider or a different one) may be obviated, thereby eliminating the need for surveying, laying of new optical lines and connections, inspections, and/or the like, and thus reducing cost and time in the long run, although initial investment in the infrastructure is necessary to lay all the lines for the PON communications system and/or the apical conduit system.

Herein, "connector" might refer to any suitable connector. For fiber lines, suitable connectors might include, without limitation, SC connectors (also referred to as "subscriber connectors," "square connectors," or "standard connectors"), LC connectors (also referred to as "Lucent connectors," "little connector," or "local connector), ST connectors (also referred to as "Straight Tip connectors"), FC connectors (also referred to as "Ferrule connectors"), MT connectors (also referred to as "Mechanical Transfer connectors"), MT-RJ connectors (also referred to as "Mechanical Transfer Registered Jack connectors"), MPO/MTP connectors (in which MPO connectors are also referred to as "multiple-fiber push-on/pull-off connectors"; and MTP is a connector that interconnects with MPO connectors), or the like. A LC connector, a ST connector, and a FC connector might each allow for connection of one single (duplex) fiber line with another, and thus might be used for connecting F1 or F3 lines, either to each other or to a corresponding port. A MPO/MTP connector might allow for connection of a set of 12 single (duplex or simplex) fiber line with another set of 12 single (duplex or simplex) fiber line with another, and thus are used for connecting F2 lines, either to each other or to a corresponding port. MT connectors allow for connection of one set of multiple fiber lines with another set of multiple fiber lines, while MT-RJ connectors allow for connection of 2 fiber lines with another 2 fiber lines. In some cases, an MPO/MTP connector might allow for connection of a set of 4 to 24 fibers with another set of 4 to 24 fibers. A SC connector (which might include an angled physical contact SC ("SC/APC") connector, an ultra polished contact SC ("SC/UPC") connector, or the like), like the LC connector, the ST connector, or the FC connector, might allow for connection of a single (duplex) fiber line with another, and are used for connecting F1 lines to (optical) splitter devices that "split" or divide signals in a single fiber (typically, evenly) into signals in multiple fibers (as described in detail below).

These different connector standard types of boots (e.g., ST, FC, SC, LC, etc.) are different designs aimed at minimizing face rotation of the fiber edge, and containing spring loads for the ferrules to maintain contact with light pressure. An alignment sleeve insures good alignment and angle matching. Actual fiber core connection types also vary, independent of boot style; the different connection types, PC, UPC, or APC, have different designs and characteristics of the fiber end-faces. PC or "physical contact" connectors are connectors using a spring loaded ferrule to maintain good physical contact between fiber end surfaces, and minimize reflection and loss caused by irregularities and dielectric discontinuities between the fiber faces. UPC or "ultra polished" contacts are machine-polished rounded finish, and are designed to provide good core contact and to further improve insertion loss and return loss characteristics. APC or "angled physical contact" connectors have a connecting surface angled (at approximately 8 degrees) which causes reflected modes to decay; they provide the best return loss characteristics.

Merely by way of example, in some embodiments, antenna structures might be implemented to optimize transmission and reception of wireless signals from ground-based signal distribution devices, which include, but are not limited to, FDH, hand holes, and/or NAPs. In some cases, antenna structures might also be implemented within devices (e.g., wireless access point devices) that are imbedded or located within apical conduit channels, as described in detail in the '574 application. Wireless applications with such devices and systems might include, without limitation, wireless signal transmission and reception in accordance with IEEE 802.11a/b/g/n/ac/ad/af standards, UMTS, CDMA, LTE, PCS, AWS, EAS, BRS, and/or the like. In some embodiments, an antenna might be provided within a signal distribution device, which might include a container disposed in a ground surface. A top portion of the container might be substantially level with a top portion of the ground surface. The antenna might be communicatively coupled to one or more of at least one conduit, at least one optical fiber line, at least one conductive signal line, or at least one power line via the container and via an apical conduit system(s) installed in a roadway.

According to some embodiments, the methods, apparatuses, and systems might be applied to 2.4 GHz and 5 GHz wireless broadband signal distribution as used with today's IEEE 802.11a/b/g/n/ac lines of products. Given the low profile devices, such methods, apparatuses, and systems may also be applicable to upcoming TV white spaces applications (and the corresponding IEEE 802.11af standard). In addition, small cells at 600 MHz and 700 MHz may be well-suited for use with these devices. In some embodiments, higher frequencies can be used such as 60 GHz and the corresponding standard IEEE 802.11ad. The '574, '216, and '665 applications, which have been incorporated herein by reference in their entirety, describe in further detail embodiments utilizing wireless access points based on IEEE 802.11ad and a system of ground-based signal distribution devices having these 60 GHz wireless access points disposed therein that are in line of sight of the customer premises. Methods for placing, powering, and backhauling radio access units using a combination of existing copper lines, cabinets, pedestals, hand holes, new power lines, new optical fiber connections to the customer premises, placement of radio equipment in pedestals or hand holes, and/or the like, via use of apical conduit systems are described in detail in the '034, '574, '691, '676, '216, and '665 applications, which are already incorporated herein by reference in their entirely.

According to some embodiments, a method may be provided for repairing any damage to any of the lines within apical conduit systems. Such a method might include locating the damage in the lines, removing the capping material over a predetermined length (e.g., 30 ft) approximately centered about the damage in the line, removing the filler material encapsulating the damaged line(s) and/or microduct(s) to expose first ends and second ends of the damaged line(s) and/or microduct(s), and lifting the first ends and the second ends of the damaged line(s) and/or microduct(s) from the channel of the source/main/cross/far-side slot of the apical conduit system. The method might further include, without limitation, splicing the first ends and the second ends of the damaged line(s) and/or microduct(s) with splices (and in some cases, service loops), placing the spliced damaged line(s) and/or microduct(s) in the channel (in some instances, within a splice box that has been placed in the channel, e.g., during the repair process), placing the filler material in the channel, and placing the capping material in the channel over the filler material. Such repair techniques are described in detail in the '574 application.

Some advantages of the systems described herein include, without limitation, relatively low cost, efficiency, flexibility, system strength and reliability, minimal ecological impact, visual unobstructiveness, and/or the like, especially in conjunction with the use of surface trenching techniques as applied to apical conduit systems and the use of ground-based signal distribution systems. Herein, surface trenching refers to a technique that is not unlike conventional micro-trenching techniques, except that trenching is within the top layer (e.g., asphalt layer or concrete layer, etc.) and not below the top layer. In conventional micro-trenching techniques, trenches might extend 12 to 18 inches below the surface of the top layer, and in some cases deeper (reaching below the top layer into or beyond a sub-base layer). In contrast, for surface trenching, trenches might extend a few inches (e.g., 2 to 6 inches), while remaining within the top layer (and not deeper than the top layer). Because surface trenching for apical conduit systems require smaller profile channels or trenches compared to other buried solutions, labor costs and/or equipment costs may be kept low. Surface trenching also allows for flexibility in terms of routing and laying channels and surface trenches, relatively high system strength due to the use of polyurea and/or other thermosetting materials that have been proven in lab tests to have similar (and sometimes better) strength characteristics compared to asphalt (in which the channels or surface trenches are laid) thus leading to reliability, minimal ecological impact due to similar impact compared to asphalt and the like, efficiency in terms of implementing FTTP using apical conduit system techniques and in terms of line repair (as described above). Further, visual unobstructiveness may be achieved by the use of the apical conduit system laid in roadway and other ground surfaces, in conjunction with ground-based signal distribution devices, including a FDH (which includes a pedestal-based FDH with only its pedestal extending above ground surface or a non-pedestal FDH whose lid is substantially level with a ground surface), a NAP(s) (which may be a direct buried NAP that is completely underground), hand holes (whose lids may be substantially level with a ground surface), and/or the like.

Telecommunications companies have precious assets in the ground, and deploy more. The various embodiments herein utilize these assets (and, in some cases, minimal radio infrastructure costs to overlay a fiber or copper plant or network with wireless broadband) to overlay one or more networks distributed within one or more apical conduit systems. In so doing, a cost effective fiber and cable network, with a network for backhaul, may be provided.

In some embodiments, the various embodiments described herein may be applicable to brownfield copper plants, to greenfield fiber roll-outs, and/or the like. Herein, "brownfield" might refer to land on which industrial or commercial facilities are converted (and in some cases decontaminated or otherwise remediated) into residential buildings (or other commercial facilities; e.g., commercial offices, etc.), while "greenfield" might refer to undeveloped land in a city or rural area that is used for agriculture, used for landscape design, or left to naturally evolve. In the telecommunications context, "brownfield" might also refer to land on which a telecommunications company might have some existing facilities and/or inventory (e.g., copper, etc.) and may not require converting the land and/or repurposing commercial facilities, while "greenfield" might also refer to land (which may have existing buildings) on which the telecommunications company might not already have some existing facilities, inventory, and/or services and might require converting the land and/or repurposing commercial or other facilities.

We now turn to the embodiments as illustrated by the drawings. FIGS. 1-12 illustrate some of the features of the method, system, and apparatus for implementing telecommunications signal relays, and, in some embodiments, for implementing point-to-point fiber insertion within a passive optical network ("PON") communications system, as referred to above. The methods, systems, and apparatuses illustrated by FIGS. 1-12 refer to examples of different embodiments that include various components and steps, which can be considered alternatives or which can be used in conjunction with one another in the various embodiments. The description of the illustrated methods, systems, and apparatuses shown in FIGS. 1-12 is provided for purposes of illustration and should not be considered to limit the scope of the different embodiments.

Throughout these embodiments, wireless access points—such as ones operating under any of the IEEE 802.11a/b/g/n/ac/ad/af standards discussed above, and described in detail in the '034, '574, '691, '676, '216, and '665 applications, which are already incorporated herein by reference in their entirely—may be implemented in any of the ground-based signal distribution devices (including, without limitation, the FDH, the NAPs, the handholes, the NIDs, the ONTs, and/or the like). In some embodiments, wireless access points may be disposed within compact devices that are disposed within apical conduit channels, at the top of apical conduit channels, or near the top of apical conduit channels, as described in detail in the '574 application. In some cases, some or all of these wireless access points may be powered by power lines that are disposed along with the signal lines or fiber lines within the apical conduit system, and such powering of wireless access points is described in detail in the '691 and '676 applications, already incorporated herein by reference in their entirety. The wireless access points may be part of small cells, micro cells, femto cells, pico cells, and/or the like, as appropriate or desired.

Figure 1B:
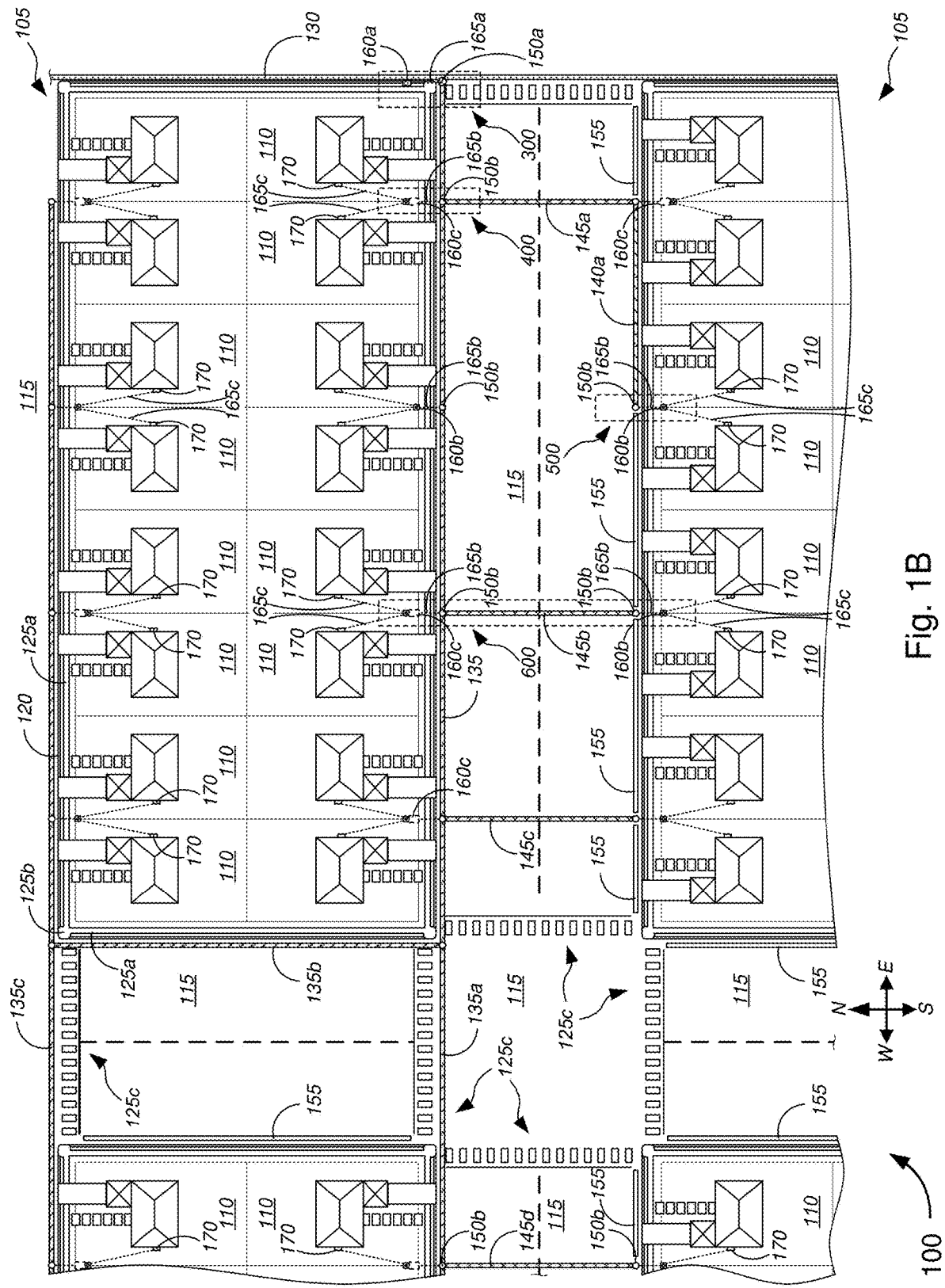

With reference to the figures, FIGS. 1A and 1B (collectively, "FIG. 1") are general schematic diagrams illustrating systems 100 for implementing Fiber-to-the-Premises ("FTTP") and/or point-to-point fiber insertion within a passive optical network ("PON") communications system, in accordance with various embodiments. For simplifying the illustration, the customer premises 110 are shown to be in a grid-like block pattern, and are shown to be of similar design and build. The grid-like block of customer premises is also shown to be oriented along particular cardinal directions (i.e., north, south, east, and west), as indicated in FIG. 1. However, the various embodiments are not so limited, and any arrangement of customer premises (of any variety of sizes and builds) may be applicable, in any arrangement or orientation with respect to the cardinal directions, as appropriate or desired. Moreover, the tools and techniques described herein may be implemented for established neighborhoods/blocks of customer premises or newly constructed ones.

Further, the various embodiments allow for any layout and arrangement of the apical conduit system and components (including, without limitation, source slot, main slot(s), cross-slots, far-side slots, bore holes, missile bores, and/or the like), not necessarily as shown in FIG. 1; the particular layout and arrangement of the apical conduit system and components in FIG. 1 represents only one particular set of embodiments. Although FIG. 1 shows a plurality of customer premises that are single-family home residences within a neighborhood setting, the various embodiments are not so limited, and the various systems and methods described with respect to FIG. 1 may be applicable to any arrangement and type of customer premises (including, without limitation, customer residences, multi-dwelling units ("MDUs"), commercial customer premises, industrial customer premises, and/or the like) within one or more blocks of customer premises (e.g., residential neighborhoods, university/college campuses, office blocks, industrial parks, mixed-use zoning areas, and/or the like), in which roadways and/or pathways might be adjacent to each of the customer premises.

With reference to the different embodiments shown in FIGS. 1A and 1B, FIG. 1A depicts an embodiment in which each network access point ("NAP") 160c is configured to serve more customer premises (i.e., 8 houses in the example of FIG. 1), and thus fewer NAPs 160c need be deployed. FIG. 1B depicts an embodiment in which each NAP 160c is configured to serve relatively fewer customer premises (i.e., 4 houses in the example of FIG. 1), and thus more NAPs 160c are deployed. In some embodiments, the use of simplex or duplex fiber optic lines might determine how many ports each NAP might have, and thus how many customer premises can be served by each NAP; of course, the use of duplex lines allows for double the capacity, and thus can serve more customer premises compared with simplex lines. According to some embodiments, FIG. 1A might represent a system that incorporates a PON communications system, which utilizes single (duplex) fiber connections to the customer premises 110, and thus may require only 1 single (duplex) fiber line to be routed from the NAP 160c to each customer premises 110 (i.e., to the NID or ONT of the customer premises 110). In some cases, a second single (duplex) fiber line might be routed along with the first single (duplex) fiber line to serve as a backup or to allow for other services that require simplex connections. In some embodiments, FIG. 1B might represent either a PON communications system having 2 single (duplex) fiber lines (one of which serves as a backup) or a service that requires simplex fiber connections (including, but not limited to Ethernet fiber connections, which requires separate simplex fiber connections for uploading and downloading data). The embodiments of FIGS. 1A and 1B would otherwise be similar, if not identical, in terms of functionality, operation, and deployment. The various embodiments, however, are not limited to either embodiments shown in FIGS. 1A and 1B, and the NAPs 160c can each be configured to serve any suitable number of customer premises.

In the non-limiting examples of FIG. 1, blocks 105 might each have located thereon one or more customer premises 110 (which are depicted as single-family homes in FIG. 1, for the sake of illustration). Some of the one or more customer premises 110 might include an attached or detached garage and a driveway, which connects the garage to a roadway 115. Herein, "roadway" might refer to any type of path on which people, vehicles, and the like might travel, and might include asphalt roads, concrete roads, and/or the like. Each block 105 might include a curb 120 along at least portions of the perimeter of the block 105, as well as pathways 125 (which might include, without limitation, sidewalks 125a, street-corner sidewalks 125b, and crosswalks 125c, and/or the like). According to some embodiments, pathways 125 might be made of materials including, but not limited to, asphalt, concrete, pavers, tiles, stone, and/or the like. In some cases, the areas bordered and defined by curb 120, sidewalks 125a, and street-corner sidewalks 125b might include grassy areas, mulch-filled areas, and/or gravel-filled areas (in some cases, with one or more trees, one or more shrubs, and/or one or more hedges, or the like). In some instances, sidewalks 125a might extend toward, and might be positioned immediately adjacent to, curb 120.

System 100, as shown in FIG. 1, might include, on roadway 115, apical conduit source slot 130, one or more apical conduit main slots 135, one or more apical conduit far-side slots 140, one or more apical conduit cross slots 145, road bores 150, road lines 155, and/or the like. Herein, "apical conduit" might refer to any type of conduit, groove, or channel disposed in a ground surface (particularly, a roadway or pathway surface), in which one or more lines are disposed. The one or more lines might include, without limitation, at least one of one or more conduits, one or more optical fiber cables, one or more conductive signal lines, one or more power lines, and/or the like. The conduit, groove, or channel may be covered with a filler material, including, but not limited to, a thermosetting material (which might include polyurea or the like). In some cases, a capping material might be placed on top of the filler material of the apical conduit, and the capping material might be set to have particular colors, so as to additionally serve as road lines on a roadway surface. In some embodiments, there might be a gap between road lines 155 and any of the apical conduit slots 130-145, while, in some instances, road lines 155 might be extended to abut adjacent apical conduit slots 130-145. According to some embodiments, colored capping material might be used to fill at least a portion of the channel, as well as to extend further along the surface of the roadway to serve as a continuous road line.

Road bores 150 provide vertical access, from a top surface of roadway 115, to the one or more lines disposed within (typically at or near the bottom of) the groove or channel of the apical conduit slots, and can be filled with the filler and/or capping material similar to any of the apical conduit slots 130-145. In some embodiments, road bores 150 might have diameters ranging from ~0.5 inches (~1.3 cm) to ~6 inches (~15.2 cm), preferably ~6 inches (~15.2 cm) for road bores 150 near FDHs, cabinets, and/or the like, and preferably ~2 inches (~5.1 cm) for most other road bores 150.

In the example of FIG. 1, the source slot 130 might extend from a central office ("CO"), a digital subscriber line access multiplexer ("DSLAM"), and/or near/within a block or neighborhood of customer premises (collectively, "source"), extending along, under, or beside portions of a curb (e.g., curb 120). The source slot 130 might carry (or might otherwise have placed in a channel therein) at least one line from the source, including, without limitation, one or more F-1 fiber cables, and/or the like. In some embodiments, the at least one line might further comprise, but is not limited to, at least one of one or more conductive signal lines, one or more power lines, and/or the like.

Further, in the embodiment of FIG. 1, the main slot 135 might extend along a significant length of roadway 115, disposed close to one of the curbs 120 of one of the blocks 105, while far-side slot 140 extends along a shorter length of roadway 115 on the side of the roadway 115 opposite to the side along which the main slot 135 is disposed. Cross slots 145 connect main slot 135 with far-side slot 140, and thus are disposed across an approximate width of the roadway 115. Although main slot 135 and far-side slot 140 are shown in FIG. 1 to be parallel to each other, they may be at any suitable angle with respect to each other, so long as they are at appropriate positions along the roadway 115 and/or beside curb 120 (e.g., in some cases, to serve as road lines, or the like, which in some cases might mean that one of the main slot 135 or the far-side slot 140 is positioned in the middle of the roadway 115 to serve as a middle road line). Although cross slots 145 are shown in FIG. 1 as being perpendicular to at least one of main slot 135 and far-side slot 140, cross slots 145 may be at any suitable angle relative to one or both of main slot 135 and far-side slot 140, so long as cross slots 145 connect main slot 135 with far-side slot 140, such that the one or more lines may be appropriately routed through these slots 130-145.

In some embodiments, one or more ground-based distribution devices 160 might be provided to service one or more customer premises 110. The one or more lines disposed in the apical conduit slots 130-145 might be routed underground, via conduits, missile bores, or the like (collectively, "conduits 165"), to containers of each of the one or more ground-based distribution devices 160, in a manner as described in detail with respect to FIGS. 1-4 as described in detail in the '676 application, which has already been incorporated herein by reference in its entirety. In some embodiments, conduits 165c might be provided below ground between a container of a ground-based distribution device 160 to a position below and near a NID or ONT 170 that is mounted on an exterior wall of a customer premises. In some cases, conduits 165c might extend from the position below and near the NID or ONT 170 to communicatively couple with the appropriate wiring connections (i.e., with the optical fiber connections, conductive signal connections, and/or the like) within the NID or ONT 170. Although shown in FIG. 1 as being a direct route between the position near the NID or ONT 170 and the container of the ground-based distribution device 160, conduit 165c may be at right-angles, may be curved, and/or might follow other routes. In some embodiments, the ground-based distribution device 160 might include, without limitation, a FDH platform 160a, a hand hole 160b, a NAP 160c (which might be an above-surface platform NAP, a sub-surface NAP (which might extend from above the surface to below the surface), or a direct-bury NAP, or the like), and/or the like. Although the FDH platform 160a is shown communicatively coupled to the apical conduit system through the main slot 135, in some embodiments, the FDH platform 160a may be coupled to the apical conduit system through the source slot 130. In some instances, the FDH platform 160a might link two or more apical conduit systems (either through the main slots and/or source slots of these systems).

In some embodiments, the combination of main slot 135, far-side slot 140, and/or cross slots 145 might form particular configurations including, without limitation, an "h" configuration (i.e., as shown in the combination of main slot 135, far-side slot 140a, and cross slot 145a in FIG. 1), a "c" configuration (i.e., as shown in the combination of main slot 135 and cross slots 145b and 145c in FIG. 1), and/or the like. The "h" and "c" configurations each provide ways of routing lines from NAP 160c to hand holes 160b on the opposite side of roadway 115 to service NIDs and ONTs 170 across the road 115. Any other suitable configuration may be implemented, however.

Figure 2D:
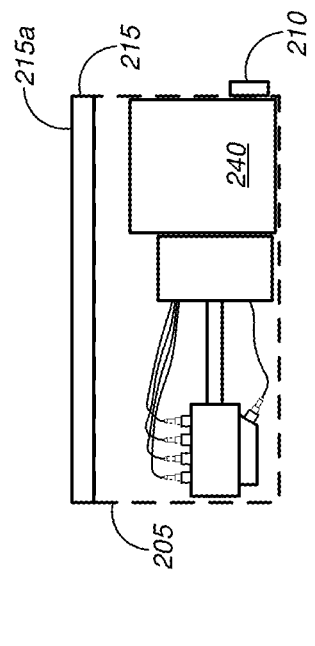
Figure 2C:
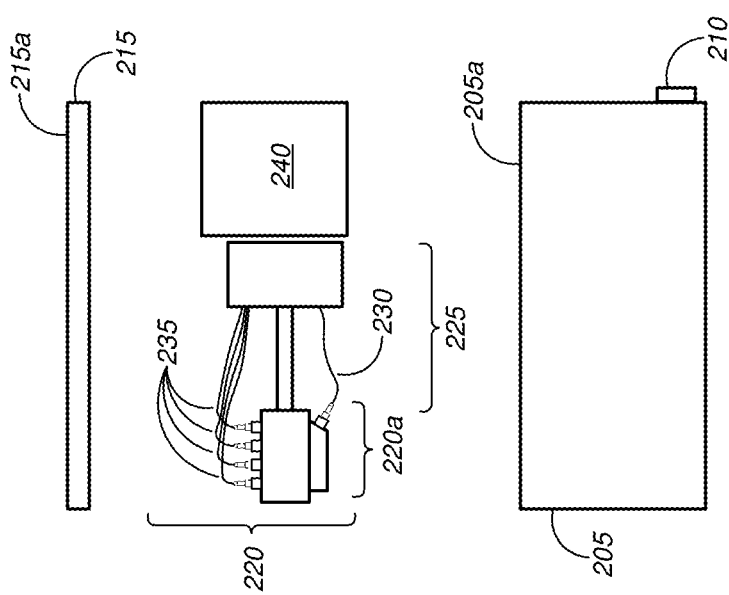
Figure 2E:
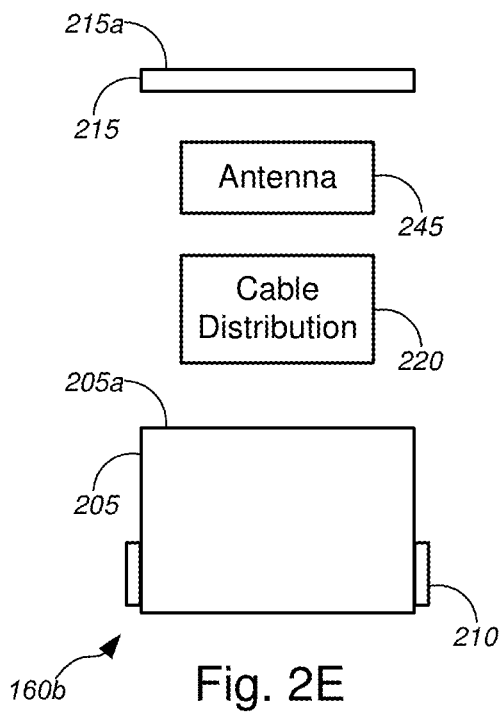
Figure 2F:
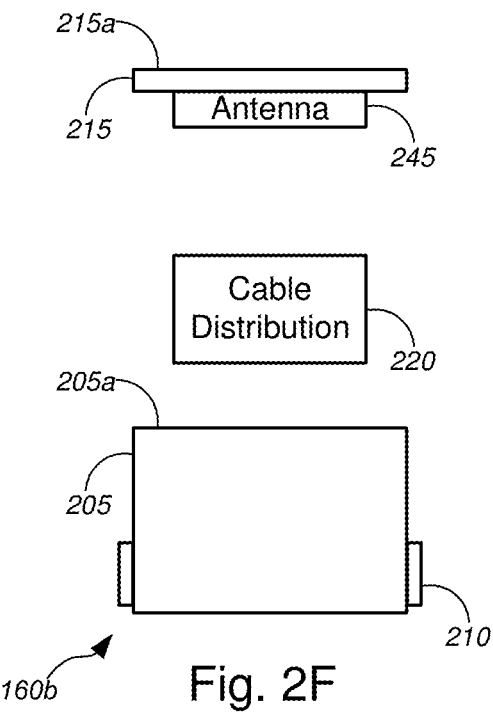
Figure 2G:
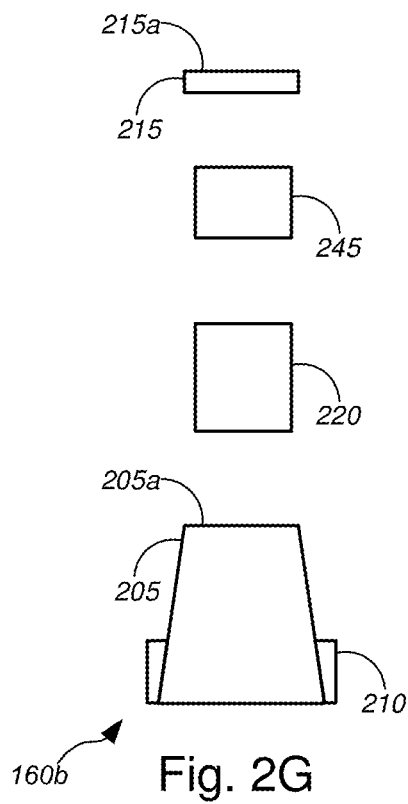
Figure 2H:
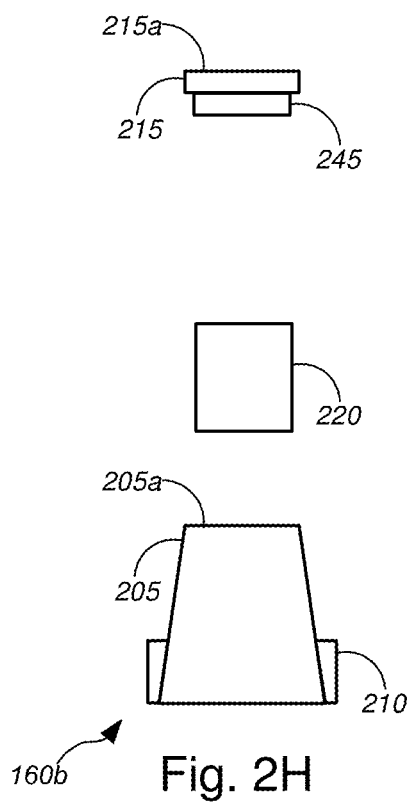
Figure 2J:
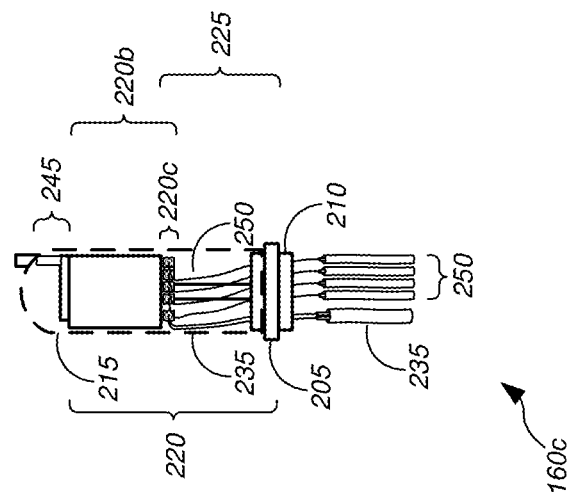
Figure 2I:
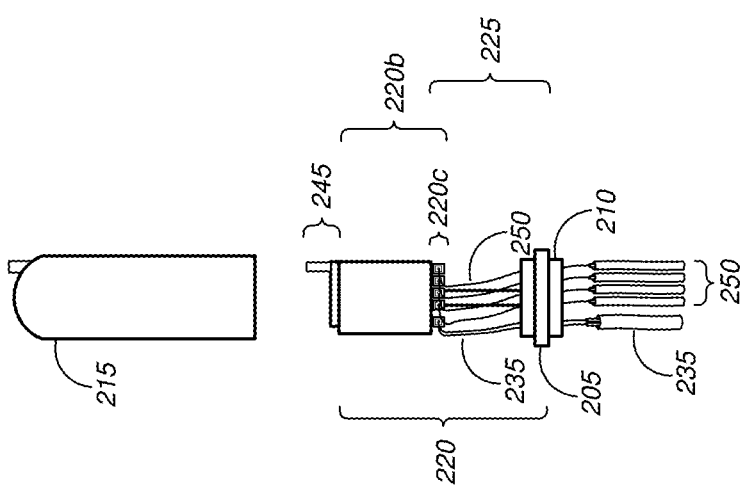

We now turn to FIGS. 2A-2J (collectively, "FIG. 2"), which are general schematic diagrams illustrating various ground-based signal distribution devices that may be used in implementing FTTP and/or point-to-point fiber insertion within a PON communications system, in accordance with various embodiments. In FIG. 2, dash-lined boxes, covers, or containers depict outlines of said boxes, covers, or containers in order to illustrate examples of contents disposed therein. Although particular configurations and components are shown in FIG. 2, the various embodiments are not necessarily limited to those configurations and components shown, but may include any suitable configurations and/or components, as appropriate or as desired. FIGS. 2A-2D depict various example embodiments of FDHs 160a, while FIGS. 2E-2H depict various example embodiments of handholes 160b, and FIGS. 2I-2J depict example embodiments of NAPs 160c.

In FIGS. 2A-2B, a pedestal-based FDH 160a is shown, which comprises, without limitation, a container 205, at least one conduit port 210, a cover or lid 215, and a cable distribution system 220. The container 205 might include a square or rectangular box that is made of a material that can durably and resiliently protect contents thereof while being disposed or buried in the ground surface (i.e., disposed or buried under the ground surface), and especially against damage caused by shifting ground conditions (such as by expansive soils, tremors, etc.). The container 205 is ideally constructed to be waterproof to protect electronics components disposed therein from getting wet; such a waterproof container can also protect against entry of dust, dirt, debris, and the like, which might affect or damage optical cables and/or optical cable connections. In some embodiments, cable distribution system 220—which is at least in part disposed in the pedestal portion that is above container 205 (and covered by or disposed within lid 215 during operation)—might include, but is not limited to, a signal distribution/splitting/splicing system 220a, a support structure 225, one or more first cables 230, and one or more second cables 235. In some cases, FDH 160a might further comprise an optional cable routing system 240, which is a system disposed in container 205 to route the one or more first and second cables 230 and 235 between the cable distribution system 220 and the at least one conduit port 210. In some embodiments, the optional cable routing system 240 might be disposed in the pedestal portion along with the cable distribution system 220 (not shown). In other embodiments, both the optional cable routing system 240 and the cable distribution system 220 might be disposed in the container 205 (also not shown). Embodiments of the optional cable routing system are described in greater detail below with respect to FIGS. 8-10.

According to some embodiments, the one or more first cables 230 might include, without limitation, F-1 or F1 optical fiber cables routed from a CO, a DSLAM, and/or near/within a block or neighborhood of customer premises (collectively, "source") to the FDH 160a, while the one or more second cables 235 might include, but are not limited to, F-2 or F2 optical fiber cables routed between the FDH 160a and one or more NAPs 160c.

The embodiments of FIGS. 2C-2D are similar, if not identical, to those of FIGS. 2A-2B, except that the FDH 160a of FIGS. 2C-2D are substantially disposed within the ground surface, with either top surface 205a (of container 205) or top surface 215a (of lid 215) being substantially level with a top surface of the ground surface, and without a pedestal portion. In these embodiments of FDH 160a, the signal distribution/splitting/splicing system 220a, the support structure 225, the one or more first cables 230, the one or more second cables 235, and the (optional) cable routing system 240 are all disposed within the container, and all covered by substantially flat lid 215. Because of the similarity of the components therein, the description of FDH 160a in FIGS. 2A-2B is applicable to the FDH 160a of FIGS. 2C-2D.

The hand holes 160b of FIGS. 2E-2H are similar, if not identical, to the hand holes described in detail in the '676 application, which is already incorporated by reference herein in its entirety. With reference to FIGS. 2E-2H, an embodiment of hand hole 160b is shown in FIG. 2E, which hand hole 160b comprises a container 205, at least one conduit port 210, a lid 215, a cable distribution system 220, and an (optional) antenna 245. The container 205 might be similar, if not identical, to the container 205 described in detail with respect to FIGS. 2A-2D; accordingly, the descriptions above apply similarly to container 205 in FIGS. 2E-2H. The (optional) antenna 245 is configured to be disposed or mounted within the interior of the container 205, and can include any suitable antenna, antenna array, or arrays of antennas, as described in detail with respect to FIG. 3 of the '676 application, or any other suitable antenna, antenna array, or arrays of antennas. The lid 215 is ideally made of a material that provides predetermined omnidirectional azimuthal rf gain.

The at least one conduit port 210 (with two conduit ports shown in FIG. 2, or three conduit ports shown in FIGS. 4-6) is configured to sealingly connect with the one or more conduits 165b or 165c. In this manner, at least one optical fiber line, at least one conductive signal line (including, but not limited to, copper data lines, copper voice lines, copper video lines, or any suitable (non-optical fiber) data cables, (non-optical fiber) video cables, or (non-optical fiber) voice cables, and/or the like), and/or the like that are provided in the one or more conduits 165b might be routed through the at least one conduit port 210 and into the interior of the container 205, to be correspondingly communicatively coupled to the antenna 245 or to the NIDs/ONTs 170 via cable distribution system 220. Cable distribution system 220 may also be configured to route (via container 205) the at least one power line that is provided in the one or more conduits 105 to appropriate power receptacles, cabinets, or power relay systems that are located above the ground surface.

FIG. 2F shows another embodiment of hand hole 160b. In FIG. 2F, the hand hole 160b comprises (optional) antenna 245, which is part of lid 215, either disposed completely within the lid 215, disposed below (but mounted to) the lid 215, or disposed partially within the lid 215 and partially extending below the lid 215. Hand hole 115 in FIG. 2F is otherwise similar, or identical to, and has similar, or identical, functionalities as hand hole 115 shown in, and described with respect to, FIG. 2E. Accordingly, the descriptions of the hand hole 115 of FIG. 2E are applicable to the hand hole 115 of FIG. 2F.

FIGS. 2G and 2H show two embodiments of flowerpot hand holes 160b. The differences between the hand holes 160b of FIGS. 2E and 2F and the flowerpot hand holes 160b of FIGS. 2G and 2H include a more compact structure (and a correspondingly compact set of (optional) antenna(s) 245 and cable distribution systems 220), a container 205 having a generally cylindrical or (truncated) conical shape (not unlike a flower pot for planting flowers), a lid 215 having a generally circular shape to fit the generally cylindrical or conical container 205, and the like. The flowerpot hand holes 120 are otherwise similar, or identical to, and have similar, or identical, functionalities as hand holes 160b of FIGS. 2E and 2F, respectively. Accordingly, the descriptions of hand holes 160b of FIGS. 2E and 2F are respectively applicable to the flowerpot hand holes 160b of FIGS. 2G and 2H.

According to some embodiments, a wide range of hand holes (some including the hand holes 160b above) may be used, with polymer concrete lids of various shapes and sizes. In some cases, all splitting and/or splicing can be performed below the ground surface and no pedestal is added. In some instances, some splitting and/or splicing (e.g., using cable distribution system 220, or the like) can be performed above the ground surface, such as in pedestal type FDH 160a (shown in FIGS. 2A-2B) or other platforms, including, without limitation, pedestal platforms, NAP platforms, FDH platforms, and/or the like shown in FIG. 2 of the '676 application, already incorporated herein by reference in its entirety.

In some embodiments, if the hand hole is not placed in a driveway or sidewalk, or the like, the lid 215 (as shown in FIGS. 2E-2H) may be replaced by a pedestal lid 215 (such as shown in FIGS. 2G-2J), or the like. In other words, a small (i.e., short) radio-only pedestal (or pedestal lid) can be added, with no need for any splitter, any splice tray, or the like, just a simple antenna structure. The result might look like a few-inch high (i.e., a few-centimeter high) pedestal with antenna structures as described in the '676 application. An advantage with this approach is that the radio pedestal can be easily replaced, maintained, or the like, as it contains only the radio element.

Merely by way of example, in some instances, polymer concrete lids (such as used with typical hand holes) may be built with antenna elements in the lids. In particular, a ground plane can be placed below the lid, and the polymer concrete can be considered a low dielectric constant (i.e., as it has a dielectric constant or relative permittivity $\varepsilon_r$ similar to that of air—namely, $\varepsilon_r$ of about 1.0). In some cases, patch elements and/or directors may be included within the lid, subject to manufacturing processes.

Alternatively, planar antennas (such as described in detail in the '676 application) may be placed below the lid, with the concrete surface having negligible impact on radio frequency propagation. A low elevation (i.e., below street level) setting of the radio typically limits the distance of propagation of rf signals. However, architectures having hand holes placed every few customer premises (e.g., homes) in a particular area (i.e., neighborhood or block of customer premises) may sufficiently compensate for the limited distance of rf signal propagation. Some embodiments include hand holes 160b without any antennas 245.

In FIGS. 2I-2J, a NAP 160c is shown, which includes, without limitation, a base 205, a conduit port 210, a cover 215, and a cable distribution system 220. In some embodiments, cable distribution system 220 might include, but is not limited to, a signal distribution/splitting/splicing system 220b, a plurality of ports 220c, a support structure 225, one or more second cables 235, an (optional) antenna 245, and one or more third cables 250. In some cases, NAP 160c might be an above-surface NAP, a direct bury NAP, or a NAP disposed in the ground surface and extending above the ground surface. In some embodiments, the one or more second cables 235 might include, but are not limited to, F-2 or F2 optical fiber cables routed between the FDH 160a and one or more NAPs 160c, while the one or more third cables 250 might include, without limitation, F-3 or F3 optical fiber cables routed between a NAP 160c and one or more NIDs/ONTs 170 (in some cases, via one or more hand holes 160b). In some embodiments, NAP 160c might further comprise an optional cable routing system 240 (not shown), not unlike the optional cable routing system 240, as shown and described in detail above with respect to FIGS. 2A-2D.

FIGS. 3A-6B illustrate embodiments of FTTP implementation (such as in a PON communications system implementation, in an Ethernet fiber communications system implementation, in an EPON, NGPON, or NGPON2 communications system implementation, and/or the like) and/or point-to-point fiber insertion implementation within the PON communications system (or alternatively, within an Ethernet fiber communications system implementation, within an EPON, NGPON, or NGPON2 communications system implementation, and/or the like), in some cases, depicting zoomed-in views of features shown in FIG. 1, and in other cases depicting several alternative embodiments of specific features. FIGS. 7A-12B illustrate embodiments of point-to-point fiber insertion implementation within a PON communications system (or alternatively, within an Ethernet fiber communications system implementation, within an EPON, NGPON, or NGPON2 communications system implementation, and/or the like).

Figure 3A:
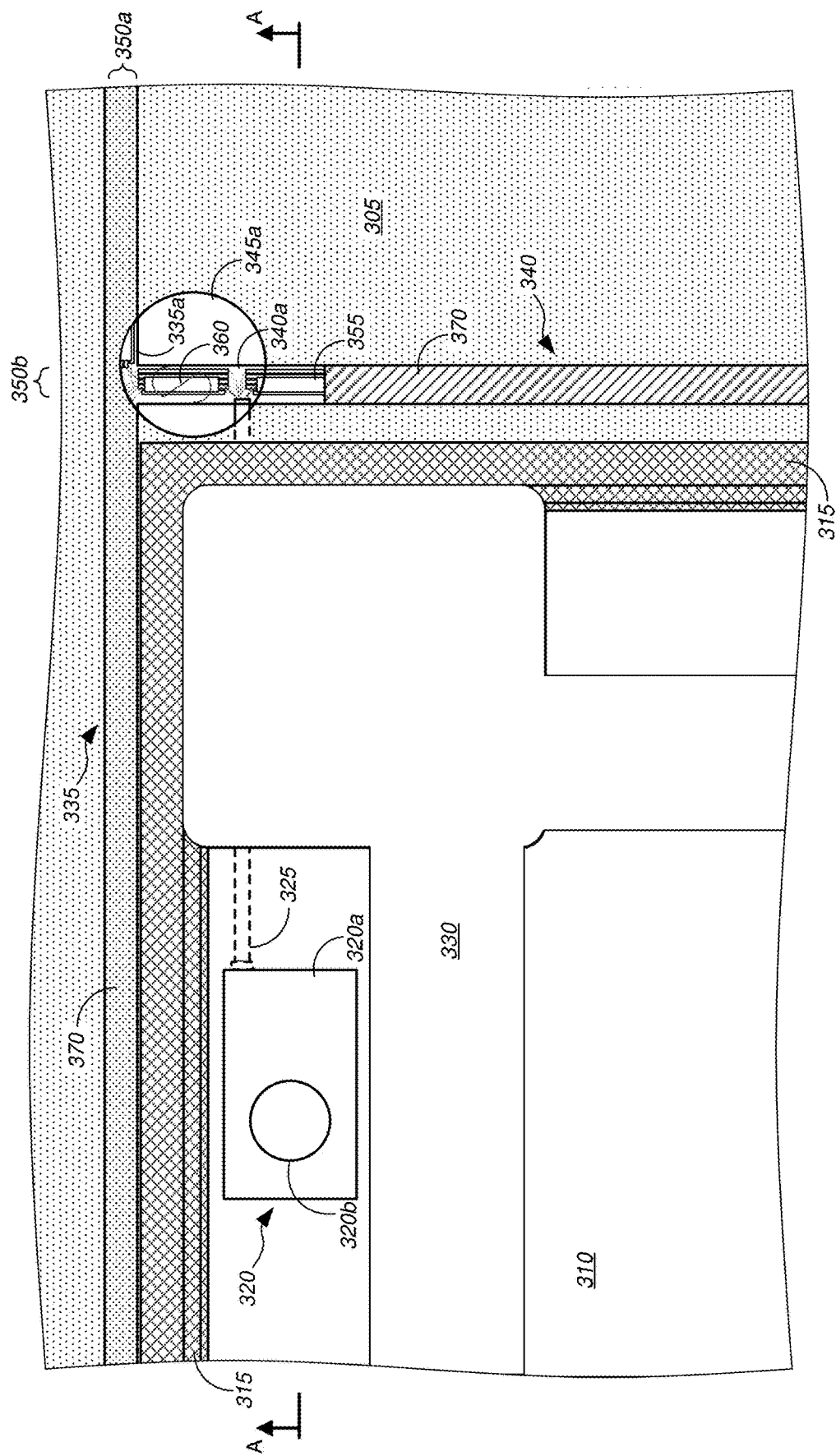
Figure 3B:
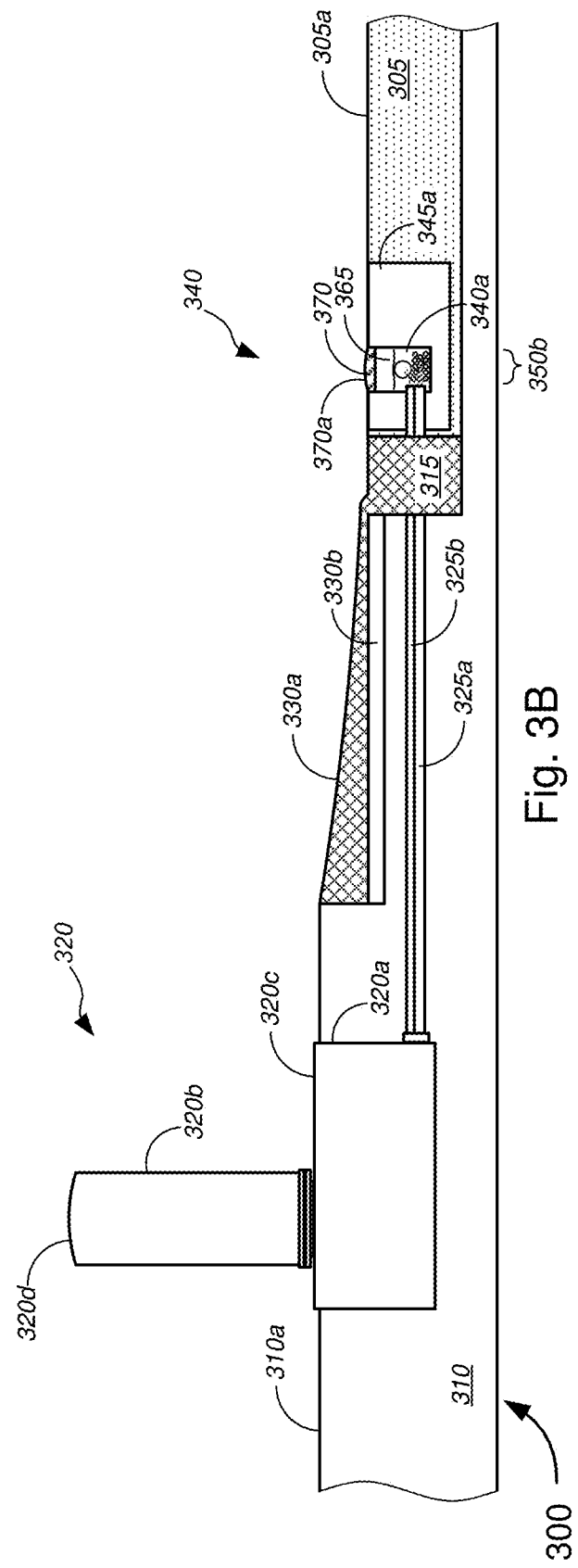
Figure 3D:
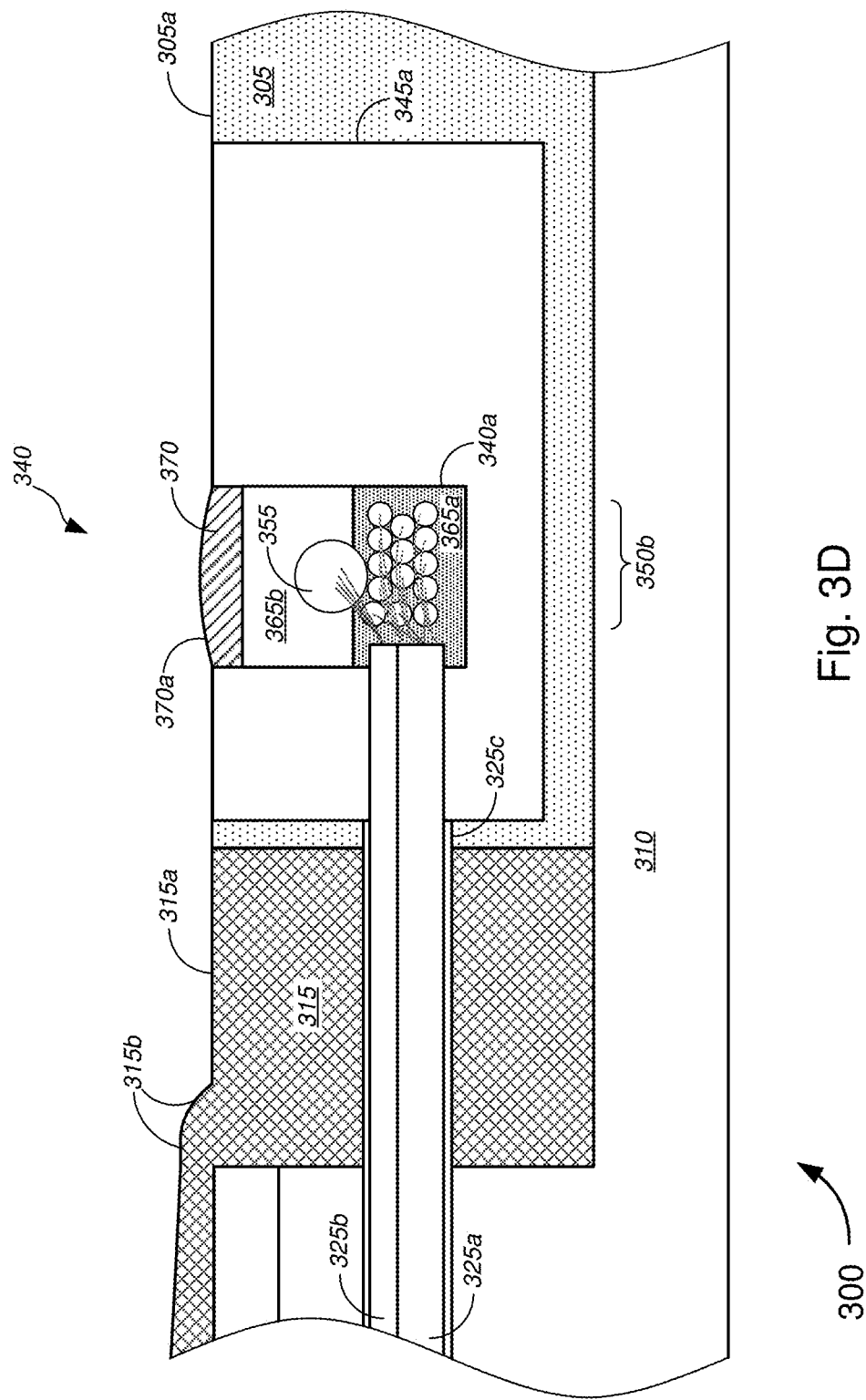

In particular, FIGS. 3A-3D (collectively, "FIG. 3") are general schematic diagrams illustrating various views of a system 300 for communicatively coupling lines within an apical conduit system and lines within a fiber distribution hub ("FDH") for implementing FTTP and/or point-to-point fiber insertion within a PON communications system (or alternatively, within an Ethernet fiber communications system implementation, within an EPON, NGPON, or NGPON2 communications system implementation, and/or the like), in accordance with various embodiments. FIG. 3A shows a top view of a section of ground in which components of a ground-based distribution device and components of an apical conduit system are disposed. FIG. 3B shows a partial sectional view of the system 300 of FIG. 3A, as shown along the A-A direction indicated in FIG. 3A. FIG. 3C shows an enlarged partial view of the portion of system 300 shown in FIG. 3B. FIG. 3D shows an alternative embodiment to FIG. 3C in which the microduct/cable capture device 360 is replaced with a tack coat to hold the microduct/cables in place within the channel (i.e., source slot 335, main slot 340, cross slot 375, or far-side slot 390, etc.). System 300 in FIG. 3 generally corresponds to a section of ground as, for example, indicated by (but not necessarily precisely depicting) dash-lined rectangle 300 shown in FIG. 1.

FIGS. 4A-4B (collectively, "FIG. 4") are general schematic diagrams illustrating various views of a system 400 for communicatively coupling lines within an apical conduit system and lines within a direct bury network access point ("NAP") for implementing FTTP and/or point-to-point fiber insertion within a PON communications system (or alternatively, within an Ethernet fiber communications system implementation, within an EPON, NGPON, or NGPON2 communications system implementation, and/or the like), in accordance with various embodiments. FIG. 4A shows a top view of a section of ground in which components of a ground-based distribution device and components of an apical conduit system are disposed. FIG. 4B shows a partial sectional view of the system 400 of FIG. 4A, as shown along the B-B direction indicated in FIG. 4A. System 400 in FIG. 4 generally corresponds to a section of ground as, for example, indicated by (but not necessarily precisely depicting) dash-lined rectangle 400 shown in FIG. 1.

FIGS. 5A-5B (collectively, "FIG. 5") are general schematic diagrams illustrating various views of a system 500 for communicatively coupling lines within an apical conduit system and lines within a hand hole for implementing FTTP and/or point-to-point fiber insertion within a PON communications system (or alternatively, within an Ethernet fiber communications system implementation, within an EPON, NGPON, or NGPON2 communications system implementation, and/or the like), in accordance with various embodiments. FIG. 5A shows a top view of a section of ground in which components of a ground-based distribution device and components of an apical conduit system are disposed. FIG. 5B shows a partial sectional view of the system 500 of FIG. 5A, as shown along the C-C direction indicated in FIG. 5A. System 500 in FIG. 5 generally corresponds to a section of ground as, for example, indicated by (but not necessarily precisely depicting) dash-lined rectangle 500 shown in FIG. 1.

FIGS. 6A-6B (collectively, "FIG. 6") are general schematic diagrams illustrating various views of a system 600 for communicatively coupling lines within an apical conduit system and lines within a hand hole routed from a NAP through a cross-slot in a road surface for implementing FTTP and/or point-to-point fiber insertion within a PON communications system (or alternatively, within an Ethernet fiber communications system implementation, within an EPON, NGPON, or NGPON2 communications system implementation, and/or the like), in accordance with various embodiments. FIG. 6A shows a top view of a section of ground in which components of a ground-based distribution device and components of an apical conduit system are disposed. FIG. 6B shows a partial sectional view of the system 600 of FIG. 6A, as shown along the D-D direction indicated in FIG. 6A. System 600 in FIG. 6 generally corresponds to a section of ground as, for example, indicated by (but not necessarily precisely depicting) dash-lined rectangle 600 shown in FIG. 1.

In FIGS. 3-6, systems 300-600 might comprise one or more of roadway 305, ground 310, curb 315, FDH 320, conduits 325, pathway 330, source slot 335, main slot 340, bore holes 345, lines 350, conduit/microduct 355, microduct/cable capture device 360, filler material 365, capping material 370, cross slot 375, NAP 380, hand hole 385, far-side slot 390, and/or road lines 395, or the like. In some instances, roadway 305 might be made of asphalt, concrete, and/or any combination thereof, or the like. Ground 310 might comprise soil (in some cases, compacted soil), mud, clay, rock, and/or any combination thereof, or the like. Curb 315 might be made of concrete or the like. A sub-base layer (not shown) might be disposed between the roadway 305 and ground 310. In some cases, curb 315 might comprise a portion of a roadway surface 315a and a portion of a non-roadway surface 315b.

According to some embodiments, conduits 325 might include, without limitation, conduits 325a-325b, missile bores 325c, conduit 325d, conduits 325e-325f, missile bore 325g, and/or the like. Conduits 325a-325b might extend, within missile bore 325c, between one of FDH 320, NAP 380, or hand hole 385 and one of bore hole 345, source slot 335, main slot 340, cross slot 375, or far-side slot 390. Conduit 325d might extend between one of NAP 380 or hand hole 385 and each of a NID or ONT (e.g., NID or ONT 170) disposed on an exterior wall or exterior surface of a customer premises (e.g., customer premises 110). Conduits 325e-325f might extend, within missile bore 325g, between one of bore hole 345, main slot 340, or far-side slot 390 and another of bore hole 345, main slot 340, or far-side slot 390; conduits 325e-325f, within missile bore 325g, might, in some cases lie within a channel of cross slot 375 (or might be a missile bore otherwise set or disposed under surface 305a of roadway 305, either before or after roadway 305 is laid).

Each bore hole 345 provides simultaneous access to two or more slots (including, without limitation, source slot 335, main slot 340, cross slot 375, and/or far-side slot 390, or the like), to enable cross-connection or cross-placement of lines in one of the two or more slots with lines in the other one(s) of the two or more slots, and vice versa. In some cases, bore holes 345 might comprise a first bore hole 345a and one or more second bore holes 345b. The first bore hole 345a might be larger in diameter and/or depth compared with the one or more second bore holes 345b. While the first bore hole 345a might be used to cross-connect lines within the source slot 335, the main slot 340, and/or the conduit 325 to the FDH 320, the one or more second bore holes 345b might cross-connect lines within the conduit 325 to NAP 380 and/or hand hole 385 with lines in the main slot 340, the cross slot 375, and/or the far-side slot 390. Although bore holes 345 shown in FIGS. 3-6 are depicted as extending below channels of the corresponding apical conduit slots, the bore holes, according to the various embodiments, may be set to have any suitable depth relative to the depth of the channel (i.e., deeper, less deep, or substantially as deep).

The plurality of lines 350, the microduct/conduit 355, and the microduct/cable capture device 360 are disposed or placed in a channel of one or more slots (e.g., channel 335a of the source slot 335, channel(s) 340a of the main slot(s) 340, channel(s) 375a of the cross slot(s) 375, channel(s) 390a of the far-side slot(s) 390, and so on). In some embodiments, the plurality of lines 350 might include, without limitation, at least one of one or more conduits, one or more optical fiber cables, one or more conductive signal lines, one or more power lines, and/or the like. The one or more conductive signal lines might include, but are not limited to, copper data lines, copper video lines, copper voice lines, or any suitable (non-optical fiber) data cables, (non-optical fiber) video cables, or (non-optical fiber) voice cables, and/or the like. In some embodiments, at least one of the conductive signal lines can be used for carrying multiple signals simultaneously (e.g., data and video signal, first data and second data, first video signal and second data signal, or the like), by carrying the different signals as multiplexed signals or by carrying the different signals simultaneously on separate wavelengths, or the like. In one non-limiting example, GPON data might be combined with an additional analog video signal that is sent on the same signal line over a different wavelength. In some cases, some lines 350 might be routed via conduit/microduct 355, while other lines 350 might be routed substantially parallel with conduit/microduct 355 within groove or channels.

According to some embodiments, the plurality of lines 350 might include, but is not limited to, F1 cables, F2 cables, F3A cables, F3B cables, multiple-fiber push-on/push-off ("MPO") cables, twisted-copper pair cables, and/or the like. In some embodiments, the F1 cables might include, but are not limited to, F1 optical fiber cables 350a, which might communicatively couple a central office of a telecommunications service provider with the FDH 320 (which might comprise a container 320a and a pedestal portion 320b), as shown, e.g., in the embodiment of FIG. 3. In some instances, the F2 cables might include, without limitation, F2 optical fiber cables 350b, which might communicatively couple the FDH 320 with a NAP 380, as shown, e.g., in the embodiments of FIGS. 3 and 4 as described above. According to some aspects, the F3A cables and F3B cables (collectively, "F3 cables") might include, without limitation, F3 optical cables 350c, which might communicatively couple the NAP 380 to a NID or ONT (e.g., NID/ONT 170 in FIG. 1) that is mounted on an exterior wall of a customer premises (e.g., building of customer premises 110). In some cases, the F3 cables might run through the missile bore 325c between the NAP and the main slot 340, through the cross slot 375, through the far-side slot 390, through the missile bore 325c between the cross-slot 375 or far-side slot 390 and the hand hole 385, through conduits 325d, and/or any combination of these routes, in order to communicatively couple lines from the NAP 380 with lines leading into the NID/ONT of customer premises located across (or on the other side of) roadway 305 with respect to the NAP 380. Although the examples above refer to F1, F2, and F3 optical fiber cables, the F1, F2, and F3 cables may each include, without limitation, non-optical video/voice/data cables (e.g., conductive signal lines, as described above, or the like), power cables, and/or the like.

The conduit/microduct 355 might include any type of conduit that allows routing to any of the plurality of lines 350 described above. In some cases, the microduct 355 might have a range of diameters between 7.5 mm and 12 mm, while in other cases, conduit/microduct 355 might have any suitable diameter, so long as it fits within the channels (which is as described above).

In some embodiments, the microduct/cable capture device 360 might comprise a plurality of capture devices placed at suitable (possibly varying or, sometimes, random) intervals within the channels. According to some embodiments, each of one or more capture devices 360 might include at least one hooked end to hook under one or more lines or one or more conduits in order to facilitate lifting of the one or more lines or the one or more conduits, for maintenance, repair, replacement, etc. In some instances, some or all of the capture devices 360 might anchor to the sidewall(s) of the channels; in such cases, the capture devices 360 might further serve to secure the one or more lines or the one or more conduits at or near the bottom of the channels (e.g., to prevent lifting, such as during application/installation of the filler material). In some cases, some or all of the capture devices 360 might simply be placed on top of the one or more lines or the one or more conduits within the channels (i.e., without anchoring to the sidewalls of the channel). Although FIG. 3 shows an S-shaped capture device 360, the various embodiments are not so limited, and the capture device 360 may have any suitable shape to serve the function of lifting lines/conduits, the function of securing/keeping the lines/conduits at or near the bottom of the channels, or both.

The filler material 365 might include a thermosetting material, which in some cases might include, without limitation, polyurea or the like. The capping material 370 might include a thermosetting material (such as polyurea or the like), safety grout, asphalt sealer, concrete sealer, and/or the like. In some cases, the capping material 370 might comprise a sealer cap forming a mastic seal over the filler material. According to some embodiments, the capping material 370 might be colored and used to fill at least a portion of the channel, as well as to extend further along the surface of the roadway to serve as a continuous road line. In some instances, the filler material 365 and the capping material 370 might be the same material. In some embodiments, the filler material might be filled to a height within channels of between about 2.5 inches (~6.4 cm) and about 3 inches (~7.6 cm), while the capping material might be about 0.5 inches (~1.3 cm) to about 0.75 inches (~1.9 cm) deep.

In some embodiments, roadway 305, curb 315, FDH 320, missile bores 325c, conduits 325d, pathway 330, source slot 335, main slot 340, bore holes 345, cross slot 375, NAP 380, hand hole 385, far-side slot 390, and road lines 395 of FIGS. 3-6 might correspond to roadway 115, curb 120, FDH 160a, missile bores 165a-165b, conduits 165c, pathway 125, source slot 130, main slot 135, bore holes 150a-150b, cross slot 145, NAP 160c, hand hole 160b, far-side slot 140, and road lines 155 of FIG. 1, respectively. As such, the descriptions of roadway 115, curb 120, FDH 160a, missile bores 165a-165b, conduits 165c, pathway 125, source slot 130, main slot 135, bore holes 150a-150b, cross slot 145, NAP 160c, hand hole 160b, far-side slot 140, and road lines 155 of FIG. 1 are applicable to roadway 305, curb 315, FDH 320, missile bores 325c, conduits 325d, pathway 330, source slot 335, main slot 340, bore holes 345, cross slot 375, NAP 380, hand hole 385, far-side slot 390, and road lines 395 of FIGS. 3-6.

With respect to the embodiments of FIGS. 1 and 3-6, the various apical conduit system components may be designed or configured in accordance with one or more of the following non-limiting implementations. In some embodiments, the channels of any or all of the source slot, main slot(s), far-side slot(s), and cross slot(s) (i.e., channel 335a, channel(s) 340a, channel(s) 375a, channel(s) 390a, and/or the like) can be created by milling (or otherwise cutting into) the roadway or other ground surface. In various aspects, the channels might have a variety of widths. Merely by way of example, in some cases, the channels might have a width of between about 0.5 inches (~1.3 cm) and about 12 inches (~30.5 cm), while in other cases, the channels might have a width of between about 1 inch (~2.5 cm) and about 6 inches (~15.2 cm). In other cases, the channels might have a width between about 1.5 inches (~3.8 cm) and about 2.5 inches (~6.4 cm), or a width of about 2 inches (~5.1 cm). The depth of the channels can vary as well, so long as the channel does not compromise the structural integrity of the ground surface (e.g., roadway, etc.) in which it is created. Merely by way of example, the channels might have a depth of no greater than about 3 inches (~7.6 cm), a depth of no greater than about 1 inch (~2.5 cm), or a depth of no greater than about 0.5 inches (~1.3 cm). In some embodiments, the depth of the channels might be about 3 inches (~7.6 cm), while the width of the channels might be either about 0.5 inches (~1.3 cm) or about 1 inch (~2.5 cm). In other embodiments, the depth of the channels might be about 4 or 5 inches (~10.2 or 12.7 cm), or any depth that is appropriate in light of the circumstances, including the structural features of the roadway (depth, strength, etc.), the characteristics of the communication lines to be installed in the channels, etc.

In one aspect, certain embodiments can allow a provider or vendor to lay fiber lines and/or other lines on top of the road surface by creating a shallow groove or channel (e.g., 2" (~5.1 cm) wide, 0.5" (~1.3 cm) deep; 0.5" (~1.3 cm) wide, 3" (~7.6 cm) deep; or 1" (~2.5 cm) wide, 3" (~7.6 cm) deep; and/or the like) in the pavement along the edge of the pavement. In some embodiments, the source slot or the main slot (e.g., source slot 130 or main slot 135 shown in FIG. 1) might each have a 0.75" (~1.9 cm) wide, 3" (·7.6 cm) deep channel, while the far-side slot (e.g., far-side slot 140 shown in FIG. 1) might have a 0.5" (~1.3 cm) wide, 2" (~5.1 cm) deep channel, and the cross slot (e.g., cross slot 145) might have a 0.5" (~1.3 cm) wide, 3" (~7.6 cm) deep channel.

In a single operation, a conduit (e.g., conduit 355 or the like) could be placed in the groove or channel, while cast-in-place polyurea cap is extruded over it, encapsulating the conduit and bonding it with the road surface. In this embodiment, the conduit provides the thoroughfare for the fiber optic or other lines while the polyurea provides bonding to the concrete or asphalt surface, mechanical protection against traffic and impact loads (including vandalism, etc.), and water tightness. Such embodiments can minimize costs associated with construction and tie-ins, providing a tailored technical solution that is optimized for the physical characteristics of the challenge at hand. The apical conduit system (otherwise referred to as "cast-in-place" technology or "cast-in-place fiber technology") is described in greater detail in the '034, '574, '691, '216, '020, '227, '488, '514, '754, and '109 applications and in the '665 and '676 applications, which have already been incorporated herein by reference in their entirety for all purposes.

Turning to the embodiment of FIG. 3, the example of FIG. 3A shows the relative configurations, positions, and arrangement of one embodiment of the system for implementing FTTP, in which the lines 350a within the source slot 335 are communicatively coupled with lines 350b within the main slot 340 through FDH 320, via the first bore hole 345a. As shown in FIG. 3A, the source slot 335 runs along a first roadway 305, while the main slot 340 runs along a second roadway 305 (which is substantially perpendicular to the first roadway 305, although the various embodiments allow for any relative orientation at any suitable angles between the adjacent roadways, as appropriate). In the example as shown in FIG. 3A, the first bore hole 345a is positioned so as to serve as an intersection amongst the source slot 335, the main slot 340, and the conduit 325 (leading to the FDH 320). In some cases, the position of the conduit 325 might be chosen to facilitate interconnection with each of the source slot 335 and the main slot 340. Further, the various embodiments allow for any configuration of the pathway 330, curb 315, FDH 320, source slot 335, main slot 340, and bore hole 345a, relative to roadway 305 and ground 310, other than as shown in FIG. 3.

In the embodiment of FIG. 3B, a top surface 320c of container 320a of the FDH 320 is shown as being substantially level with a top portion 310a of ground surface 310. The only portions of the FDH that are substantially above the ground surface 310a is the pedestal portion 320b and applicable connection components for connection with the container 320c. The components of the pedestal FDH 330 are described in detail above with respect to FIGS. 2A-2B. The top portion 320d of the pedestal 320b may be one of flat with relatively sharp circular edge(s) connecting to the side of the cylindrical pedestal 320b, flat with rounded circular edge(s) connecting to the side of the cylindrical pedestal 320b, curved with sharp circular edge(s) connecting to the side of the cylindrical pedestal 320b, curved with rounded circular edge(s) connecting to the side of the cylindrical pedestal 320b, domed with sharp circular edge(s) connecting to the side of the cylindrical pedestal 320b, domed with rounded circular edge(s) connecting to the side of the cylindrical pedestal 320b, and/or the like.

Pathway 330, as shown in FIGS. 3-6, might include, without limitation, an upper portion 330a on which people may walk, run, or bike, and a base portion 330b that provides sufficient support and/or adhesion to surrounding ground 310. As shown in FIG. 3B, the upper portion 330a might comprise a sloped segment, and in some cases might join or merge with curb 315, particularly where the pathway 330 is a street-corner sidewalk (such as street-corner sidewalk 125b in FIG. 1). According to some embodiments, conduit 325—disposed between (and communicatively coupling) the FDH 320 and one or more of source slot 335, main slot 340, and/or bore hole 345—might comprise a first conduit 325a and a second conduit 325b, as shown in FIG. 3B. In some cases, the second conduit 325b might communicatively couple lines therein with lines in conduit 355. In some instances, the first conduit might communicatively couple lines therein with lines 350 (such as F1 cables, F2 cables, or both).

In some embodiments, F1 or F2 cables might be routed substantially parallel with the second conduit, without themselves being routed through any conduit; in such cases, the F1 cables might run through the channels of the source and/or main slots, might run through a missile bore 325c between the bore hole 345 and the FDH 320 to the FDH 320, might be spliced and distributed by the FDH as F2 cables, and the F2 cables might run through the missile bore 325c to the main slot (and might further run through channels in the main slot(s), cross slot(s), and/or far-side slot(s)). The F1 and F2 cables might represent individual unidirectional lines that function as separate feed and return lines, might represent individual bi-directional lines that each function as both feed and return lines, or might represent a combination of unidirectional and bi-directional lines for carrying signals from the CO to the FDH, from the FDH to a NAP, from the NAP to the FDH, from the FDH to the CO, and/or the like.

With reference to FIG. 3C, a top surface 370a of capping material 370 is shown substantially level with a top portion of ground surface 305a of roadway 305. Also shown in FIG. 3C, the filler material 365 substantially fills at least the bottom portion of groove or channels 340a, up to the capping material 370, thereby submerging, and filling interstitial spaces between components of, the plurality of lines 350 and the conduit/microduct 355. In some cases, the filler material 365 and the capping material 370 might be the same material.

In some embodiments, the roadway surface 305a in which the source slot is disposed might correspond to a first ground surface, the roadway surface 305a in which the main slot is disposed might correspond to a second ground surface, and ground surface 310 in which the container of the FDH is disposed might correspond to a third ground surface. As shown in FIG. 3, the second ground surface might be a roadway surface, while the third ground surface might be a non-roadway surface. In some cases, curb surface 315a might represent a portion of a roadway surface, while curb surface 315b might represent a portion of a non-roadway surface. In some embodiments, the third ground surface might extend from the container 320a to the channels of the apical conduit system, and thus might comprise a combination of roadway 305, ground 310, and curb 315.

Turning to FIG. 3D, rather than using a microduct/cable capture device 360 to hold the microduct/cables in place within the channel 340a, a tacking technique may be implemented. In some embodiments, an initial application of the filler material 365 may be implemented, resulting in a first filler material 365a being disposed in the channel 340a. Upon application of the first filler material 365a, at least some of the lines 350 and/or the conduit/microduct might float to a surface portion of the first filler material 365a. Within a certain period (e.g., about 5 minutes, about 15 minutes, about 60 minutes, or longer, or any period between about 5-60 minutes), the first filler material 365a might begin to set, thereby acting as a tack coating to hold the microduct/cables in place within the channel 340a. A further application of the filler material 365 may be implemented after the tack coating has been applied, resulting in a second filler material 365b (which may, in some cases be the same material or same type of material as the first filler material 365a) being disposed in the channel 340a above the first filler material 365a.

In some embodiments, the first filler material 365a and the second filler material 365b might be different materials. In such cases, the first filler material 365a might comprise a material that, when set, may be more easily cut with a knife or other sharp-edged tool (by hand, for example), while the second filler material 365b might comprise thermosetting material including, without limitation, polyurea or other materials, which are more resilient. Further, in such cases, after the tack coat layer with the first filler material 365a, a second layer of the first filler material 365a might be applied on top of the tack coat layer in order to completely cover all microducts and/or cables (which may have floated to a surface of the first filler material 365a upon initial application of the tack coat layer). Once all the microducts and/or cables are completely submerged or encapsulated within the first filler material 365a, and the first filler material 365a has had time to set, then the second filler material may be applied. In this manner, if repairs have to be made to any broken fiber lines or other cables or conduits (as described below with respect to FIGS. 9 and 10), it will be easier to access the broken fiber lines or other cables or conduits within the first filler material 365a, as compared with accessing the broken fiber lines or other cables or conduits when they are embedded within polyurea or other similar materials (which are extremely resilient to most cutting implements).

FIG. 4 shows the relative configurations, positions, and arrangement of one embodiment of the system for implementing FTTP, in which the lines from the NAP 380 are communicatively coupled with lines 350b within the main slot 340 and with lines 350c within the cross slot 375, via the second bore hole 345b. Some of lines 350c might communicatively couple with lines within conduits 325d leading to individual NIDs/ONTs (e.g., NID or ONT 170 in FIG. 1). In some embodiments, the cross slot 375 might be positioned to align with conduit 325 (or missile bore 325c); this allows a single bore hole 345a to serve as an intersection amongst the main slot 340, the cross slot 375, and the conduit 325 (or missile bore 325c) leading to the NAP 380. In alternative embodiments, the cross slot 375 may be positioned relative to the main slot 340 without regard to the position of conduit 325 (or missile bore 325c); in such embodiments, however, additional bore holes 345b may be necessary at intersections of two of the main slot 340, the cross slot 375, and the conduit 325 (or missile bore 325c) leading to the NAP 380.

In the embodiment of FIG. 4, the NAP 380 comprises a direct bury NAP 380. However, any suitable type of NAP may be implemented. Further, although hand hole 385 is shown in conjunction with NAP 380, the hand hole 385 is merely optional (and may be omitted); in such cases, the NAP 380 might communicatively couple lines 350c through conduits 325d directly to corresponding ones of the NIDs/ONTs (e.g., NID or ONT 170 in FIG. 1). Further, the various embodiments allow for any configuration of the pathway 330, curb 315, NAP 380, hand hole 385, main slot 340, cross slot 375, and bore hole 345b, relative to roadway 305 and ground 310, other than as shown in FIG. 4.

FIG. 5 shows the relative configurations, positions, and arrangement of one embodiment of the system for implementing FTTP, in which the lines 350c from a far-side slot 390 (which are routed through cross slot 375 from the NAP 380) are communicatively coupled with lines within conduit 325 leading to hand hole 385. Lines 350c from hand hole 385 might communicatively couple with lines within conduits 325d leading to individual NIDs/ONTs (e.g., NID or ONT 170 in FIG. 1).

Although hand hole 385 is shown connecting with two (or more) conduits 325d, the hand hole 385 is merely optional (and may be omitted); in such cases, the conduit 325 might communicatively couple lines 350c through conduits 325d directly (e.g., via splitting, "de-bundling," forking, or manifold connectors, or the like) to corresponding ones of the NIDs/ONTs (e.g., NID or ONT 170 in FIG. 1). Further, the various embodiments allow for any configuration of the pathway 330, curb 315, hand hole 385, far-side slot 390, road lines 395, and bore hole 345b, relative to roadway 305 and ground 310, other than as shown in FIG. 5.

FIG. 6 shows the relative configurations, positions, and arrangement of one embodiment of the system for implementing FTTP, in which the lines from the NAP 380 are communicatively coupled with lines 350b within the main slot 340 and with lines 350c within the cross slot 375, via one second bore hole 345b, and in which lines 350c within cross slot 375 are communicatively coupled with lines 350c in far-side slot 390 and lines 350c in conduit 325 leading to hand hole 385. Some of lines 350c might communicatively couple with lines within conduits 325d leading to individual NIDs/ONTs (e.g., NID or ONT 170 in FIG. 1), either directing from the NAP 380, from the NAP 380 through hand hole 385, from the NAP 380 through cross slot 375, through conduit 325, and through hand hole 385, or from the NAP 380 through cross slot 375, through far-side slot 390, through conduit 325, and through hand hole 385, or the like. In some embodiments, the cross slot 375 might be positioned to align with conduit 325 (or missile bore 325c); this allows a single bore hole 345a to serve as an intersection amongst any combination of the main slot 340, the cross slot 375, far-side slot 390, and/or the conduit 325 (or missile bore 325c) leading to the NAP 380. In alternative embodiments, the cross slot 375 may be positioned relative to the main slot 340 without regard to the position of conduit 325 (or missile bore 325c); in such embodiments, however, additional bore holes 345b may be necessary at intersections of two of the main slot 340, the cross slot 375, far-side slot 390, and the conduit 325 (or missile bore 325c) leading to the NAP 380.

In the embodiment of FIG. 6, the NAP 380 comprises a direct bury NAP 380. However, any suitable type of NAP may be implemented. Further, although hand hole 385 is shown in conjunction with NAP 380, the hand hole 385 is merely optional (and may be omitted); in such cases, the NAP 380 might communicatively couple lines 350c through conduits 325d directly to corresponding ones of the NIDs/ONTs (e.g., NID or ONT 170 in FIG. 1). Further, the various embodiments allow for any configuration of the pathway 330, curb 315, NAP 380, hand hole 385, main slot 340, cross slot 375, far-side slot 390, road lines 395, and bore hole 345b, relative to roadway 305 and ground 310, other than as shown in FIG. 6.

We now turn to the FIGS. 7A-12B, which are directed to embodiments pertaining to point-to-point fiber insertion within a PON communications system (or alternatively, within an Ethernet fiber communications system implementation, within an EPON, NGPON, or NGPON2 communications system implementation, and/or the like), which might be embodied (in some cases) by the FTTP implementation as described in detail above with respect to FIGS. 1-6.

FIGS. 7A-7E (collectively, "FIG. 7") are general schematic diagrams illustrating various systems 700 for establishing a PON communications system (or alternatively, an Ethernet fiber communications system, an EPON, NGPON, or NGPON2 communications system, and/or the like), in accordance with various embodiments.

In FIG. 7 (and in subsequent figures), system 700 might comprise an optical line terminal ("OLT") 705, a fiber distribution hub ("FDH") 710, a plurality of network access points ("NAPs") 715, and a plurality of customer premises ("CPs") 720 (herein depicted as single family homes, although CPs may be any type of premises including, but not limited to multi-dwelling units ("MDUs"), commercial offices, industrial premises, etc.). The OLT 715 might be located at a central office or at a digital subscriber line access multiplexer ("DSLAM"), or the like, of a telecommunications service provider. In FIG. 7, F1 line 725 (between the OLT 705 and the FDH 710) is represented by a thick solid line, while each F2 line 730 (between the FDH 710 and each NAP 715) is represented by a dashed line, and each F3 line 735 (between each NAP 715 and each CP 720) is represented by a thin solid line. At least a portion of each of the F1 line 725, the F2 lines 730, and the F3 lines 735 is routed through at least a portion of an apical conduit component 740, which might include, without limitation, a missile bore(s), a bore hole(s), a conduit(s), and/or a channel of one or more of a source slot(s), a main slot(s), a cross slot(s), and/or a far-side slot(s), or the like (which are described in detail above). In various embodiments, the F3 lines 735 might each include a single (duplex) fiber line, while the F2 lines 730 might each include 8 main single (duplex) fiber lines and 4 spare single (duplex) fiber lines (for a total of 12 single (duplex) fiber lines), and the F1 lines 725 might include 16 to 24 fiber cables, each might include a single (duplex) fiber lines (as described in detail above), and one of the single (duplex) fiber lines 725 might communicatively couple to (and may be "split" by) an input port of a cable distribution device 745 (as described in detail below).

Figure 7A:
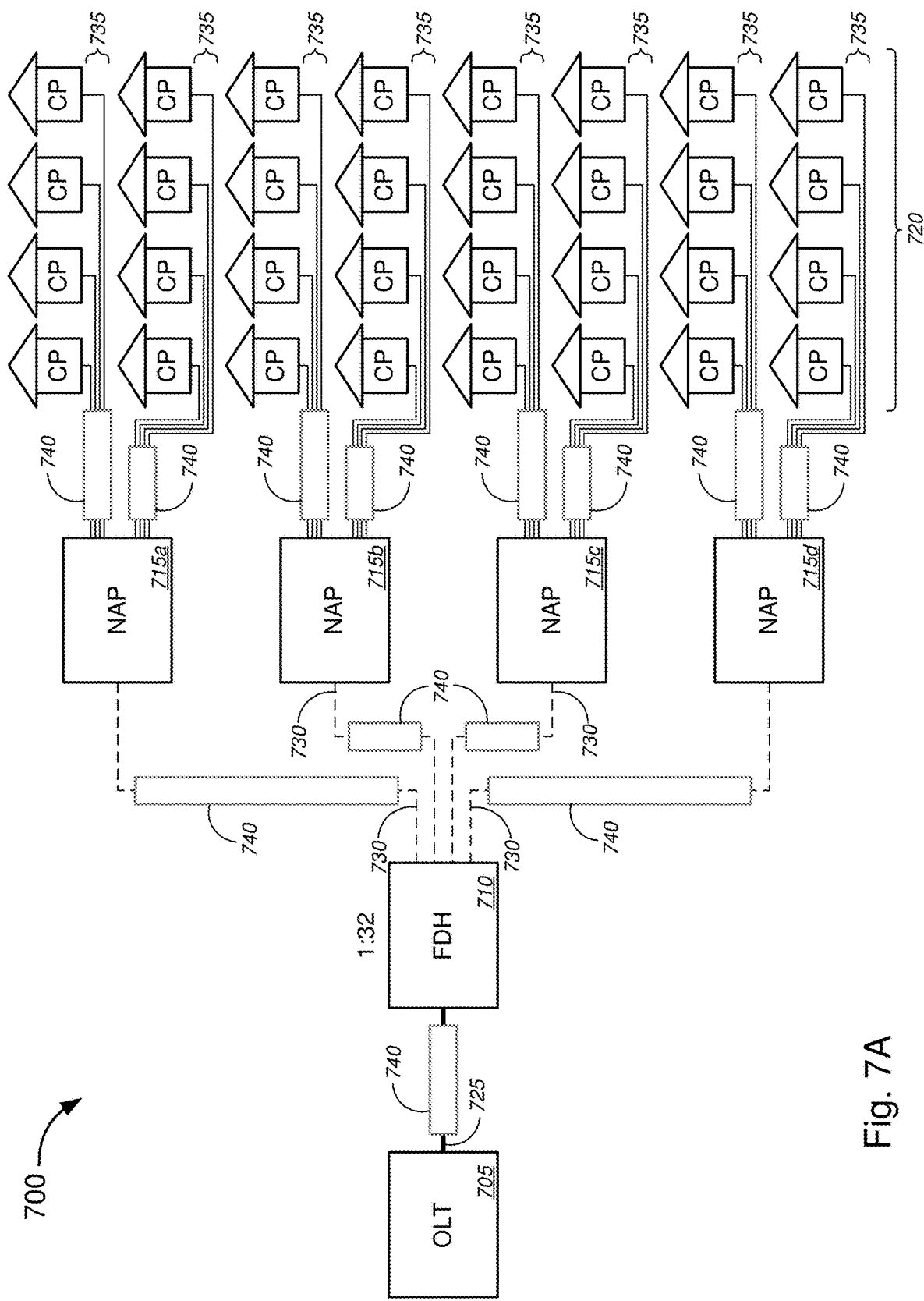
FIGS. 7A-7E are general schematic diagrams illustrating various systems for establishing a PON communications system, in accordance with various embodiments.
Figure 7B:
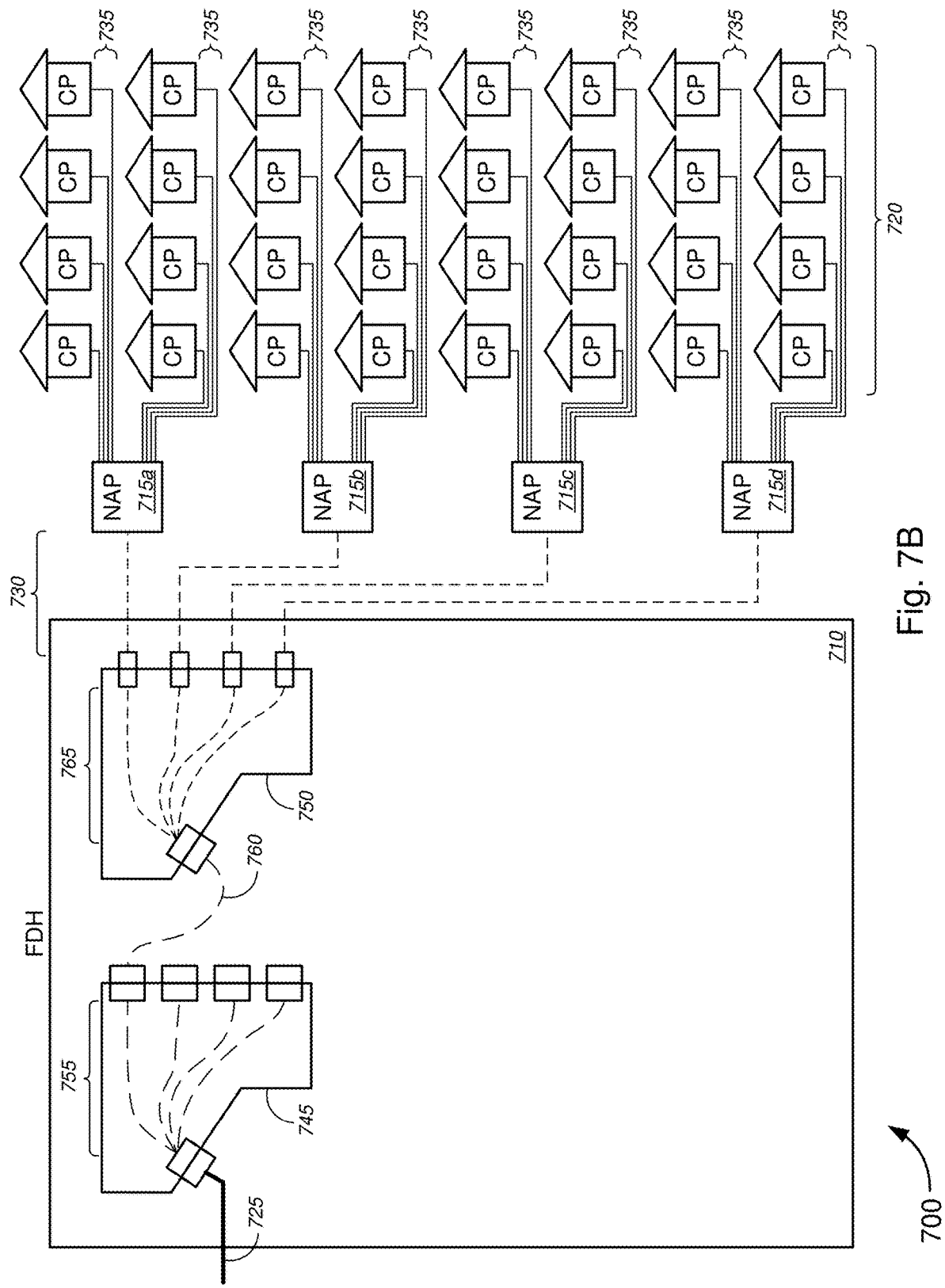
Figure 7C:
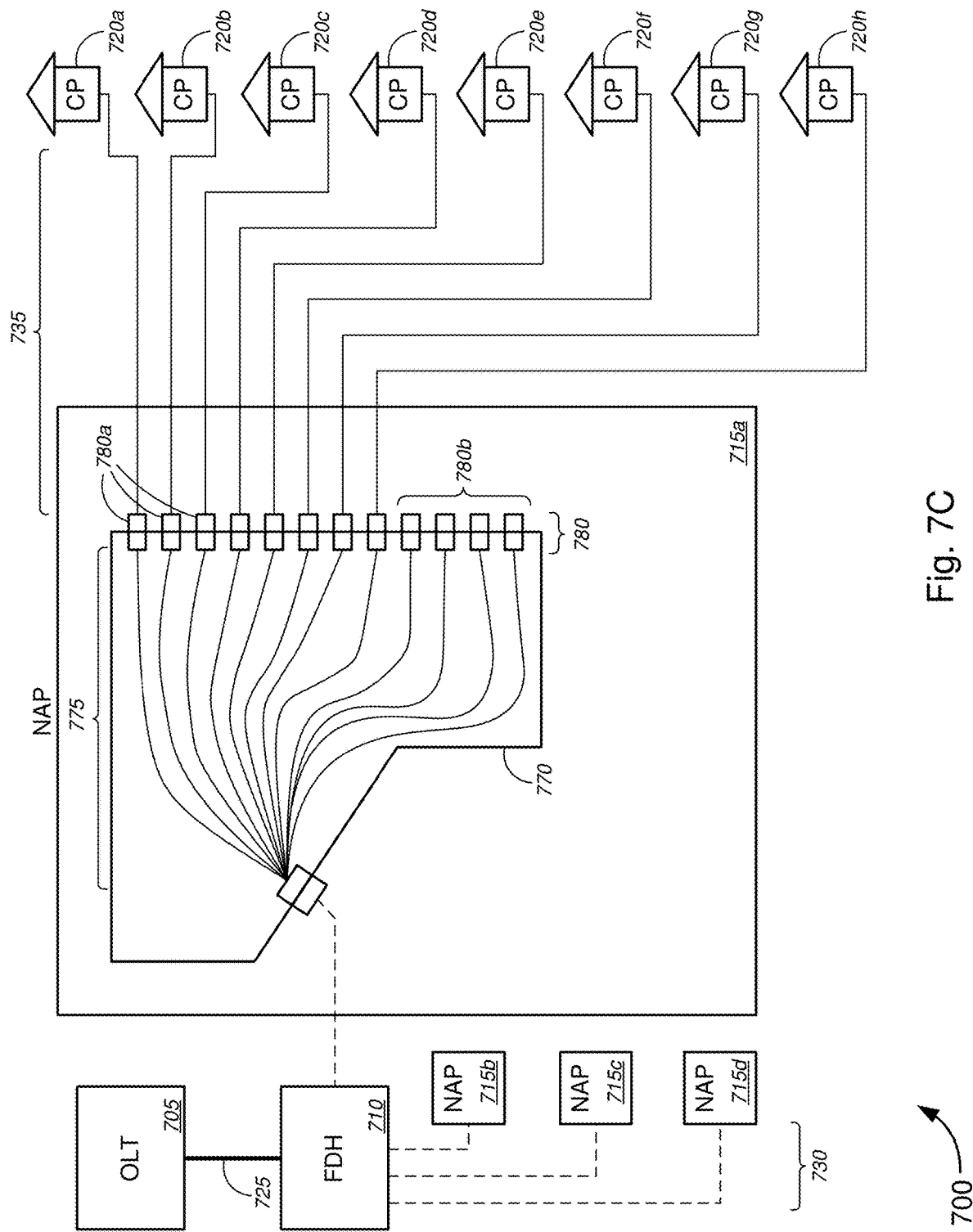
Figure 7D:
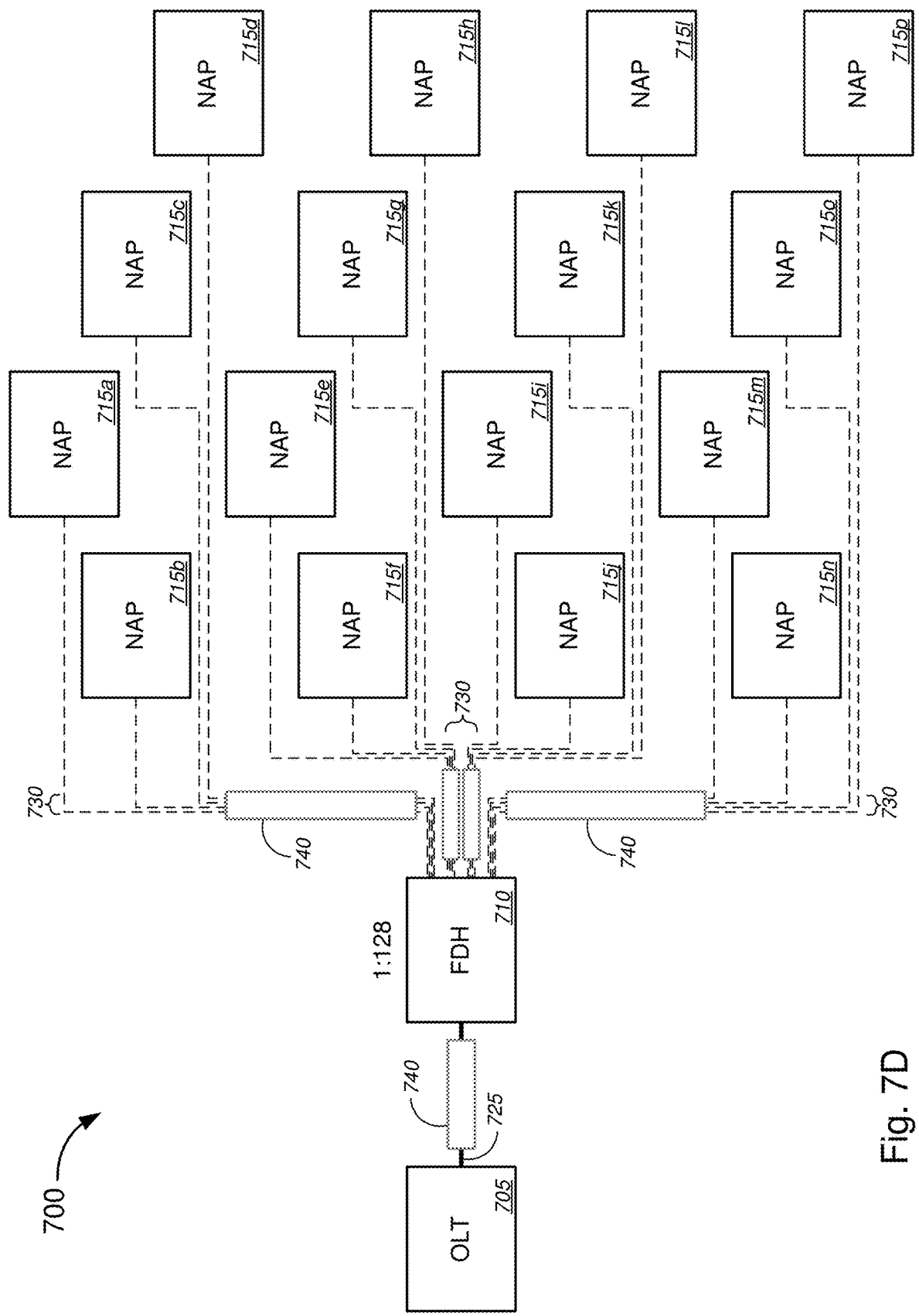
Figure 7E:
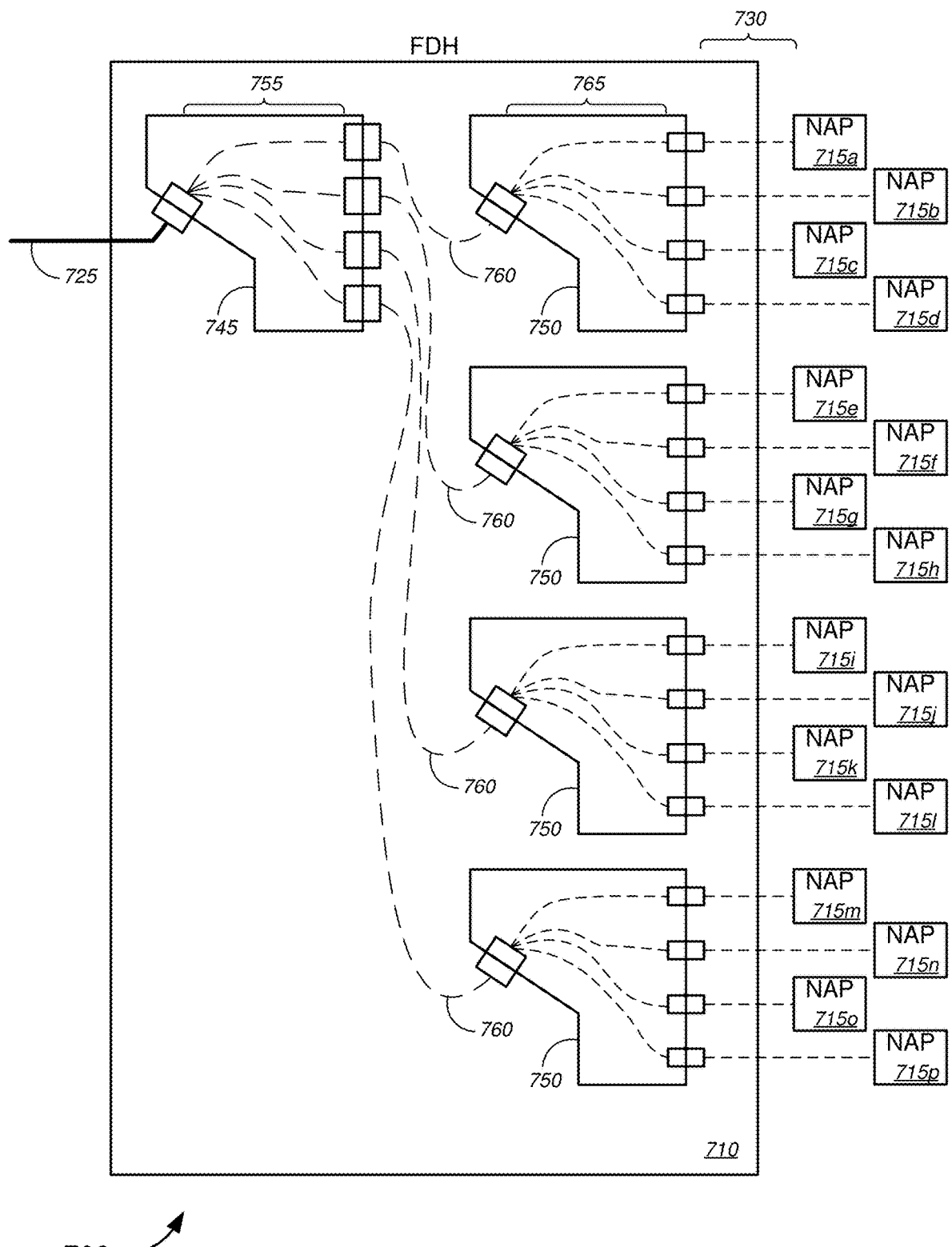

FIGS. 7A-7C depict a 1:32 arrangement, for simplicity of illustration, in which a single F1 line 725 might feed or serve 32 customer premises 720 via 4 NAPs 715a-715d (collectively, "NAPs 715"), while FIGS. 7D and 7E depict a more practical 1:128 arrangement, in which a single 1 line 725 might feed or serve 128 customer premises 720 (not shown) via 16 NAPs 715a-715p (collectively, "NAPs 715"). Herein, "1:32" or "1:128" refers to an F1 line input being (ultimately) split into 32 or 128 individual lines that each connect with a customer premises or the like. Although FIG. 7 illustrates particular number (in the examples of FIG. 7, either 32 or 128), the various embodiments are not so limited, and any suitable number of connections or any suitable connection ratio may be implemented as appropriate or desired.

As shown in the embodiments of FIGS. 7B and 7E, the FDH 710 include, without limitation, at least one first cable distribution device 745 and at least one second cable distribution device 750, each of which might include, but is not limited to, an optical line fanout module, a MPO fiber optic cassette, an optical splitter, a bundler/de-bundler, and/or the like. In the embodiment of FIG. 7B, for example, FDH 710 comprises a first cable distribution device 745 and a second cable distribution device 750. In some embodiments, the first cable distribution device 745 receives the F1 line 725 at a first input port, and splits that line into four first intermediate lines 755 that couple to four output ports. Herein, "splitting" the F1 line 725 into n intermediate lines 755 might refer to an optical splitter device that receives an input optical signal from the F1 line 725 and optically splits or divides the signal evenly (i.e., splits the optical power evenly) into n intermediate lines 755. In some cases, the cable distribution device might include one or more of fiber optic splitters (herein, simply referred to as "splitter"), each of which might include, but is not limited to, a fused biconical taper ("FBT") splitter, a planar lightwave circuit ("PLC") splitter, and/or or other suitable optical splitter, or the like. In some instances, a splitter might include a beam splitter, including, without limitation, one or more mirrors, one or more prisms, or the like. The one or more mirrors might include, but are not limited to, one or more half-mirrors, one or more dichroic mirrors, one or more dichroic mirrored prisms, and/or the like. The one or more prisms might include, without limitation, one or more dichroic mirrored prisms, or the like.

In FIG. 7B, because there is only one second cable distribution device 750 (or only one second cable distribution device 750 is being used), one of the first intermediate lines 755 communicatively couples with the second cable distribution device 750 via a second intermediate line 760, while the other first intermediate lines 755 remain uncoupled to any second cable distribution device. Within the second cable distribution device 750, the second intermediate line 760 is received at an input port, and is split into four third intermediate lines 765 that couple to four output ports, each of which is communicatively coupled to a NAP 715 (in this example, to NAPs 715a-715d), via an F2 line 730. In operation within a PON communications system, as shown in the embodiment of FIG. 7B, the input port of the second cable distribution device 750 (which might be a 1:32 splitter) receives the second intermediate line 760, and "splits" the signal from the single optical fiber line (of the second intermediate line 760) into 32 fiber lines. Each of the four third intermediate lines 765 has "bundled" therein 8 of the 32 fiber lines that are "split" from the second intermediate line 760. Each of the four third intermediate lines 765 also has "bundled" therein 4 spare fiber lines that are not communicatively coupled to the second intermediate line 760, for a total of 12 fiber lines (i.e., 12 single (duplex) fiber lines) bundled in each of the four third intermediate lines 765. Each of the four output ports might include a MPO/MTP connector (as described above). Here, both the first and second intermediate lines 755 and 760 (each of which is a single (duplex) fiber line) are represented by long dashed lines, while the third intermediate lines 765 (each of which is a single bundled (duplex) fiber line) are represented by dashed lines.

In contrast, in the embodiment of FIG. 7E, each of the first intermediate lines 755 communicatively couples with each of four second cable distribution devices 750 via one of four second intermediate lines 760. Each of the four second cable distribution devices 750 receives a second intermediate line 760 and splits the second intermediate line into four third intermediate lines 765, each of which communicatively couples to one of 16 NAPs 715a-715p, via an F2 line 730. As in the embodiment of FIG. 7B, for a PON communications system, as shown in the embodiment of FIG. 7E, the input port of each second cable distribution device 750 (which might be a 1:32 splitter) receives one of the second intermediate lines 760, and "splits" the signal from the single optical fiber line (of the one second intermediate line 760) into 32 fiber lines. Each of the four third intermediate lines 765 has "bundled" therein 8 of the 32 fiber lines that are "split" from the second intermediate line 760. Each of the four third intermediate lines 765 also has "bundled" therein 4 spare fiber lines that are not communicatively coupled to the second intermediate line 760, for a total of 12 fiber lines (i.e., 12 single (duplex) fiber lines) bundled in each of the four third intermediate lines 765. Each of the four output ports of each second cable distribution device 750 might include a MPO/MTP connector (as described above).

Turning back to the 1:32 arrangement, and with reference to FIG. 7C, each of the four NAPs (in this example, only NAP 715a is shown for simplicity of illustration, but the other NAPs 715b-715d are similar to NAP 715a) includes, without limitation, a third cable distribution device 770. The third cable distribution device 770 receives the F2 line 730 (which is a single bundled (duplex) fiber line having 12 lines bundled therein) at a first input port, and "de-bundles" that line into 12 fourth intermediate lines 775, which represent 8 main optical fiber lines and 4 spare optical fiber lines. The 8 main optical fiber lines—which are "split" from the second intermediate line 760 via the input port of the second cable distribution device 750—might each couple to a main output port 780a of the third cable distribution device 770, while the 4 spare optical fiber lines might each couple to a spare output port 780b. In operation, in accordance with some embodiments, each of the 8 main optical fiber lines might communicatively couple (at least in an initial setup) with each of 8 customer premises 720a-720h, via an F3 line 735, while each of the 4 spare optical fiber lines might remain unconnected with any of the customer premises 720.

In the embodiments of FIG. 7, as applied to PON communications systems, the signals carried by the F1 line 725 from the OLT 705, according to various embodiments, might comprise all the signals intended to be distributed to all the customer premises 720 that are fed or served by the one F1 line 725. The F1 line 725 is split, within a first cable distribution device 745, into n first intermediate lines 755 (i.e., n=1 or 4 first intermediate lines 755 in the embodiment of FIG. 7B, and n=4 first intermediate lines 755 in the embodiment of FIG. 7E). Each first intermediate lines 755 communicatively couples to a second cable distribution device 750 via a second intermediate line 760, which is split, within the (input port of the) second cable distribution device 750, into m fiber lines (i.e., m=32 fiber lines in the embodiment of FIGS. 7B and 7E, although the various embodiments are not limited to splitting into 32 fiber lines and m can be any suitable number). The m fiber lines are "bundled" into x third intermediate lines 765, each also bundled together with y spare fiber lines (i.e., x=4 third intermediate lines 765 and y=4 spare fiber lines bundled in each of the third intermediated lines 765, in the embodiments of FIGS. 7B and 7E), each of which communicatively couples to a NAP 715 via an F2 line 730. Each F2 line 730 is received by a third cable distribution device 770 within the NAP 715, and the input port of the third cable distribution device 770 "de-bundles" the fiber lines in the F2 line 730. Some of the de-bundled fiber lines are communicatively coupled to customer premises 720 via fourth intermediate lines 775, output ports of the third cable distribution device 770 (which might include, without limitation, LC connectors or the like, as described above), and F3 lines 735.

In operation, the F1 line 725 is "split" evenly (or divided evenly) into n fiber lines; as a consequence, the power of the optical signal in the F1 line 725 is evenly split (or divided) by n. In a similar manner, the F2 line 730 is "split" (or divided) evenly into m fiber lines; as a consequence, the power of the optical signal in the F2 line 730 is evenly split (or divided) by m. At each customer premises, a NID or ONT receives the F3 line 735, the downloaded signal which is split from the F1 line 725 (as described above) is decoded and/or authenticated by the NID or ONT so that only the data or content intended for the particular user(s) associated with the particular customer premises and/or the particular NID/ONT is delivered to the user device(s) associated with the particular user(s).

For uploading data or content from the user device(s) associated with the particular user(s) to the OLT 705, in accordance with various embodiments, the uploaded signal might be time division de-multiplexed (at the splitting points in the PON communications system) with the uploaded signal from the other customer premises that are fed or served by the same F1 line 725. To carry both the downloaded signal and the uploaded signal on the same fiber line, one of the downloaded signal or the uploaded signal is sent over a first wavelength (or a first range of wavelengths), while the other of the downloaded signal or the uploaded signal is sent over a second wavelength (or a second range of wavelengths), with signals at both wavelengths being concurrently transmitted along the same single (duplex) fiber line (albeit in opposite directions). At each splitter, attenuation may occur as a result of the signal power being divided. In some cases, 3% attenuation may result for each split. In some cases, a 1:4 split might result in 7.25 dB attenuation, while a 1:32 split might result in a 17.0 dB attenuation. In some instances, an SC/APC connector might have an attenuation of 0.25 dB, while an MPO/MPT connector might have an attenuation of 0.5 dB. For the uploading signal, similar attenuation might occur when time division de-multiplexing.

The embodiments of FIG. 7 allow for service by one service provider in an apical conduit-based passive optical network. However, when a customer wishes to change services (e.g., to an Ethernet fiber line service, an EPON service, a NGPON service, a NGPON2 service, and/or the like), it may be necessary to pull out at least some of the lines 730 and/or 735, in order to provide such other services to the requesting customer, especially if the new services are provided by a second service provider different from the service provider who laid (and/or is maintaining/operating) the passive optical network. Such an approach is costly and time consuming, because some excavation might be necessary, which requires surveying, actual excavation, laying of new optical lines and connections, inspections, and/or the like to be performed. The techniques and systems as described below with respect to FIGS. 8A-12B provide a way to implement point-to-point fiber insertion of new services without the need for excavation, in a "touchless" approach, which results in significant cost savings and efficient implementation, while avoid risk of mistakes in excavating or cutting the wrong fiber lines. In FIGS. 7A-10B, like numerals denote similar components, which are described in detail above with respect to system 700 of FIG. 7.

Figure 8A:
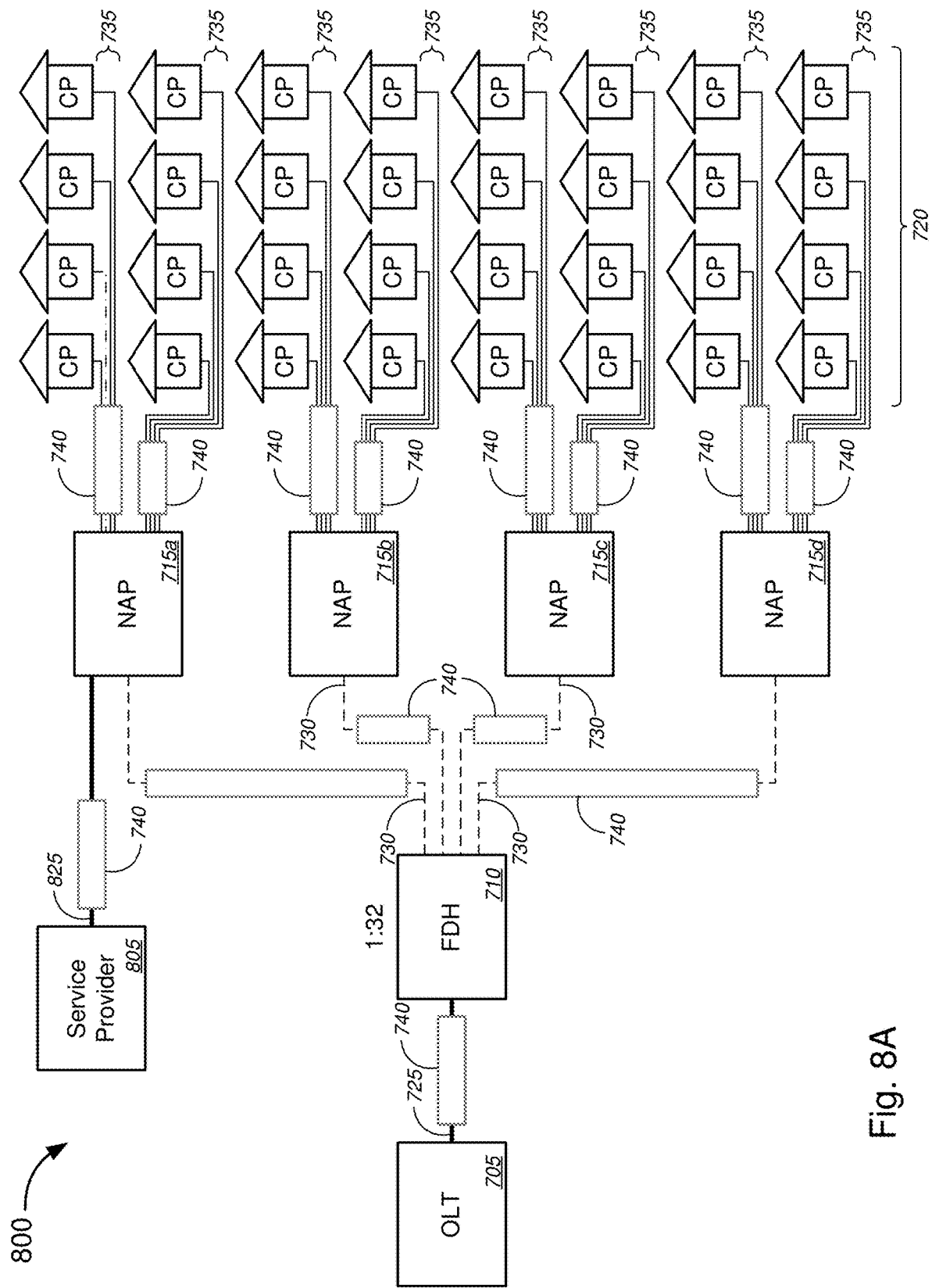
FIGS. 8A-8C are general schematic diagrams illustrating various systems for implementing point-to-point fiber insertion within a PON communications system, in accordance with various embodiments.
Figure 8B:
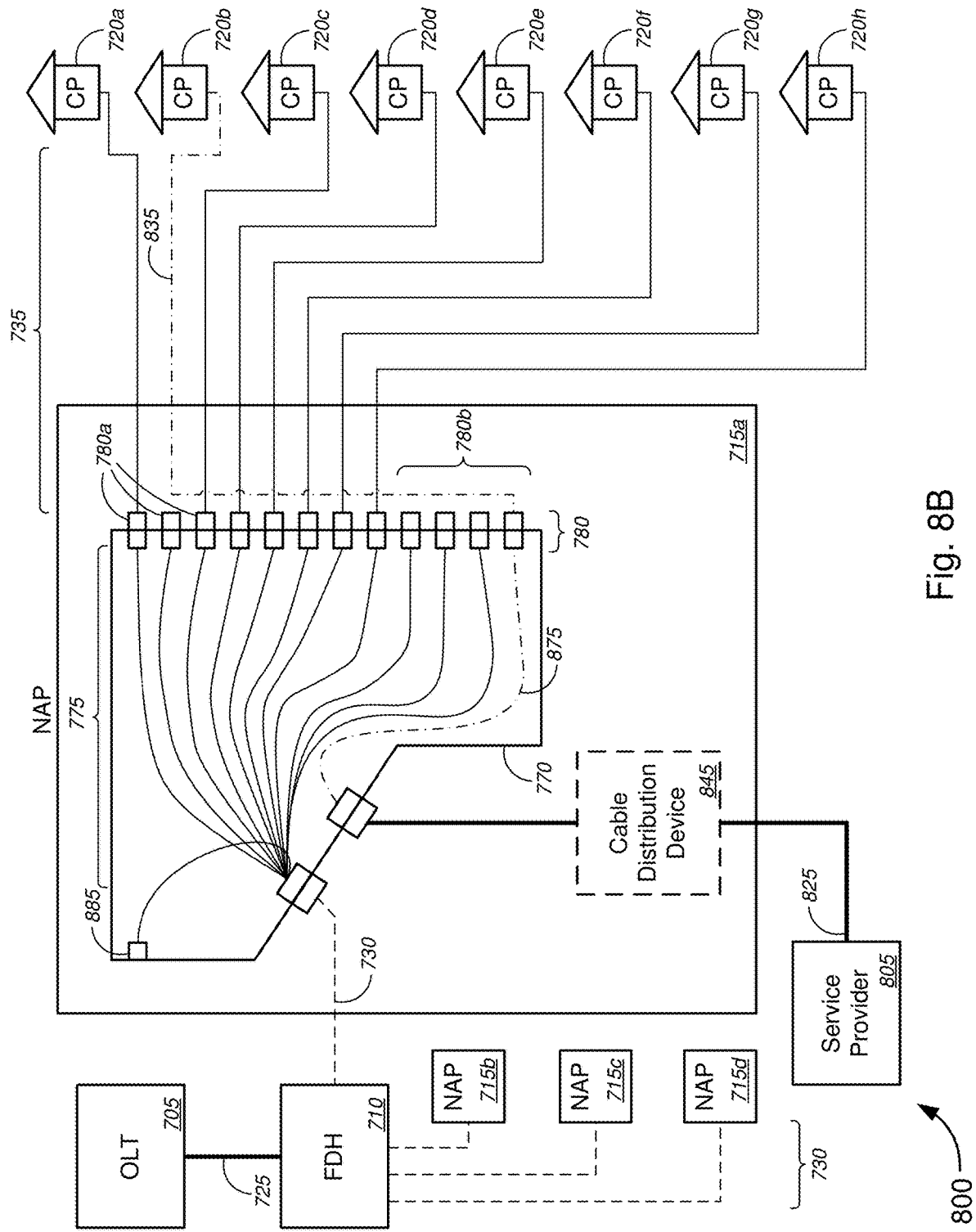
Figure 8C:
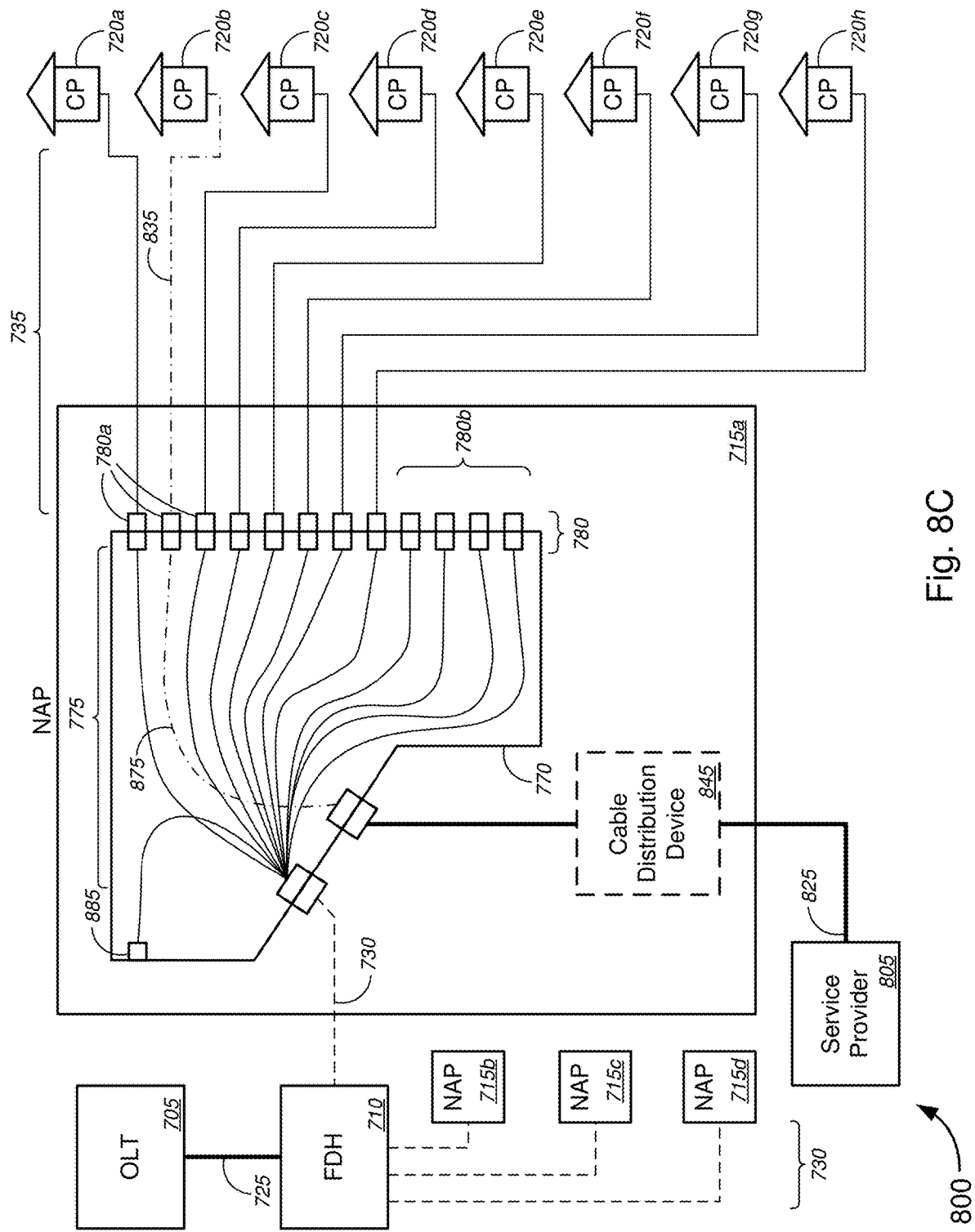

We now turn to FIGS. 8A-8C (collectively, "FIG. 8"), which are general schematic diagrams illustrating various systems 800 for implementing point-to-point fiber insertion within a PON communications system (or alternatively, within an Ethernet fiber communications system, within an EPON, NGPON, or NGPON2 communications system, and/or the like), in accordance with various embodiments. In FIG. 8, various embodiments are depicted in which point-to-point fiber insertion occurs via one of the NAPs 715 (in this example, via NAP 715a). As shown in FIG. 8A, a service provider 805 (which might be the same service provider that laid or maintains/operates the passive optical network, or a different service provider) might provide a second F1 line 825 to NAP 715a from an OLT (not shown), which might be the same OLT as OLT 705 or a different one, and the OLT might be located at a central office or a DSLAM of the service provider 805. At least a portion of the second F1 line 825 might be routed through at least a portion of an apical conduit component 740 (in a manner similar to at least a portion of each of the F1 line 725, the F2 lines 730, and the F3 lines 735 being routed through at least a portion of an apical conduit component 740, as described above). In some cases, the F1 line 725 and the F1 line 825 might be routed through the same portion(s) of a channel(s) of one or more of the apical conduit components 740 (e.g., source slot 335, main slot 340, cross slot 375, far-side slot 390, etc.).

With reference to FIG. 8B, which depicts NAP 715a of FIG. 7C, except that NAP 715a further includes, without limitation, fourth cable distribution device 845, which receives the second F1 line 825 from service provider 805, and routes at least one fiber line from the second F1 line 825 to a second input port of the third cable distribution device 770. In some cases, the second F1 line 825 might be routed from the service provider 805 to the second input port of the third cable distribution device 770 without routing through the fourth cable distribution device 845; in some instances, the NAP 715 might not include the fourth cable distribution device 845 at all. The second input port of the third cable distribution device 770 receives the at least one fiber line from the second F1 line 825, and couples with one of the spare output ports 780b via a fifth intermediate line 875, which communicatively couples with one of the customer premises 720 (in this example, customer premises 720b) via F3 line 835 (and via the one of the spare output ports 780b).

In operation within a PON communications system, if there is only one fiber line to be connected from service provider 805 to one of the customer premises 720 through the NAP 715a, then no splitting occurs, and a 1:1 connection is made (at the second input port) between the single (in some cases, duplex) fiber line of the second F1 line 825 and the single fiber line of the fifth intermediate line 875. In embodiments in which there is more than one fiber line to be connected from service provider 805 to more than one of the customer premises 720 through the NAP 715*a* (as shown, e.g., in FIGS. 10A and 10B), for a second PON communications service being implemented as a point-to-point fiber insertion within the main PON communications system (i.e., as described above with respect to FIG. 7), splitting might occur in a manner similar to that described above with respect to FIGS. 7B and 7E (for the embodiment of FIG. 10A (as applied to a second PON communications system), 1:4 splitting might occur, while, for the embodiment of FIG. 10B (as applied to a second PON communications system), 1:2 or 1:4 splitting might occur), with the second F1 line 825 split and coupled to more than one fifth intermediate line 875. In alternative embodiments, in which another fiber service (including, but not limited to, Ethernet fiber communications, a GPON communications, EPON communications, NGPON communications, NGPON2 communications, or the like) is being implemented as a point-to-point fiber insertion within the main PON communications system (i.e., as described above with respect to FIG. 7), no splitting might occur despite there being more than one fiber line to be connected from service provider 805 to more than one of the customer premises 720 through the NAP 715*a*—rather individual or separate fibers might be coupled from the second F1 line(s) 825 to fiber lines to the corresponding ones of the customer premises 720 through the NAP 715.

The one fourth intermediate line 775 that is displaced by the fifth intermediate line 875 (i.e., that was connected to the one of the spare output ports 780*b*) is instead coupled to a dummy port 885 of a plurality of dummy ports (collectively referred to herein as a "parking lot"). Each dummy port receives a fiber line, but is otherwise unconnected with any other component, thereby preventing communication between the fiber line connected thereto and any other component or port. Herein, the fifth intermediate line 875 and the F3 line 835 are each represented by a dash-dot line.

FIG. 8C depicts an alternative embodiment, in which rather than connecting with a spare output port 780*b*, the fifth intermediate line connects with one of the main output ports 780*a* that is associated with the subject customer premises 720 (in this example, customer premises 720*b*) and/or with the F3 line associated with the subject customer premises (in this example, F3 line 835). In this manner, interconnections need only be made to the second input port of the third cable distribution device 770 and internal ports and/or connections of the third cable distribution device 770, rather than external output ports of the third cable distribution device 770. In this embodiment, the one fourth intermediate line 775 that is displaced by the fifth intermediate line 875 (i.e., that was connected to the one of the one main output port 780*b*) is instead coupled to a dummy port 885 of the parking lot. The embodiment of FIG. 8C would otherwise be similar to the embodiment of FIG. 8B, and the description of the embodiment of FIG. 8B similarly applies to the embodiment of FIG. 8C.

The structure, functions, and/or operations of the system 800 would otherwise be similar, or identical, to those of system 700 of FIG. 7, and thus descriptions of such similar structure, functions, and/or operations of system 700 are applicable to those of FIG. 8, and are omitted here to avoid excessive duplication (unless provided herein for emphasis).

Figure 9A:
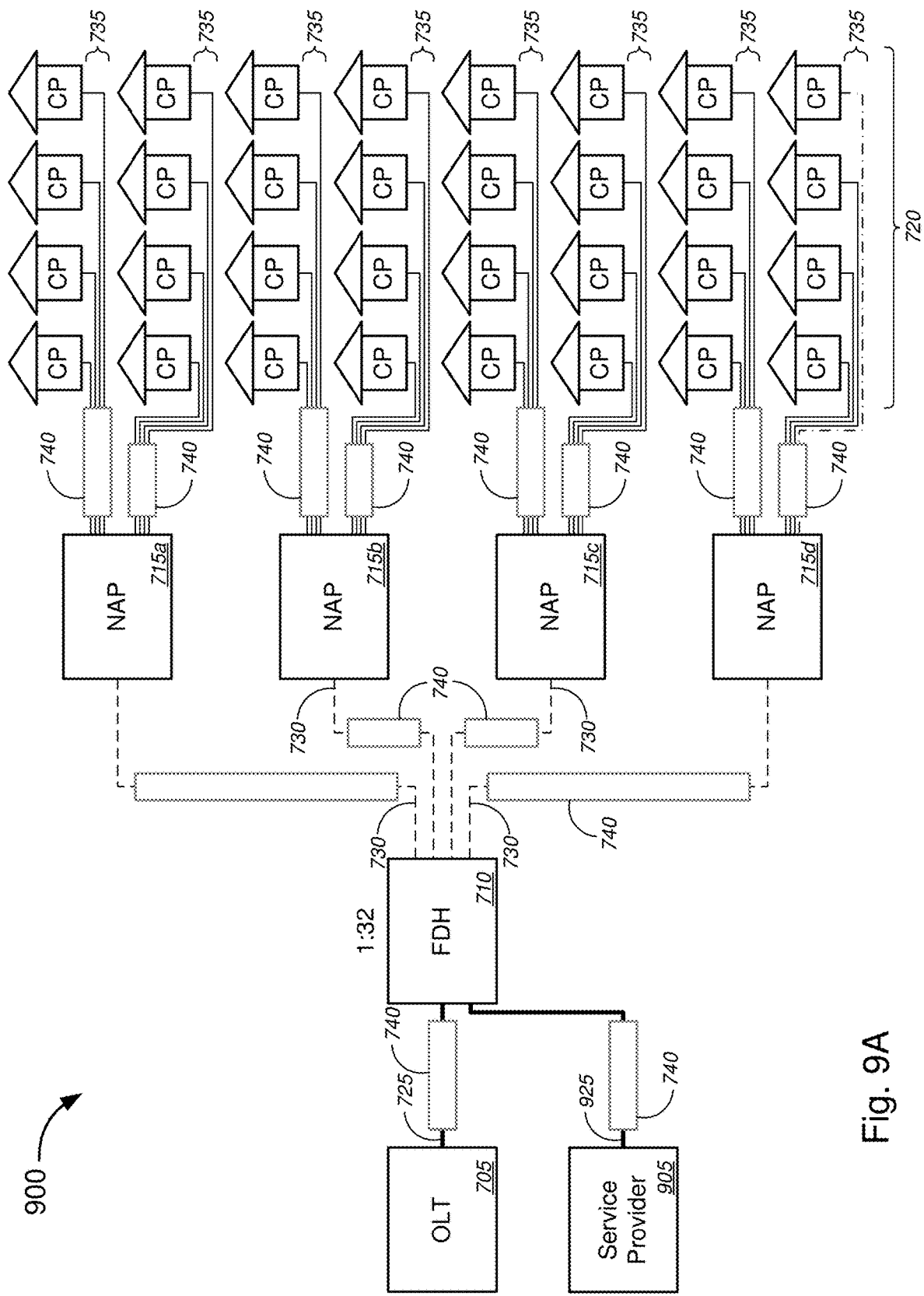
FIGS. 9A-9F are general schematic diagrams illustrating various other systems for implementing point-to-point fiber insertion within a PON communications system, in accordance with various embodiments.

FIGS. 9A-9F (collectively, "FIG. 9") are general schematic diagrams illustrating various other systems 900 for implementing point-to-point fiber insertion within a PON communications system (or alternatively, within an Ethernet fiber communications system, within an EPON, NGPON, or NGPON2 communications system, and the like), in accordance with various embodiments. For simplicity of illustration, the embodiments of FIG. 9 are shown using the 1:32 arrangement, as described above, although any suitable connection ratio may be implemented, not inconsistent with the techniques and systems shown and described herein. In FIG. 9, rather than implementing point-to-point fiber insertion via one of the NAPs 715, point-to-point fiber insertion is implemented via the FDH 710. As shown in FIG. 9A, a service provider 905 (which might be the same service provider that laid or maintains/operates the passive optical network, or a different service provider) might provide a third F1 line 925 to FDH 710 from an OLT (not shown), which might be the same OLT as OLT 705 or a different one, and the OLT might be located at a central office or a DSLAM of the service provider 905. At least a portion of the third F1 line 925 might be routed through at least a portion of an apical conduit component 740 (in a manner similar to at least a portion of each of the F1 line 725, the F2 lines 730, and the F3 lines 735 being routed through at least a portion of an apical conduit component 740, as described above, and/or in a manner similar to at least a portion of the second F1 line 825 being routed through at least a portion of an apical conduit component 740). In some cases, the F1 line 725 and the F1 line 925 might be routed through the same portion(s) of a channel(s) of one or more of the apical conduit components 740 (e.g., source slot 335, main slot 340, cross slot 375, far-side slot 390, etc.).

Figure 9B:
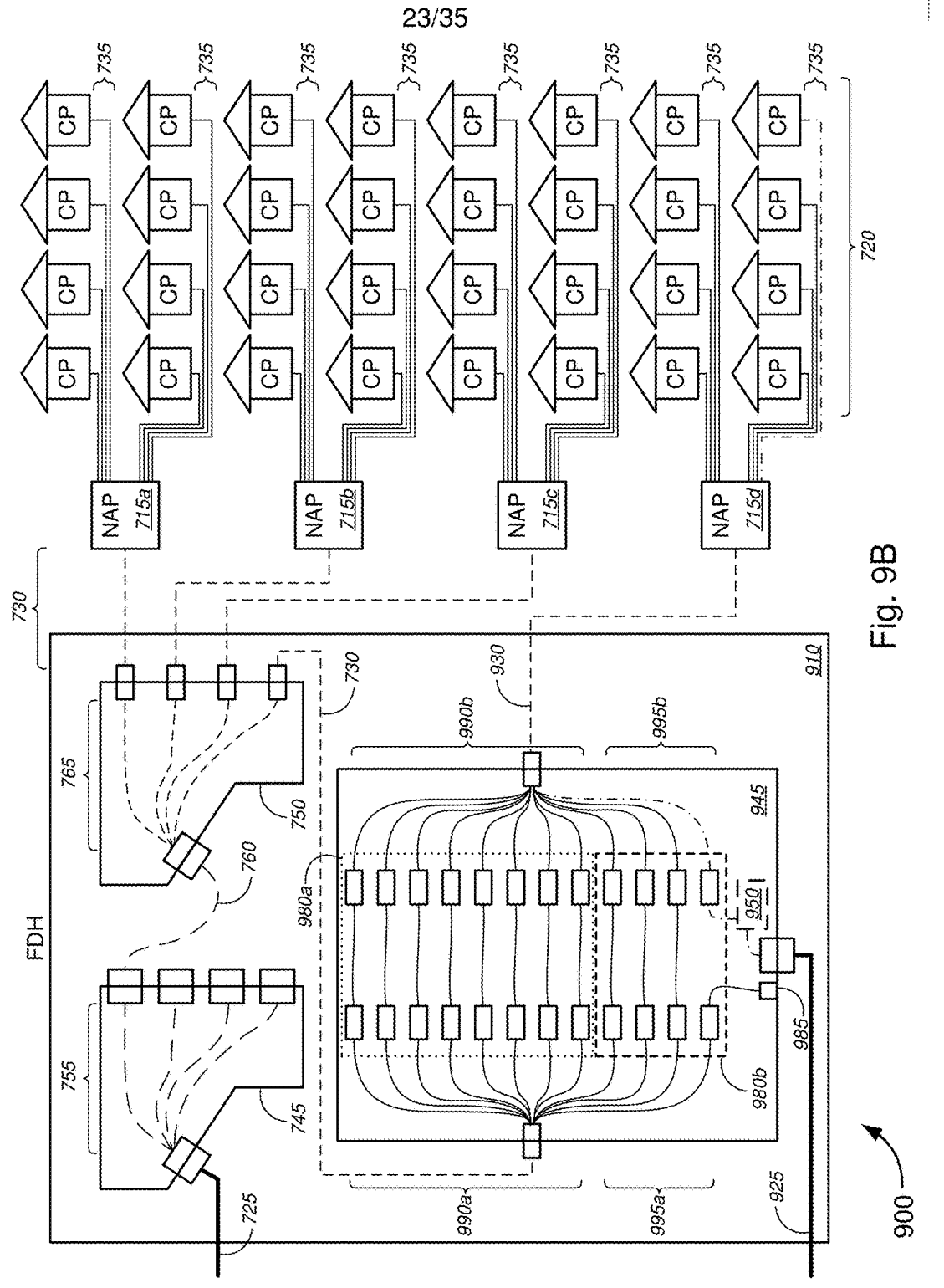

With reference to FIG. 9B, FDH 910 is similar to FDH 710 of FIG. 7B, except that FDH 910 further includes, without limitation, a fifth cable distribution device 945 (herein also referred to as a "red box device," as described in detail above), which receives one of the F3 lines 730 that would otherwise be routed to one of the NAPs 715 (in this example, NAP 715*d*). As shown in FIG. 9B, the F3 line 730 that is received by the fifth cable distribution device 945 is "de-bundled," at the input port of the fifth cable distribution device 945, from a single bundled (duplex) fiber line 730 into 12 single (duplex) fiber lines, 8 of which are main fiber input lines 990*a* that each connect with each of 8 main fiber output lines 990*b* via connectors and intermediate fiber lines between connectors (as shown in dotted line box 980*a*). 4 of the 12 fiber lines might include spare fiber input lines 995*a* that each connect with a connector that, in some cases, may each couple with a corresponding connector coupled to each of 4 spare fiber output lines 995*b* (as shown in dashed line box 980*b*). The 8 main fiber output lines and the 4 spare fiber output lines combine (or are "bundled" or "re-bundled") at the output port of the fifth cable distribution device 945 and output as F3 line 930 that communicatively couples with the subject NAP 715 (in this case, NAP 715*d*). The fifth cable distribution device 945 might further receive the third F1 line 925 from service provider 905, and might (optionally) include a sixth cable distribution device 950. The (optional) sixth cable distribution device 950 might receive the third F1 line 925 and might route at least one fiber line from the third F1 line 925 to a connector that is communicatively coupled to the output port of fifth cable distribution device 945 that in turn is communicatively coupled to the NAP (here, NAP 715*d*). The intermediate line(s) that would previously have connected the input connector(s) and the output connector(s) of the spare fiber line(s), and that is(are) displaced by the at least one fiber line from the third F1 line 925 via the sixth cable distribution device 950, is(are) subsequently connected to a dummy port(s) 985 of a parking lot (similar to that as described above with respect to FIG. 8), as shown in dashed line box 980*b*.

In some cases, where a second PON communications system is being implemented as a point-to-point fiber insertion within the main PON communications system (i.e., as described above with respect to FIG. 7), the sixth cable distribution device 950 might include a splitter, for splitting the one fiber line 925 into multiple fiber lines to be bundled with the main fiber output lines 990b at the output port of the fifth cable distribution device 945. In alternative cases, where another fiber service (including, but not limited to, Ethernet fiber communications, GPON communications, EPON communications, NGPON communications, NGPON2 communications, or the like) is being implemented as a point-to-point fiber insertion within the main PON communications system (i.e., as described above with respect to FIG. 7), no splitter might be used—rather individual or separate fibers might be coupled from the third F1 line(s) 925 to fiber lines within the fifth cable distribution device 945.

Figure 9C:
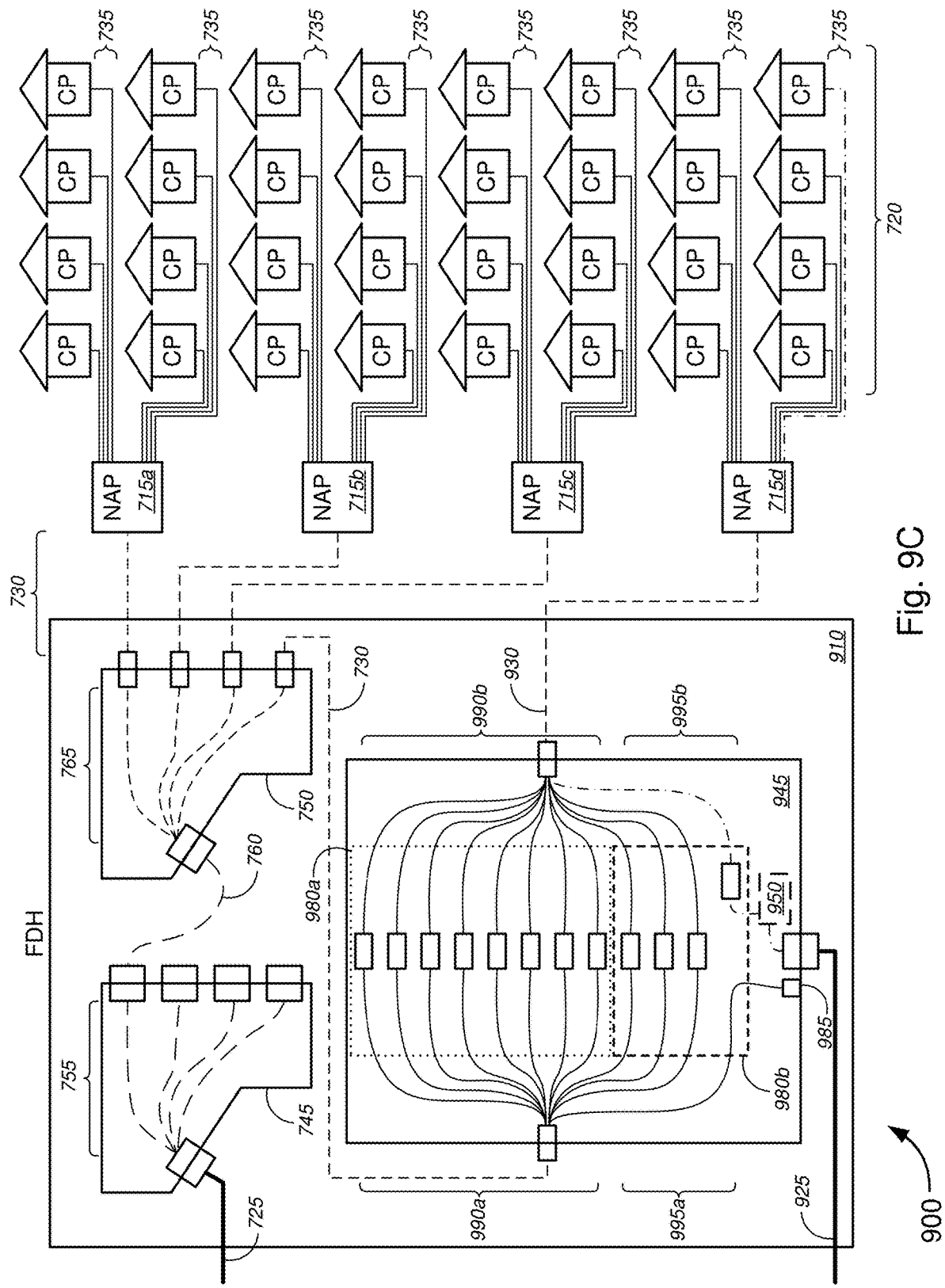

In an alternative embodiment, as shown in FIG. 9C, rather than input connectors coupling with output connectors via an intermediate line for each of "pass-through" main fiber lines 990 and spare fiber lines 995, a single connector connects input fiber lines with output fiber lines for "pass-through" connection (i.e., main fiber input lines 990a with main output lines 990b, spare fiber input lines 995a with spare output lines 995b). For the non-pass-through connection (i.e., for the point-to-point fiber insertion connection), as shown in dashed line box 980b of FIG. 9C, the one spare input fiber line is coupled to the dummy port 985 directly, while the at least one fiber line from the third F1 line 925 (via the sixth cable distribution device 950) is coupled via a connector to the corresponding spare fiber output line 995b that is communicatively coupled to the output port of fifth cable distribution device 945 that in turn is communicatively coupled to the NAP (in this example, NAP 715d). The embodiment of FIG. 9C would otherwise be similar to the embodiment of FIG. 9B, and the description of the embodiment of FIG. 9B would similarly be applicable to the embodiment of FIG. 9C.

Figure 9D:
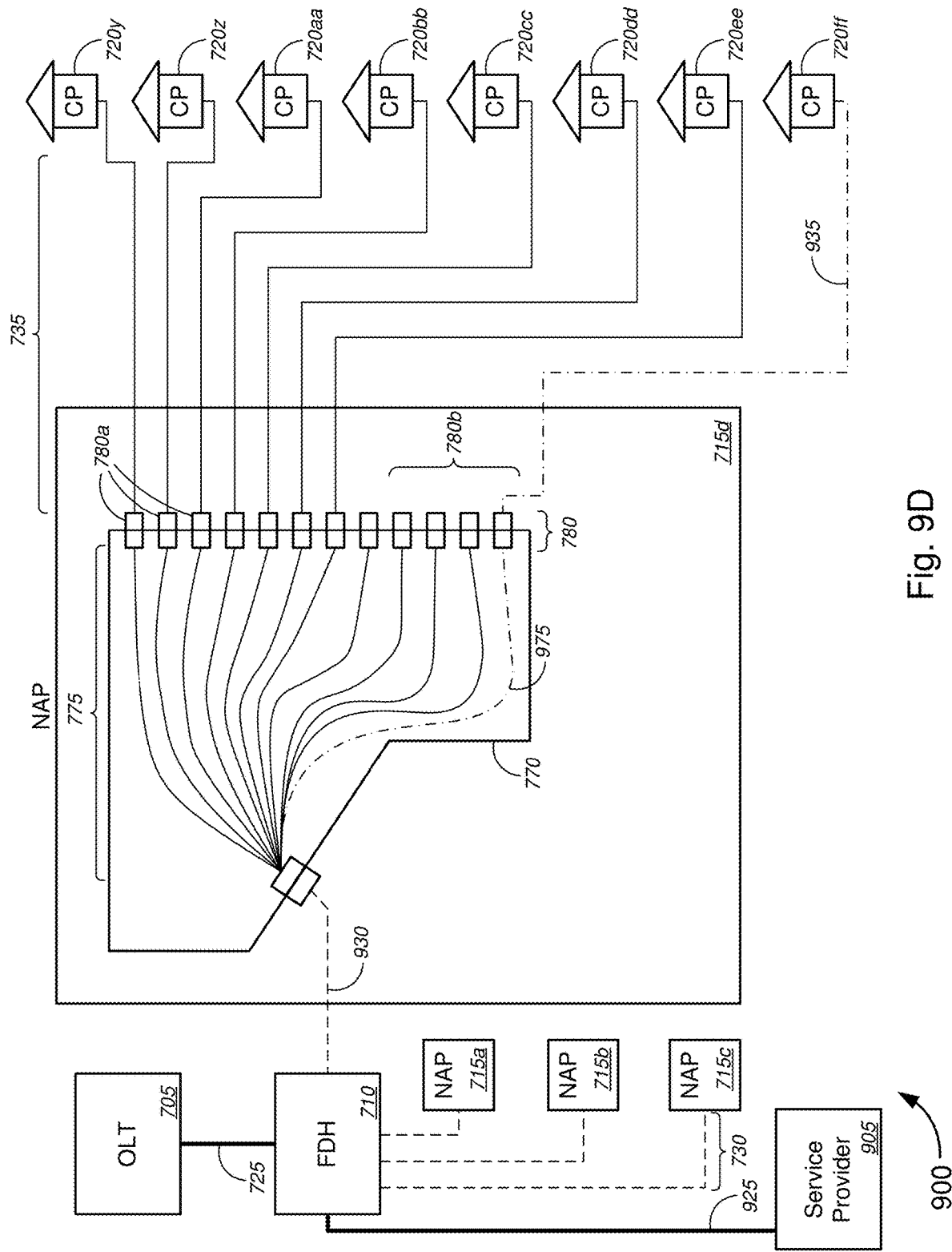

Turning to FIG. 9D, the F3 line 930 is received by the third cable distribution device 770 of NAP 715d, and intermediate line 975—which communicatively couples to the at least one fiber line from the third F1 line 925 (via the sixth cable distribution device 950, via the connector to the corresponding spare fiber output line 995b that is communicatively coupled to the output port of fifth cable distribution device 945)—couples to a spare output port 780b, which is communicatively coupled to one of the customer premises 720 (in this cases, customer premises 720f) via F3 line 935. The embodiment of FIG. 9D is otherwise similar to the embodiments of FIGS. 7C and 8B, and the descriptions of the embodiments of FIGS. 7C and 8B are similarly applicable to the embodiment of FIG. 9D.

Figure 9E:
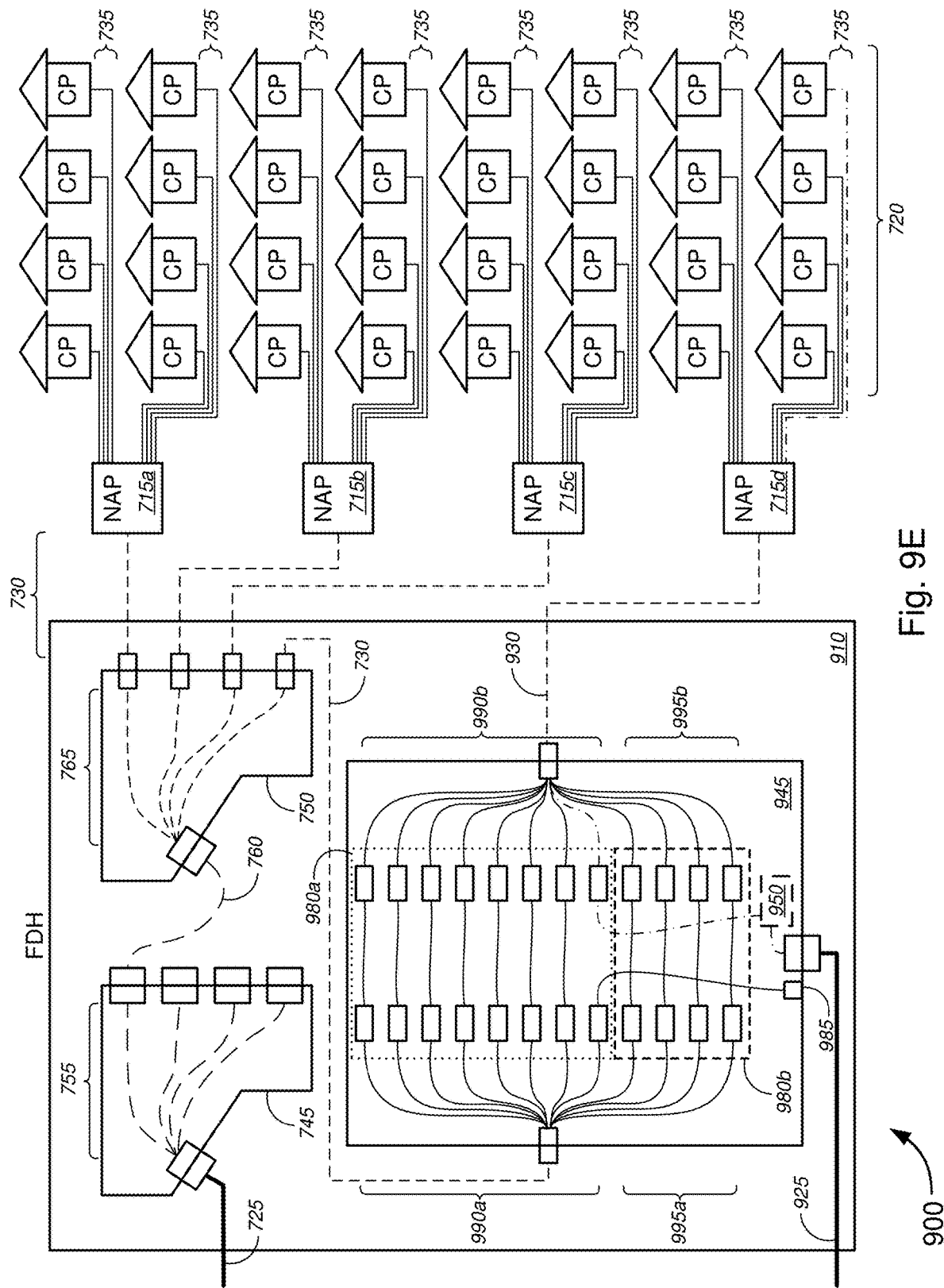
Figure 9F:
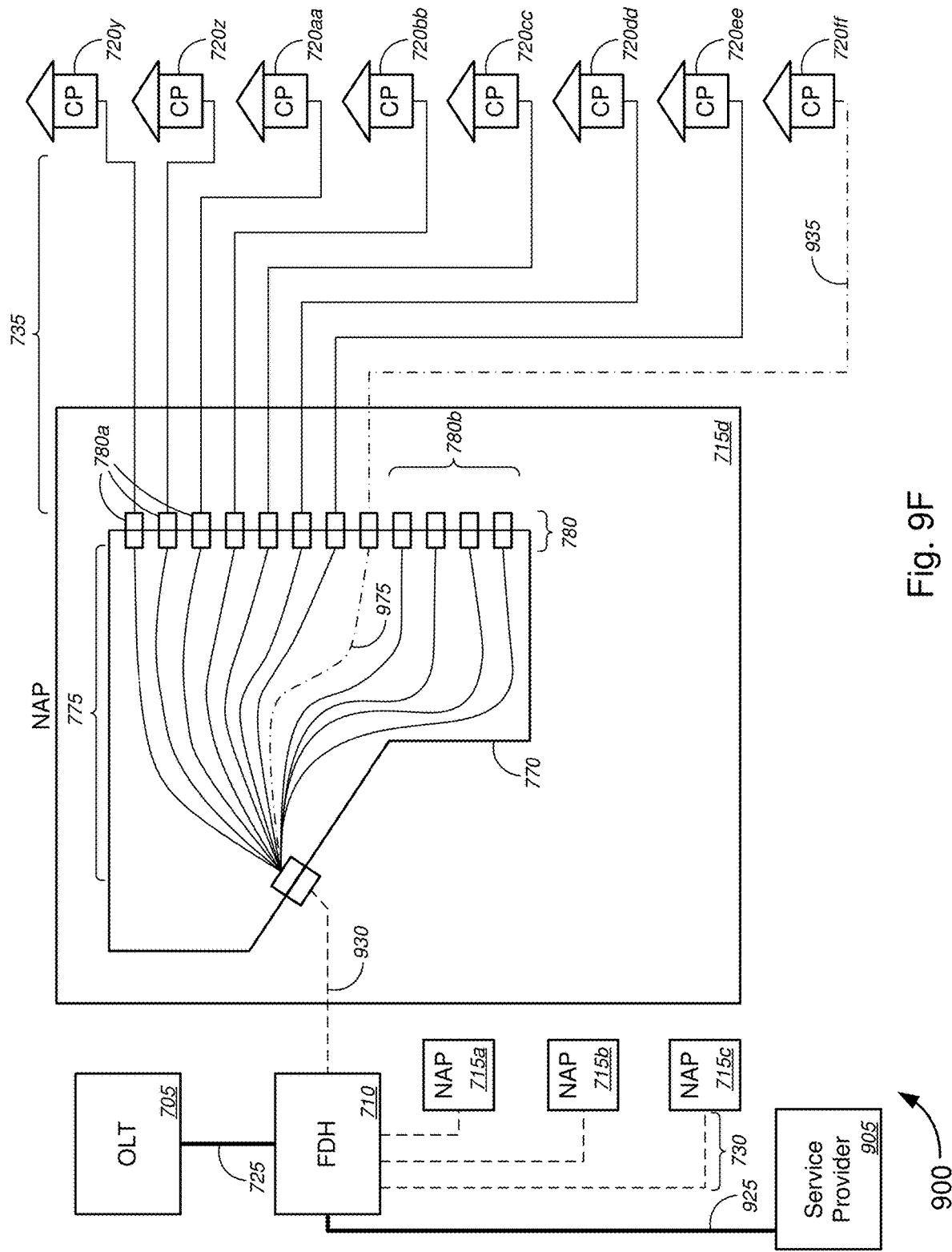

FIGS. 9E and 9F show an alternative set of embodiments in which the at least one fiber line from the third F1 line 925 communicatively couples to one of the main fiber output connectors/ports/lines 990b (and subsequently to one of the main output ports 780a of the NAP 715d), rather than to one of the spare fiber output connectors/ports/lines 995b (and rather than to one of the spare output ports 780b of NAP 715d), in a manner similar to the embodiment of FIG. 8C for the NAP-based point-to-point fiber insertion. FIGS. 9E and 9F are otherwise similar, if not identical to, the embodiments as described above with respect to FIGS. 9A-9D, and similar descriptions apply. Although not shown, rather than communicatively coupling to just one of the main fiber output connectors/ports/lines 990b (as shown in FIG. 9E), two or more fiber lines from the third F1 line 925 might communicatively couple with two or more of the main fiber output connectors/ports/lines 990b. In some cases (also not shown), two or more fiber lines from the third F1 line 925 might communicatively couple with one or more of the main fiber output connectors/ports/lines 990b and with one or more of the spare fiber output connectors/ports/lines 995b. The NAP (in this case, NAP 715d) would then appropriately route or couple these two or more fiber lines from the third F1 line 925 to the appropriate customer premises 720 (in some cases, customer premises associated with users who request the point-to-point fiber service from service provider 905).

Although system 900 is shown comprising one fifth cable distribution device 945 or that the fifth cable distribution device 945 receives and "de-bundles" only one F2 line 730, inserts the F1 line 925, and outputs (or "bundles") the resultant output lines into one F2 line 930, the various embodiments are not so limited, and any suitable number of fifth cable distribution devices 945 may be implemented or utilized within FDH 910 (or external to FDH 910), each fifth cable distribution device 945 receiving and "de-bundling" any suitable or desired number of F2 lines 730, inserting any suitable or desired number of F1 or other fiber lines 925 (which may or may not be bundled with any other fiber lines 925 and/or F1 line 725), and outputting (or "bundling") any suitable or desired number of output lines into a number of F2 lines 930 corresponding to the number of F2 lines 730.

Figure 10A:
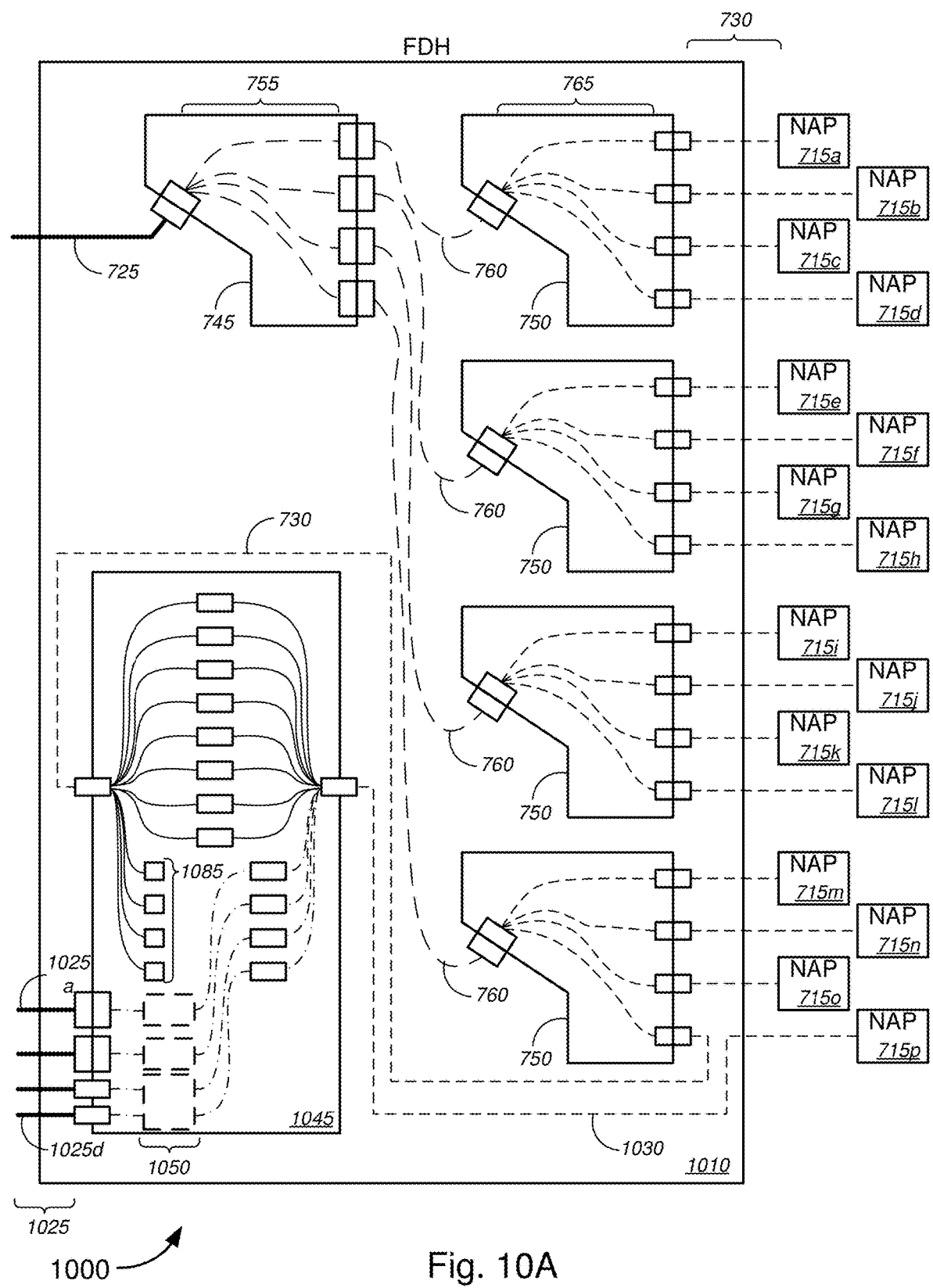
FIGS. 10A-10C are general schematic diagrams illustrating yet other systems for implementing point-to-point fiber insertion within a PON communications system, in accordance with various embodiments.
Figure 10B:
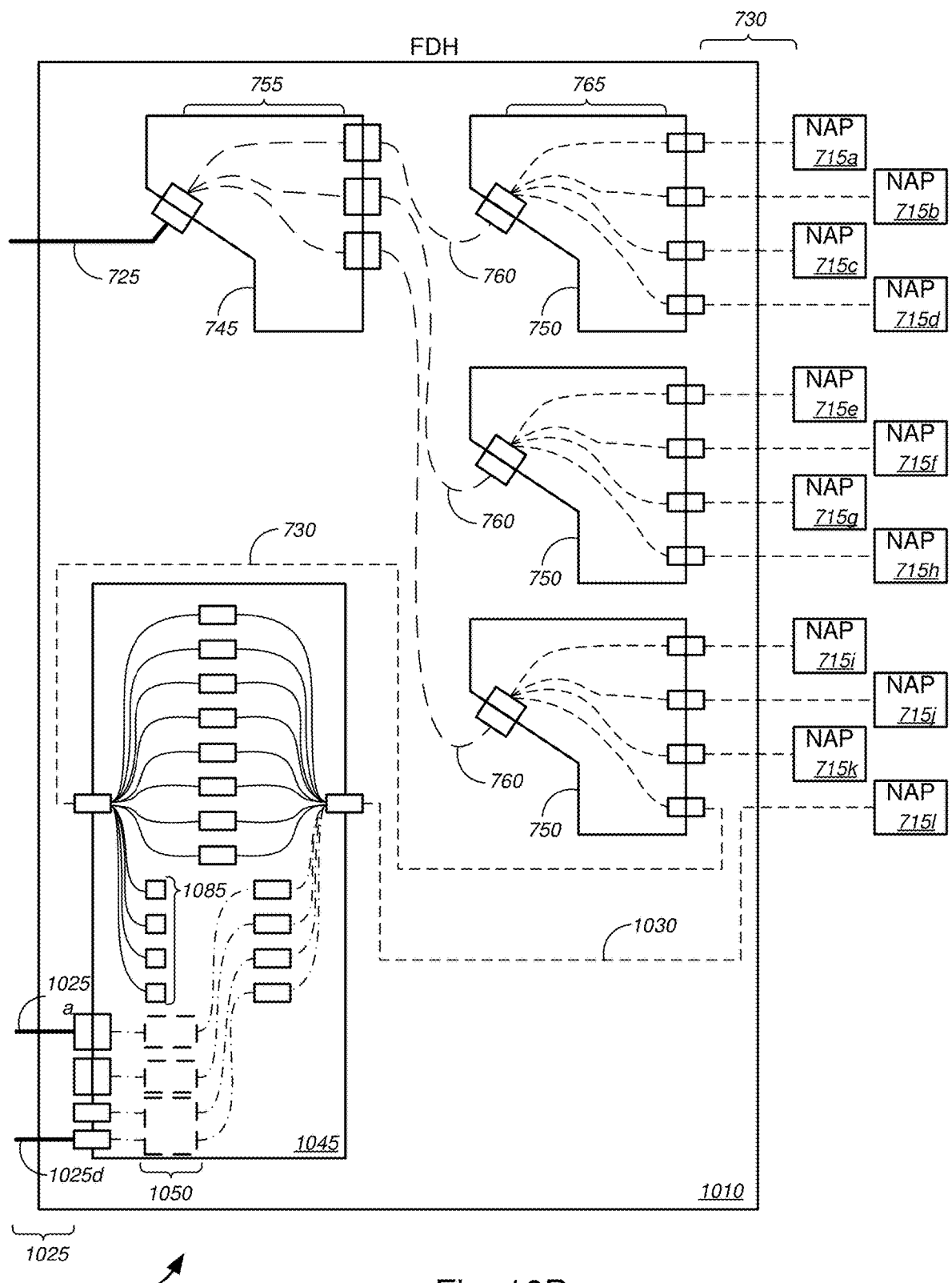

FIGS. 10A and 10B (collectively, "FIG. 10") are general schematic diagrams illustrating yet other systems 1000 for implementing point-to-point fiber insertion within a PON communications system (or alternatively, within an Ethernet fiber communications system, within an EPON, NGPON, or NGPON2 communications system, and/or the like), in accordance with various embodiments. FIG. 10 depicts embodiments that expand on the concepts, systems, and techniques as shown and described with respect to FIG. 9, and thus similar components, structures, and functionalities of the embodiments of FIG. 9 are applicable to those of the embodiments of FIG. 10. In FIG. 10, specific values and numbers are provided to illustrate implementation in the field. Although such specific values and numbers are provided, these are merely provided for illustration, and the various embodiments are not limited to such specific values and numbers—rather, any suitable values and numbers may be implemented as appropriate or as desired.

In FIG. 10, FDH 1010 is similar to FDH 710 in FIG. 7E, except that FDH 1010 further includes a seventh cable distribution device 1045—which, like the fifth cable distribution device 945, is a red box device (as described in detail above). With reference to FIG. 10, similar to FIG. 7, F1 line 725 (between the OLT 705 and the FDH 710) is represented by a thick solid line, while each F2 line 730 (between the FDH 710 and each NAP 715) is represented by a dashed line, and each F3 line 735 (between each NAP 715 and each CP 720) is represented by a thin solid line. At least a portion of each of the F1 line 725, the F2 lines 730, and the F3 lines 735 is routed through at least a portion of an apical conduit component (as shown in FIG. 7, but not shown in FIG. 10), which might include, without limitation, a missile bore(s), a bore hole(s), a conduit(s), and/or a channel of one or more of a source slot(s), a main slot(s), a cross slot(s), and/or a far-side slot(s), or the like (which are described in detail above). In various embodiments, the F3 lines 735 might each include a single (duplex) fiber line, while the F2 lines 730 might each include 8 main single (duplex) fiber lines and 4 spare single (duplex) fiber lines (for a total of 12 single (duplex) fiber lines), and the F1 lines 725 might include 16 to 24 fiber cables, each might include a single (duplex) fiber lines (as described in detail above), and one of the single (duplex) fiber lines 725 might communicatively couple to (and may be "split" by) an input port of a cable distribution device 745 (as described in detail with respect to FIG. 7).

Like FDH 710, FDH 1010 might include, without limitation, at least one first cable distribution device 745 and at least three second cable distribution device 750, each of which might include, but is not limited to, an optical line fanout module, a MPO fiber optic cassette, an optical splitter, and/or the like. In the embodiment of FIG. 10A, for example, FDH 1010 comprises a first cable distribution device 745 and four second cable distribution device 750. The first cable distribution device 745 receives the F1 line 725 at a first input port, and splits that line into four first intermediate lines 755 that couple to four output ports, in a manner similar to that as described above with respect to FIG. 7. In FIG. 10A, because there are four second cable distribution devices 750 (or only four second cable distribution devices 750 are being used), each of the four first intermediate lines 755 communicatively couples with each of the four second cable distribution device 750 via a second intermediate line 760. Within each second cable distribution device 750, a second intermediate line 760 is received at an input port, and is split into four third intermediate lines 765 that couple to four output ports, each of which is communicatively coupled to a NAP 715 (in this example, to NAPs 715a-715d, NAPs 715e-715h, NAPs 715i-715l, and NAPs 715m-715p), via an F2 line 730. Here, both the first and second intermediate lines 755 and 760 are represented by long dashed lines, while the third intermediate line 765 is represented by dashed lines.

As described above, in operation within a PON communications system, as shown in the embodiment of FIG. 10A, the input port of each second cable distribution device 750 (which is a 1:32 splitter) receives the second intermediate line 760, and "splits" the signal from the single optical fiber line (of the second intermediate line 760) into 32 fiber lines. Each of the four third intermediate lines 765 has "bundled" therein 8 of the 32 fiber lines that are "split" from the second intermediate line 760. Each of the four third intermediate lines 765 also has "bundled" therein 4 spare fiber lines that are not communicatively coupled to the second intermediate line 760, for a total of 12 fiber lines (i.e., 12 single (duplex) fiber lines) bundled in each of the four third intermediate lines 765. Each of the four output ports of each second cable distribution device 750 might include a MPO/MTP connector (as described above).

In the embodiment of FIG. 10B, FDH 1010 comprises a first cable distribution device 745 and three second cable distribution device 750. The first cable distribution device 745 receives the F1 line 725 at a first input port, and splits that line into three first intermediate lines 755 that couple to three output ports, in a manner similar to that as described above with respect to FIG. 7 (except that the embodiment of FIG. 10B has a 1:3 split instead of a 1:4 split as shown in FIG. 10A). In some cases, a 1:4 split may still be implemented, but a fourth intermediate line 755 might be coupled to a fourth output port but may remain uncoupled to any second cable distribution device, in a manner similar to that shown and described with respect to FIG. 7B. In alternative cases, a 1:4 split may still be implemented, but a fourth intermediate line 755 might be coupled to a dummy port(s) of a parking lot (in a manner similar to that shown and described with respect to FIGS. 8B, 8C, 9B, 9C, and 9E). In FIG. 10B, because there are three second cable distribution devices 750 (or only three second cable distribution devices 750 are being used), each of the three first intermediate lines 755 communicatively couples with each of the three second cable distribution device 750 via a second intermediate line 760. Within each second cable distribution device 750, a second intermediate line 760 is received at an input port, and is split into four third intermediate lines 765 that couple to four output ports, each of which is communicatively coupled to a NAP 715 (in this example, to NAPs 715a-715d, NAPs 715e-715h, and NAPs 715i-715l), via an F2 line 730.

As described above with respect to FIGS. 7 and 10A, in operation within a PON communications system, as shown in the embodiment of FIG. 10A, the input port of each second cable distribution device 750 (which is a 1:32 splitter) receives the second intermediate line 760, and "splits" the signal from the single optical fiber line (of the second intermediate line 760) into 32 fiber lines. Each of the four third intermediate lines 765 has "bundled" therein 8 of the 32 fiber lines that are "split" from the second intermediate line 760. Each of the four third intermediate lines 765 also has "bundled" therein 4 spare fiber lines that are not communicatively coupled to the second intermediate line 760, for a total of 12 fiber lines (i.e., 12 single (duplex) fiber lines) bundled in each of the four third intermediate lines 765. Each of the four output ports of each second cable distribution device 750 might include a MPO/MTP connector (as described above).

Similar to the fifth cable distribution device 945, the seventh cable distribution device 1045 receives one of the F3 lines 730 that would otherwise be routed to one of the NAPs 715 (in the example of FIG. 10A, NAP 715p; while in the example of FIG. 10B, NAP 715l). As shown in FIG. 10, the F3 line 730 that is received by the seventh cable distribution device 1045 is "de-bundled," at the input port of the seventh cable distribution device 1045, from a single bundled (duplex) fiber line 730 into 12 single (duplex) fiber lines, 8 of which are main fiber input lines and 4 of which are spare fiber input lines. The 8 main fiber input lines might each connect with each of 8 main fiber output lines via connectors or the like (not unlike connections shown and described with respect to FIG. 9B or 9C).

In the embodiment of FIG. 10, unlike the fifth cable distribution device 945, each of the 4 spare fiber input lines of the seventh cable distribution device 1045 might connect or couple with a dummy port 1085 of a parking lot (similar to that as described above with respect to FIGS. 8 and 9). Each of the "spare" connectors, which together with the "main" connectors are connected to the output port via the main and spare output lines, may be communicatively coupled with intermediate lines that are connected to additional input ports via (optional) one or more eighth cable distribution devices 1050 (which might each couple with one or more additional input ports). Each additional input port may be connected to individual additional input fiber lines, such as fiber lines 1025a-1025d (collectively, "input fiber lines 1025") as shown in the embodiment of FIG. 10A, while, in other embodiments, only some, but not all, additional input ports may be connected to individual additional input fiber lines (as shown in the embodiment of FIG. 10B, in which only input fiber lines 1025a and 1025d are connected to the respective additional input ports).

In some cases, each of the input fiber lines 1025 might be an F1 line, while, in other cases, two or more of the input fiber lines 1025 might be bundled into one F1 line 1025. In some instances, the two or more of the input fiber lines 1025 might be bundled into F1 line 725, which feeds at least part of the (apical conduit-based) PON communications system. In yet other embodiments, none of the additional input ports may be used (i.e., no input fiber lines 1025 may be connected to any of the additional input ports) (not shown). Here, each input fiber line 1025 might be an input line for one of an Ethernet service, an EPON service, a NGPON service, a NGPON2 service, and/or like services, and each input line might be associated with one or more of the service provider that established the PON communication system, the service provider that maintains or operates the PON communication system, the service provider that established the apical conduit system, the service provider that maintains or operates the apical conduit communication system, a service provider different from the service provider that established the PON communication system, a service provider different from the service provider that maintains or operates the PON communication system, a service provider different from the service provider that established the apical conduit system, a service provider different from the service provider that maintains or operates the apical conduit communication system, and/or the like.

Figure 10C:
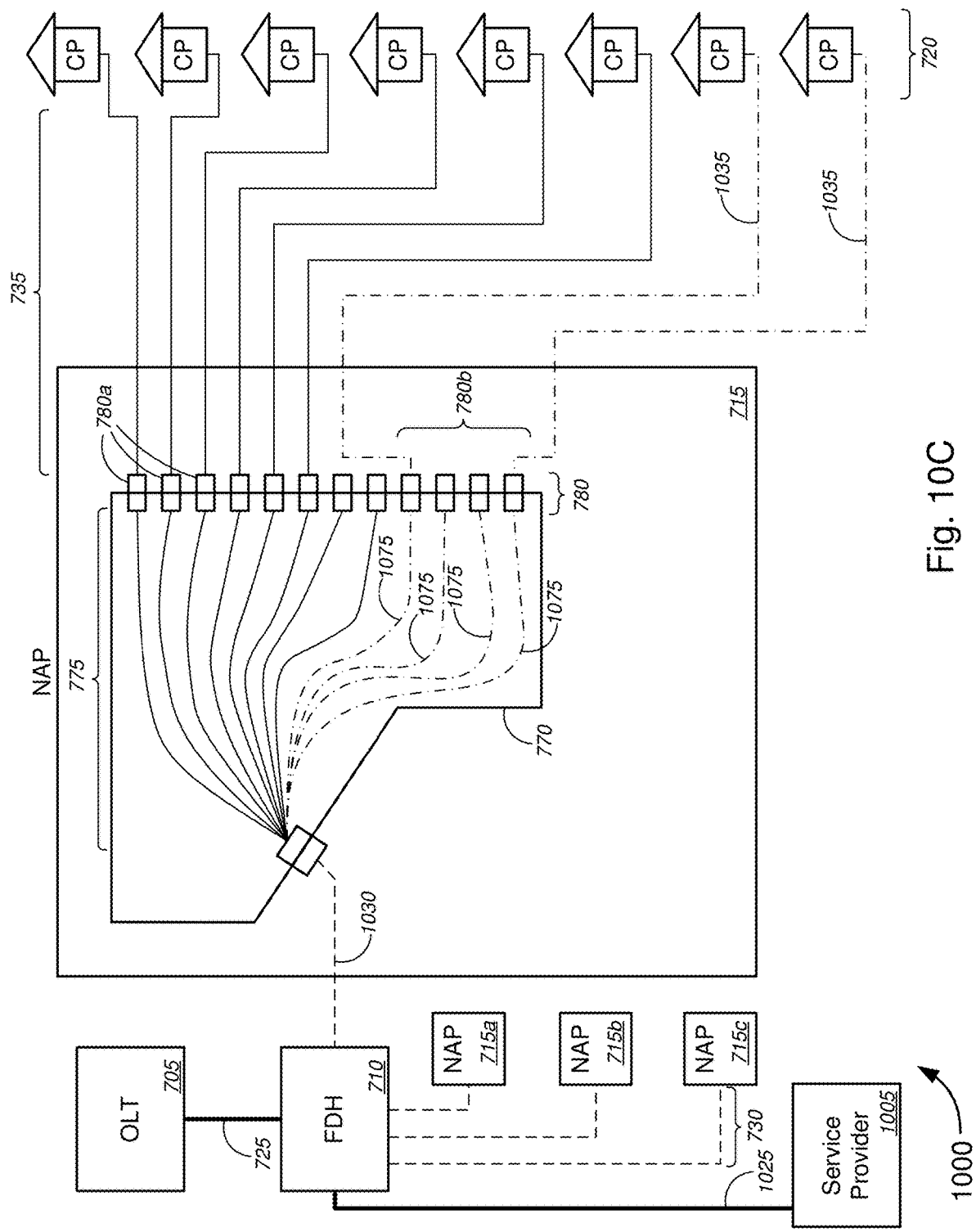

With reference to FIG. 10C, at the corresponding NAP 715 (i.e., NAP 715*p* in the embodiment of FIG. 10A and NAP 715*l* in the embodiment of FIG. 10B), the F3 line 1030 is received by the third cable distribution device 770 of corresponding NAP 715, and intermediate lines 1075—each of which communicatively couples to each of the spare output lines (which, in some cases, might couple to one or more, all, or none of the input fiber lines 1025 via the eighth cable distribution device 1050, via the connector to the corresponding spare fiber output line that is communicatively coupled to the output port of the seventh cable distribution device 1045). One or more, all, or none of the intermediate lines 1075 might communicatively couple to corresponding customer premises 720 (in the embodiment of FIG. 10B, only the intermediate lines that are communicatively coupled to the input fiber lines 1025*a* and 1025*d* might be communicatively coupled to customer premises (which may be customer premises associated with customers who request such point-to-point fiber service). Regarding the embodiment of FIG. 10A, although four input fiber lines 1025*a*-1025*d* are communicatively coupled to the four intermediate lines 1075, not all of these intermediate lines 1075 need be coupled to customer premises.

In FIG. 10, although input fiber lines 1025 are shown communicatively coupling with "spare" fiber lines in the seventh cable distribution device 1045 in the FDH 1005 and in the third cable distribution device 770 of corresponding NAP 715, the various embodiments are not so limited, and the input fiber lines 1025 (and intermediate lines 1075) may be communicatively coupled with any of the main and/or spare fiber lines in the seventh cable distribution device 1045 in the FDH 1005 and in the third cable distribution device 770 of corresponding NAP 715 (in a manner similar to the embodiments shown and described with respect to FIGS. 8C, 9E, and 9F).

Turning back to the embodiment of FIG. 10A, with each NAP 715 of the 16 NAPs 715*a*-715*p* communicatively coupling to 8 customer premises 720, 128 physical connections may be made by the FDH 1010. For a PON communications system, F1 line 725 might comprise 16-24 fiber cables. Each fiber cable might include a single (duplex) fiber line 725, and one single (duplex) fiber line 725 might communicatively couple with an input port of a cable distribution device 745. The input port of the cable distribution device 745 might split the signal from the single (duplex) fiber line 725 into 3 or 4 intermediate fiber lines 755, each of which might couple with an input port of cable distribution device 750 via intermediate fiber line 760. The input port of cable distribution device 750 might split the signal from the intermediate fiber line 760 into 32 fiber lines that are bundled into four intermediate fiber lines 765 together with spare fiber lines (for a total of 12 fiber lines for each intermediate fiber line 765—8 main fiber lines and 4 spare fiber lines). Each intermediate fiber line 765 might couple with a F2 line 730 via an MPO/MPT connector or the like. One or more F2 lines 730 might be routed through a red box device 1045—within which the one or more F2 lines 730 might be "de-bundled," with one or more fiber lines 1025 (or intermediate fiber lines coupled to the one or more fiber lines 1025) replacing one or more main or spare fiber lines in the one or more F2 lines 730 prior to "bundling" (or "re-bundling") of the fiber lines into the resultant one or more F2 lines 1030. As described above, however, although each NAP 715 has 8 ports, and hence communicatively couples to 8 customer premises 720 via F3 lines 735, each NAP 715 receives an F2 line 730 that contains at least 12 single (duplex) fiber lines. In some embodiments, the input port of the at least one first cable distribution device 745, each output port of the at least one first cable distribution device 745, and the input port of each second cable distribution device 750 might include an SC connector (in some cases, an SC/APC connector), while each output port of each second cable distribution device 750, the input port of seventh cable distribution device 1045 receiving F2 line 730, and the output port of the seventh cable distribution device 1045 outputting F2 line 1030 might each include an MPO/MTP connector.

In terms of attenuation of signal losses within the PON communications system, at least at the FDH 1010, each of the at least one first cable distribution device 745 (which is a 1:4 (splitting) arrangement) might have an attenuation of about 7.25 dB, while each of the four second cable distribution devices 750 (which each has a 1:32 (splitting) arrangement) might have an attenuation of about 17.0 dB. Each SC connector might have an attenuation of about 0.25 dB, while each MPO/MTP connector might have an attenuation of about 0.5 dB. In some cases, the attenuation might be caused at least in part on the splitting of the signal. Because of these attenuation values, the PON system of FIG. 10A might support 64 logical connections (i.e., for the 128 physical connections), and thus has a take rate of about 50%, before grooming is required (in some cases, this might be referred to as "2:1 overbooking"). Here, "grooming" refers to combining and rearranging physical connections and/or logical connections to optimize the network, including adding facilities and network elements to augment network capacity, which might occur at the OLT 705 and/or at the FDH 1010. In some cases, grooming at the OLT 705 might include using an "unlink" command to automate the grooming process.

With reference to the embodiment of FIG. 10B, rather than a 1:4 (splitting arrangement), the at least one first cable distribution device 745 of FIG. 10B has 3 output ports (which is a 1:3 (splitting) arrangement) connected to three second cable distribution devices 750. In such a configuration, the at least one first cable distribution device 745 of FIG. 10B might have an attenuation of about 5.1 dB, while each of the three second cable distribution devices 750 (which each has a 1:32 (splitting) arrangement) might have an attenuation of about 17.0 dB. As with the embodiment of FIG. 10A, each SC connector might have an attenuation of about 0.25 dB, while each MPO/MTP connector might have an attenuation of about 0.5 dB. In some cases, as above, the attenuation might be caused at least in part on the splitting of the signal. Because of these attenuation values, the PON system of FIG. 10B might support 64 logical connections (i.e., for the 96 physical connections), and thus has a take rate of about 66.67%, before grooming is required (in some cases, this might be referred to as "1.5:1 overbooking").

System 1000 is otherwise similar, if not identical, to system 700 of FIG. 7, and description of similar components, functionalities, and operations of system 700 apply to those of system 1000. Although system 1000 is shown comprising one seventh cable distribution device 1045 or that the seventh cable distribution device 1045 receives and "de-bundles" only one F2 line 730, inserts one or more, all, or none of the input fiber lines 1025, and outputs (or "bundles"/"re-bundles") the resultant output lines into one F2 line 1030, the various embodiments are not so limited, and any suitable number of seventh cable distribution device 1045 may be implemented or utilized within FDH 1010 (or external to FDH 1010), each seventh cable distribution device 1045 receiving and "de-bundling" any suitable or desired number of F2 lines 730, inserting any suitable or desired number of input fiber lines 1025 (which may or may not be bundled with any other input fiber lines 1025 and/or F1 line 725), and outputting (or "bundling"/"re-bundling") any suitable or desired number of output lines into a number of F2 lines 1030 corresponding to the number of F2 lines 730.

Figure 11A:
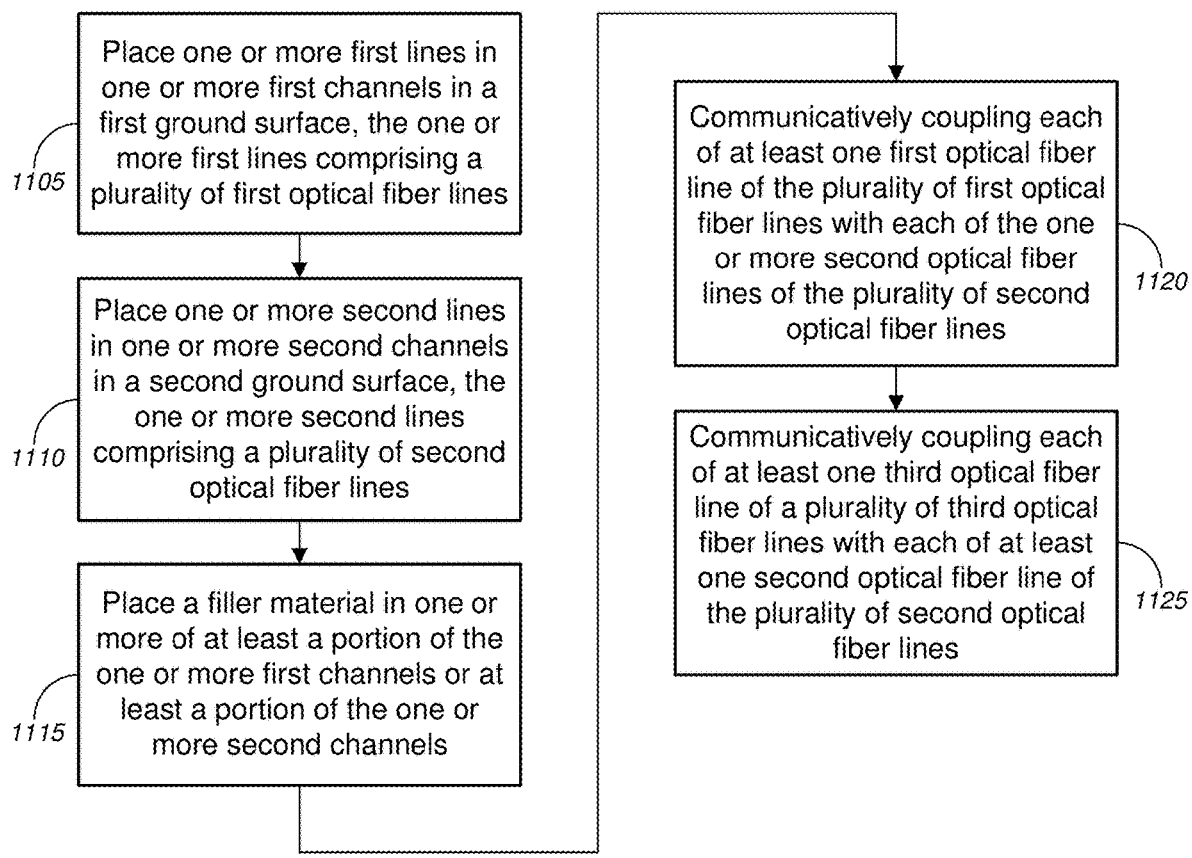
FIGS. 11A-11C are flow diagrams illustrating various methods for implementing point-to-point fiber insertion within a PON communications system, in accordance with various embodiments.
Figure 11B:
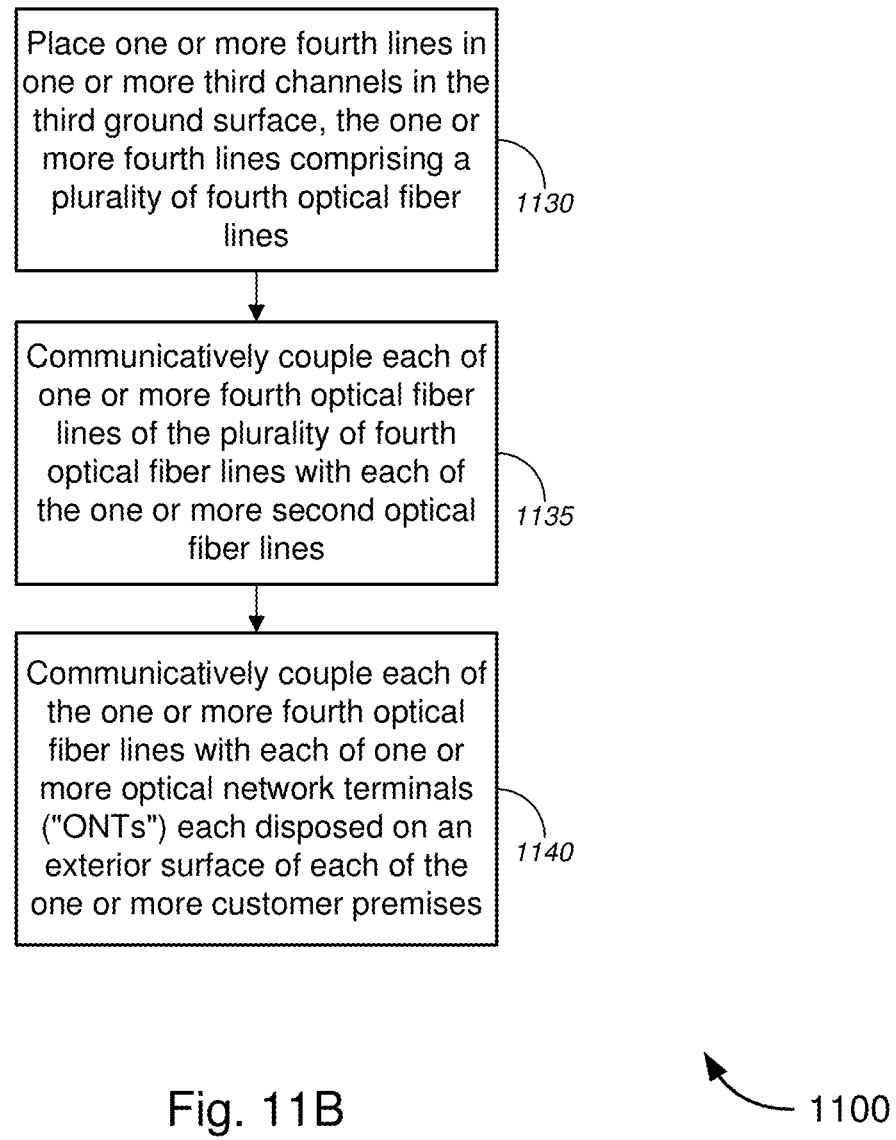
Figure 11C:
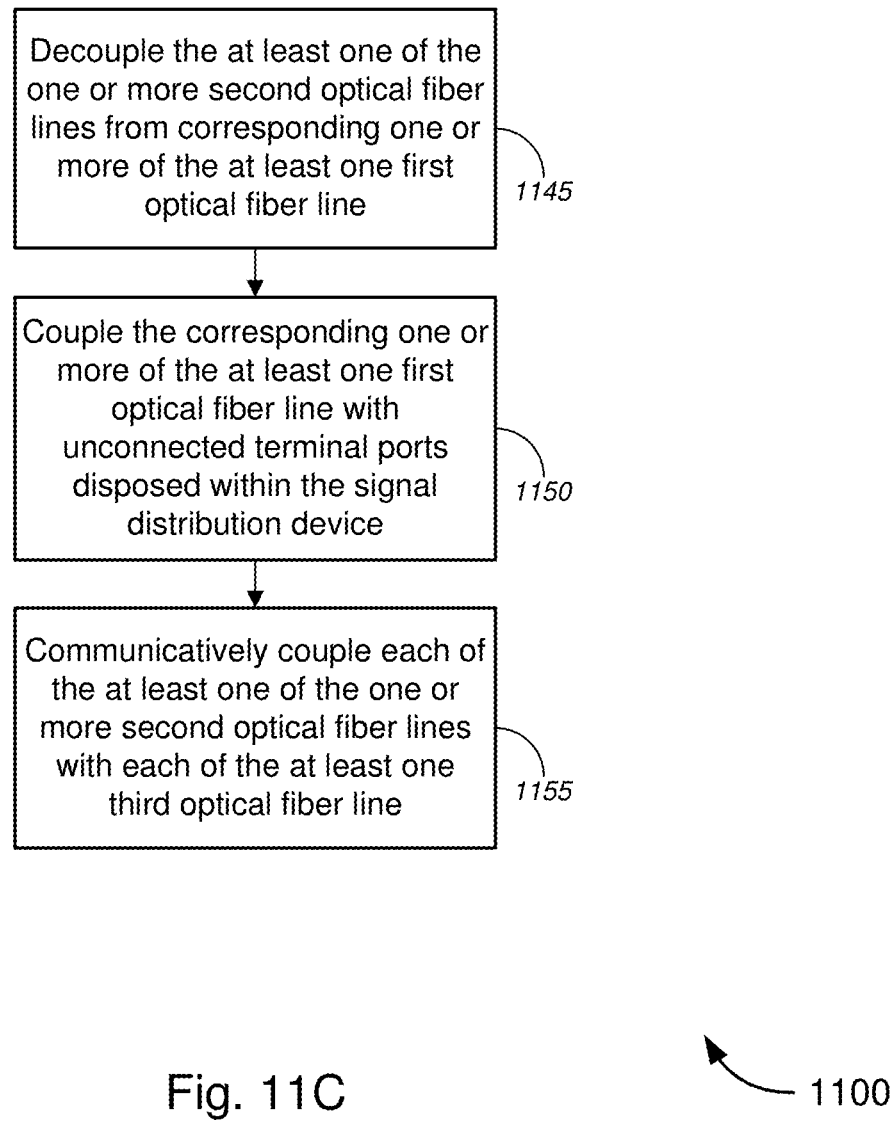

FIGS. 11A-11C (collectively, "FIG. 11") are flow diagrams illustrating various methods 1100 for implementing point-to-point fiber insertion within a PON communications system (or alternatively, within an Ethernet fiber communications system, within an EPON, NGPON, or NGPON2 communications system, and/or the like), in accordance with various embodiments. While the techniques and procedures are depicted and/or described in a certain order for purposes of illustration, it should be appreciated that certain procedures may be reordered and/or omitted within the scope of various embodiments. Moreover, while the method illustrated by FIG. 11 can be implemented by or with (and, in some cases, are described below with respect to) the systems 100, 300, 400, 500, 600, 700, 800, 900, and/or 1000 of FIGS. 1, 3, 4, 5, 6, 7, 8, 9, and/or 10, respectively (or components thereof), such methods may also be implemented using any suitable hardware implementation. Similarly, while each of the system 100 (and/or components thereof) of FIG. 1, the system 300 (and/or components thereof) of FIG. 3, the system 400 (and/or components thereof) of FIG. 4, the system 500 (and/or components thereof) of FIG. 5, the system 600 (and/or components thereof) of FIG. 6, the system 700 (and/or components thereof) of FIG. 7, the system 800 (and/or components thereof) of FIG. 8, the system 900 (and/or components thereof) of FIG. 9, and/or the system 1000 (and/or components thereof) of FIG. 10 can operate according to the method illustrated by FIG. 11 (e.g., by executing instructions embodied on a computer readable medium), the systems 100, 300, 400, 500, 600, 700, 800, 900, and/or 1000 can each also operate according to other modes of operation and/or perform other suitable procedures.

In FIG. 11A, method 1100 might comprise, at block 1105, placing one or more first lines in one or more first channels in a first ground surface. The one or more first lines might include, without limitation, a plurality of first optical fiber lines, which might be associated with at least one of a first service provider or a first service. At block 1110, method 1100 might comprise placing one or more second lines in one or more second channels in a second ground surface. The one or more second lines might include, but is not limited to, a plurality of second optical fiber lines. Each of one or more second optical fiber lines of the plurality of second optical fiber lines might serve each of one or more customer premises of a plurality of customer premises. Method 1100, at block 1115, might comprise placing a filler material in one or more of at least a portion of the one or more first channels or at least a portion of the one or more second channels. In some embodiments, the filler material might include a thermosetting material or the like. In some cases, the thermosetting material might include, without limitation, polyurea or the like.

According to some embodiments, at least a portion of the first ground surface might be (or might include) a roadway surface, while at least a portion of the second ground surface might be (or might include) one of a roadway surface or a non-roadway surface, and at least a portion of the third ground surface might be (or might include) a non-roadway surface. The method might further comprise placing a capping material in the at least one of at least a portion of the one or more first channels or at least a portion of the one or more second channels, above the filler material. The capping material, in some cases, might serve as road lines on the roadway surface. In some embodiments, at least one channel of the one or more first channels and at least one channel of the one or more second channels is the same channel, while, in other embodiments, each of the one or more first channels and each of the one or more second channels might be different channels.

At block 1120, method 1100 might comprise communicatively coupling each of at least one first optical fiber line of the plurality of first optical fiber lines with each of the one or more second optical fiber lines of the plurality of second optical fiber lines via a first cable distribution device disposed within a signal distribution device disposed in a third ground surface. Method 1100 might further comprise communicatively coupling each of at least one third optical fiber line of a plurality of third optical fiber lines with each of at least one second optical fiber line of the plurality of second optical fiber lines via a second cable distribution device disposed within the signal distribution device (block 1125). The plurality of third optical fiber lines might be associated with at least one of a second service provider or a second service. According to some embodiments, each of the plurality of first optical fiber lines might be associated with one of a passive optical network ("PON") service or a gigabit PON ("GPON") service, while each of the at least one third optical fiber line might be associated with one of an Ethernet fiber line service, a second PON service (different from the PON service), a second GPON service (different from the GPON service), an Ethernet PON ("EPON") service, a next generation PON ("NGPON") service, or a second NGPON ("NGPON2") service, or the like.

In some embodiments, the at least one second optical fiber line is separate from the one or more second optical fiber lines, with each of the at least one second optical fiber line serving each of at least one customer premises of the plurality of customer premises. Alternatively, the at least one second optical fiber line and at least one of the one or more second optical fiber lines are the same optical fiber lines, with the at least one of the one or more second optical fiber lines being communicatively coupled with corresponding one or more of the at least one first optical fiber line.

Merely by way of example, in some embodiments, the signal distribution device might include, without limitation, a container that is disposed in the third ground surface, with a top portion of the container being one of substantially level with a top portion of the third ground surface or below the top portion of the third ground surface. In some cases, each of the first and second cable distribution devices might be disposed within the container. In alternative embodiments, the signal distribution device might include a container that is disposed in the third ground surface and a pedestal that is disposed above a top portion of the container. The top portion of the container might be one of substantially level with a top portion of the third ground surface or below the top portion of the third ground surface, and at least one of the first cable distribution device or the second cable distribution device is disposed within one of the container or the pedestal. In some cases, the first and second cable distribution devices might be the same cable distribution device, while, in other cases, the first and second cable distribution devices might be different cable distribution devices.

In some embodiments, each of the one or more first lines or the one or more second lines further might include, without limitation, one or more of at least one conduit, at least one conductive signal line, at least one power line via the signal distribution device, and/or the like. In some instances, the at least one conductive signal line might include, but is not limited to, at least one of one or more data cables, one or more video cables, one or more voice cables, and/or the like.

According to some embodiments, the signal distribution device might include a fiber distribution hub ("FDH"). The one or more first lines might communicatively couple at least one of a central office or a digital subscriber line access multiplexer ("DSLAM") of a telecommunications service provider with the FDH, and the one or more second lines might communicatively couple the FDH with a network access point ("NAP") (which might include an above-surface NAP, a direct bury NAP, or a NAP disposed in the ground surface and extending above the ground surface, or the like). Alternatively, the signal distribution device might include a NAP, and the one or more first lines might communicatively couple the NAP with a FDH, in which case, the one or more second lines might communicatively couple the NAP with one or more network interface devices ("NIDs") each disposed on an exterior surface of a customer premises of the plurality of customer premises. In some cases, the one or more NIDs might include one or more optical network terminals ("ONTs"). In some instances, each of the one or more second lines might include eight main optical fiber lines and four spare optical fiber lines, and communicatively coupling each of the at least one third optical fiber line with each of the at least one second optical fiber line might comprise communicatively coupling each of the at least one third optical fiber line with each of one or more of the four spare optical fiber lines.

In FIG. 11B, method 1100 might further comprise, at block 1130, placing one or more fourth lines in one or more third channels in the third ground surface, with the one or more fourth lines comprising a plurality of fourth optical fiber lines. Method 1100 might further comprise communicatively coupling, with a NAP, each of one or more fourth optical fiber lines of the plurality of fourth optical fiber lines with each of the one or more second optical fiber lines (block 1135). At block 1140, method 1100 might comprise communicatively coupling each of the one or more fourth optical fiber lines with each of one or more ONTs each disposed on an exterior surface of each of the one or more customer premises.

With reference to FIG. 11C—and in the case of the at least one second optical fiber line and at least one of the one or more second optical fiber lines being the same optical fiber lines, and the at least one of the one or more second optical fiber lines being communicatively coupled with corresponding one or more of the at least one first optical fiber line—method 1100 might further comprise decoupling the at least one of the one or more second optical fiber lines from the corresponding one or more of the at least one first optical fiber line (block 1145). Method 1100 might, at block 1150, comprise coupling the corresponding one or more of the at least one first optical fiber line with unconnected terminal ports disposed within the signal distribution device. At block 1155, method 1100 might comprise communicatively coupling each of the at least one of the one or more second optical fiber lines with each of the at least one third optical fiber line.

Figure 12A:
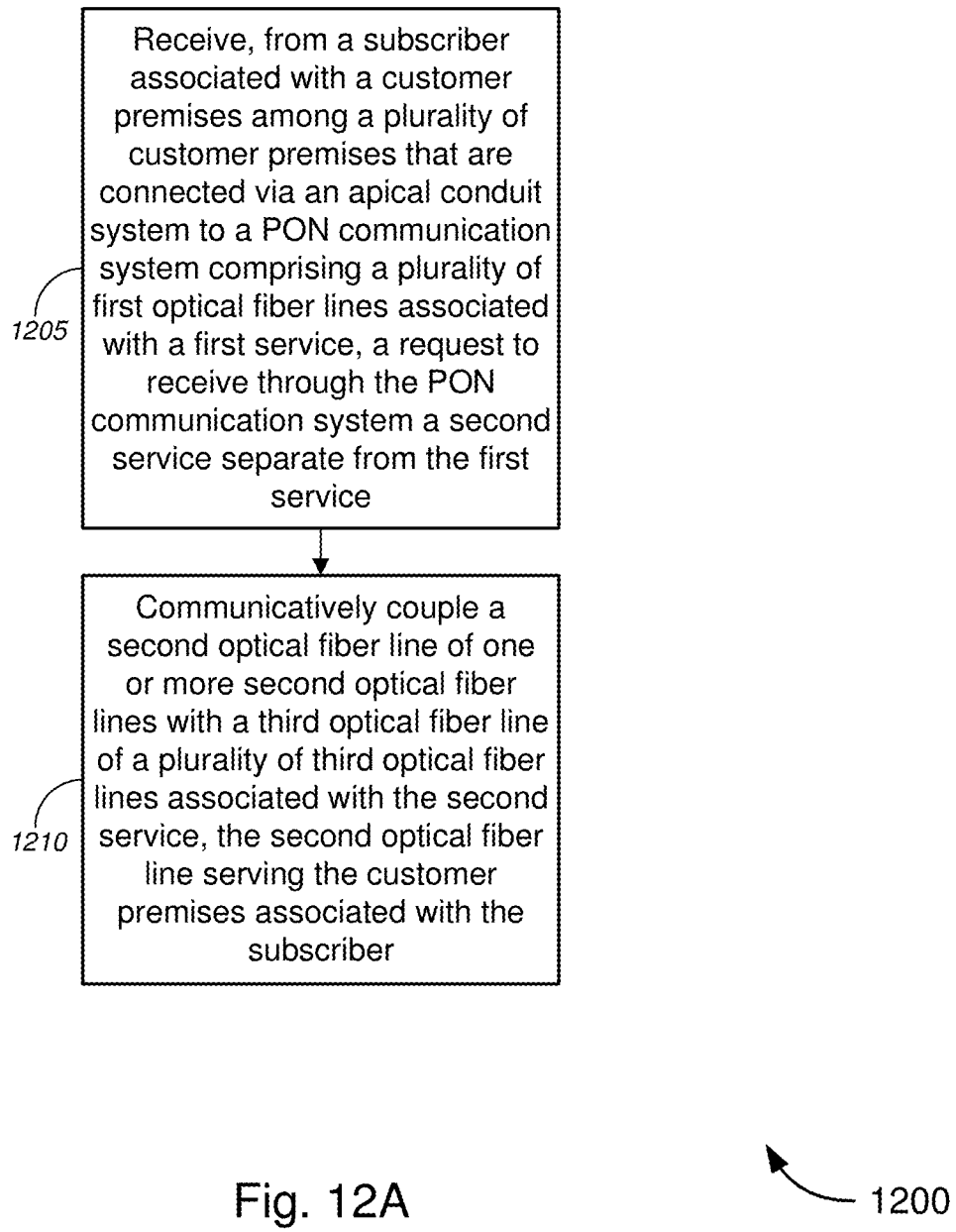
FIGS. 12A and 12B are flow diagrams illustrating another method for implementing point-to-point fiber insertion within a PON communications system, in accordance with various embodiments.
Figure 12B:
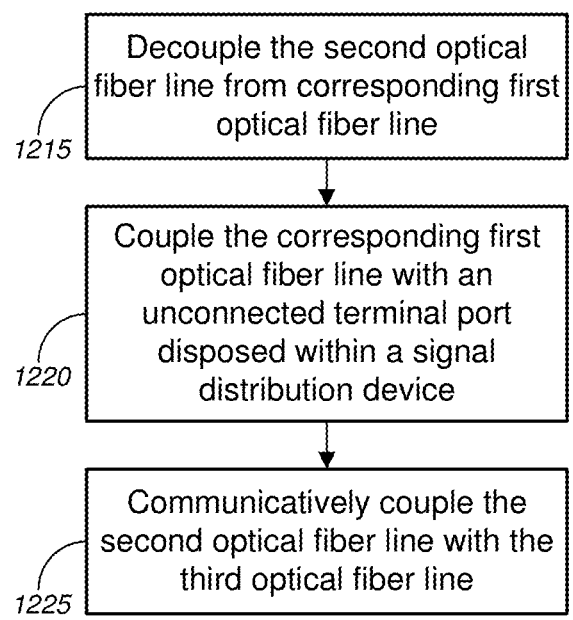

FIGS. 12A and 12B (collectively, "FIG. 12") are flow diagrams illustrating another method 1200 for implementing point-to-point fiber insertion within a PON communications system (or alternatively, within an Ethernet fiber communications system, within an EPON, NGPON, or NGPON2 communications system, and/or the like), in accordance with various embodiments. While the techniques and procedures are depicted and/or described in a certain order for purposes of illustration, it should be appreciated that certain procedures may be reordered and/or omitted within the scope of various embodiments. Moreover, while the method illustrated by FIG. 12 can be implemented by or with (and, in some cases, are described below with respect to) the systems 100, 300, 400, 500, 600, 700, 800, 900, and/or 1000 of FIGS. 1, 3, 4, 5, 6, 7, 8, 9, and/or 10, respectively (or components thereof), such methods may also be implemented using any suitable hardware implementation. Similarly, while each of the system 100 (and/or components thereof) of FIG. 1, the system 300 (and/or components thereof) of FIG. 3, the system 400 (and/or components thereof) of FIG. 4, the system 500 (and/or components thereof) of FIG. 5, the system 600 (and/or components thereof) of FIG. 6, the system 700 (and/or components thereof) of FIG. 7, the system 800 (and/or components thereof) of FIG. 8, the system 900 (and/or components thereof) of FIG. 9, and/or the system 1000 (and/or components thereof) of FIG. 10 can operate according to the method illustrated by FIG. 12 (e.g., by executing instructions embodied on a computer readable medium), the systems 100, 300, 400, 500, 600, 700, 800, 900, and/or 1000 can each also operate according to other modes of operation and/or perform other suitable procedures.

In FIG. 12A, method 1200, at block 1205, might comprise receiving, from a subscriber associated with a customer premises among a plurality of customer premises that are connected via an apical conduit system to a PON communication system (such as described above with respect to FIGS. 1-11), a request to receive through the PON communication system (or alternatively, through an Ethernet fiber communications system, through an EPON, NGPON, or NGPON2 communications system, and/or the like) a second service separate from a first service. The second service might be associated with one of a first service provider that provides the first service or a second service provider different from the first service provider. At block 1210, method 1200 might comprise communicatively coupling a second optical fiber line of the one or more second optical fiber lines with a third optical fiber line of a plurality of third optical fiber lines associated with the second service, with the second optical fiber line serving the customer premises associated with the subscriber.

According to some embodiments, each of the plurality of first optical fiber lines might be associated with one of a PON service or a GPON service, or the like, while each of the at least one third optical fiber line might be associated with one of an Ethernet fiber line service, a second PON service (different from the PON service), a second GPON service (different from the GPON service), an EPON service, a NGPON service, or a NGPON2 service, or the like.

With reference to FIG. 12B, the second optical fiber line might be communicatively coupled to a corresponding first optical fiber line of the plurality of first optical fiber lines, and communicatively coupling the second optical fiber line with the third optical fiber line might comprise decoupling the second optical fiber line from the corresponding first optical fiber line (block 1215), coupling the corresponding first optical fiber line with an unconnected terminal port disposed within a signal distribution device (block 1220), and communicatively coupling the second optical fiber line with the third optical fiber line (block 1225).

In some embodiments, the signal distribution device might include a FDH, and the one or more first lines might communicatively couple at least one of a central office or a DSLAM of a telecommunications service provider with the FDH, while the one or more second lines might communicatively couple the FDH with a NAP. In alternative embodiments, the signal distribution device might include a NAP, and the one or more first lines might communicatively couple the NAP with a FDH, while the one or more second lines might communicatively couple the NAP with one or more ONTs each disposed on an exterior surface of a customer premises of the plurality of customer premises.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   placing one or more first lines in a first ground surface;
   placing one or more second lines in a second ground surface;
   communicatively coupling each of at least one first line of the one or more first lines with each of at least one second line of the one or more second lines via a first cable distribution device disposed within a signal distribution device disposed in a third ground surface, wherein the signal distribution device comprises a container that is disposed in the third ground surface and a pedestal that is disposed above the third ground surface and a top portion of the container.

2. The method of claim 1, wherein the one or more first lines comprise a plurality of first optical fiber lines, the plurality of first optical fiber lines being associated with at least one of a first service provider or a first service, and wherein the one or more second lines comprising a plurality of second optical fiber lines, each of one or more second optical fiber lines of the plurality of second optical fiber lines serving each of one or more customer premises of a plurality of customer premises.

3. The method of claim 2, wherein the at least one second optical fiber line is separate from the one or more second optical fiber lines, each of the at least one second optical fiber line serving each of at least one customer premises of the plurality of customer premises.

4. The method of claim 2, further comprising:
   communicatively coupling each of at least one third optical fiber line of a plurality of third optical fiber lines with each of at least one second optical fiber line of the plurality of second optical fiber lines via a second cable distribution device disposed within the signal distribution device, the plurality of third optical fiber lines being associated with at least one of a second service provider or a second service.

5. The method of claim 4, wherein the at least one second optical fiber line and at least one of the one or more second optical fiber lines are the same optical fiber lines, wherein the at least one of the one or more second optical fiber lines is communicatively coupled with corresponding one or more of the at least one first optical fiber line, wherein communicatively coupling each of the at least one third optical fiber line with each of the at least one second optical fiber line comprises:
   decoupling the at least one of the one or more second optical fiber lines from the corresponding one or more of the at least one first optical fiber line;
   coupling the corresponding one or more of the at least one first optical fiber line with unconnected terminal ports disposed within the signal distribution device; and
   communicatively coupling each of the at least one of the one or more second optical fiber lines with each of the at least one third optical fiber line.

6. The method of claim 4, wherein the first and second cable distribution devices are the same cable distribution device.

7. The method of claim 4, wherein each of the one or more second lines comprise eight main optical fiber lines and four spare optical fiber lines, wherein communicatively coupling each of the at least one third optical fiber line with each of the at least one second optical fiber line comprises communicatively coupling each of the at least one third optical fiber line with each of one or more of the four spare optical fiber lines.

8. The method of claim 4, wherein each of the plurality of first optical fiber lines is associated with one of a passive optical network ("PON") service or a gigabit PON ("GPON") service, and wherein each of the at least one third optical fiber line is associated with one of an Ethernet fiber line service, a second PON service, a second GPON service, an Ethernet PON ("EPON") service, a next generation PON ("NGPON") service, or a second generation NGPON or 40 Gigabit-capable PON ("NGPON2") service.

9. The method of claim 2, further comprising:
placing one or more fourth lines in one or more third channels in the third ground surface, the one or more fourth lines comprising a plurality of fourth optical fiber lines;
communicatively coupling, with a network access point ("NAP"), each of one or more fourth optical fiber lines of the plurality of fourth optical fiber lines with each of the one or more second optical fiber lines; and
communicatively coupling each of the one or more fourth optical fiber lines with each of one or more optical network terminals ("ONTs") each disposed on an exterior surface of each of the one or more customer premises.

10. The method of claim 1, wherein the top portion of the container is one of substantially level with a top portion of the third ground surface or below the top portion of the third ground surface, wherein the first cable distribution device is disposed within the container.

11. The method of claim 1, wherein each of the one or more first lines or the one or more second lines further comprises one or more of at least one conduit, at least one conductive signal line, or at least one power line via the signal distribution device.

12. The method of claim 11, wherein the at least one conductive signal line comprises at least one of one or more data cables, one or more video cables, or one or more voice cables.

13. The method of claim 1, wherein the signal distribution device comprises a fiber distribution hub ("FDH"), wherein the one or more first lines communicatively couple at least one of a central office or a digital subscriber line access multiplexer ("DSLAM") of a telecommunications service provider with the FDH, wherein the one or more second lines communicatively couple the FDH with a network access point ("NAP").

14. The method of claim 1, wherein the signal distribution device comprises a network access point ("NAP"), wherein the one or more first lines communicatively couple the NAP with a fiber distribution hub ("FDH"), wherein the one or more second lines communicatively couple the NAP with one or more network interface devices ("NIDs") each disposed on an exterior surface of a customer premises of the plurality of customer premises.

15. The method of claim 14, wherein the one or more NIDs comprise one or more optical network terminals ("ONTs").

16. The method of claim 1, further comprising:
placing a filler material in one or more of at least a portion of the one or more first channels or at least a portion of the one or more second channels, wherein the filler material comprises a thermosetting material.

17. The method of claim 1, wherein at least a portion of the first ground surface is a roadway surface, wherein at least a portion of the second ground surface is one of a roadway surface or a non-roadway surface, and wherein at least a portion of the third ground surface is a non-roadway surface.

18. The method of claim 17, further comprising placing a capping material in the at least one of at least a portion of the one or more first channels or at least a portion of the one or more second channels, above the filler material, wherein the capping material serves as road lines on the roadway surface.

19. A communications system, comprising:
an apical conduit system, comprising:
one or more first lines disposed in a first ground surface;
one or more second lines disposed in a second ground surface; and
a signal distribution device, comprising:
a container disposed in a third ground surface;
a pedestal that is disposed above the third ground surface and a top portion of the container; and
a first cable distribution device disposed within the signal distribution device and configured to communicatively couple each of at least one first line of the one or more first lines with each of at least one second line of the one or more second lines.

20. A method for implementing point-to-point fiber insertion within a passive optical network ("PON") communications system, the PON communications system comprising an apical conduit system which comprises:
one or more first lines disposed in a first ground surface; and
one or more second lines disposed in a second ground surface;
the method comprising:
receiving, from a subscriber associated with a customer premises among the plurality of customer premises that are connected via the apical conduit system to the PON communication system, a request to receive through the PON communication system a second service separate from the first service, the second service being associated with one of the first service provider or a second service provider; and
communicatively coupling a second line of the one or more second lines with a third line of a plurality of third lines associated with the second service, the second optical fiber line serving the customer premises associated with the subscriber, wherein the signal distribution device comprises a container that is disposed in the third ground surface and wherein the signal distribution further comprises a pedestal that is disposed above the third surface and a top portion of the container.

* * * * *